US006240527B1

(12) United States Patent
Schneider et al.

(10) Patent No.: US 6,240,527 B1
(45) Date of Patent: May 29, 2001

(54) METHOD SOFTWARE AND APPARATUS FOR SAVING USING AND RECOVERING DATA

(75) Inventors: Eric Schneider, Plymouth; Chuck Ferril, Shorewood; Doug Wheeler, Plymouth; Larry Schwartz, Coon Rapids; Edward Bruggeman, Chaska, all of MN (US)

(73) Assignee: Roxio, Inc., Milpitas, CA (US)

(*) Notice: Subject to any disclaimer, the term of this patent is extended or adjusted under 35 U.S.C. 154(b) by 0 days.

(21) Appl. No.: 09/450,266

(22) Filed: Nov. 29, 1999

Related U.S. Application Data

(63) Continuation of application No. 09/105,733, filed on Jun. 26, 1998, now Pat. No. 6,016,553, which is a continuation-in-part of application No. 09/039,650, filed on Mar. 16, 1998, which is a continuation-in-part of application No. 08/924,198, filed on Sep. 5, 1997, now abandoned.

(51) Int. Cl.[7] .................................................. G06F 11/00
(52) U.S. Cl. ................................................................ 714/21
(58) Field of Search ............................. 714/6, 7, 13, 15, 714/20, 21; 711/114

(56) References Cited

U.S. PATENT DOCUMENTS

| 5,089,958 | 2/1992 | Horton et al. ...................... 395/575 |
| 5,297,258 | 3/1994 | Hale et al. . | |
| 5,325,519 | * 6/1994 | Long et al. ............................... 714/5 |
| 5,331,646 | 7/1994 | Krueger et al. ..................... 371/40.1 |
| 5,339,406 | 8/1994 | Carney et al. ....................... 395/575 |
| 5,381,545 | 1/1995 | Baker et al. ......................... 395/575 |
| 5,404,361 | * 4/1995 | Casorso et al. ....................... 714/52 |

(List continued on next page.)

FOREIGN PATENT DOCUMENTS

| 0751462 | 1/1997 | (EP) . |
| WO91/01026 | 1/1991 | (WO) . |
| WO96/12232 | 4/1996 | (WO) . |

OTHER PUBLICATIONS

"Tilios Secure Filing System—included in Applicants' application.", *Offered for Sale around 1987.*, 1 page.

Castelletto, et al., "DB2 for VSE & VM Archiving and Recovery", *IBM VSE/ESA*, 1–18 (1996).

Robinson, J.T., "Analysis of Steady–State segment storage utilizations in a log–structured file system with least–utilized segment cleaning", *IBM Research Division, T. J. Watson Research Center*, pp. 29–32.

(List continued on next page.)

*Primary Examiner*—James P. Trammell
*Assistant Examiner*—Pierre Eddy Elisca
(74) *Attorney, Agent, or Firm*—Martine Penilla & Kim, LLP

(57) ABSTRACT

A method and apparatus for reverting a disk drive to an earlier point in time is disclosed. Changes made to the drive are saved in a circular history buffer which includes the old data, the time it was replaced by new data, and the original location of the data. The circular history buffer may also be implemented by saving new data elements into new locations and leaving the old data elements in their original locations. References to the new data elements are mapped to the new location. The disk drive is reverted to an earlier point in time by replacing the new data elements with the original data elements retrieved from the history buffer, or in the case of the other embodiment, reads to the disk are mapped to the old data elements stilled stored in their original locations. The method and apparatus may be implemented as part of an operating system, or as a separate program, or in the controller for the disk drive. The method and apparatus are applicable to other forms of data storage as well. Also disclosed are method and apparatus for providing firewall protection to data in a data storage medium of a computer system.

23 Claims, 57 Drawing Sheets

U.S. PATENT DOCUMENTS

| | | | |
|---|---|---|---|
| 5,487,160 | 1/1996 | Bemis | 395/441 |
| 5,524,205 | 6/1996 | Lomet et al. | 395/182.14 |
| 5,557,770 | 9/1996 | Bhide et al. | |
| 5,598,528 * | 1/1997 | Larson et al. | 714/42 |
| 5,604,853 | 2/1997 | Nagashima | 395/803 |
| 5,604,862 | 2/1997 | Midgely et al. | 395/182.04 |
| 5,640,561 | 6/1997 | Satoh et al. | 395/618 |
| 5,659,747 | 8/1997 | Nakajima | 395/651 |
| 5,751,936 * | 5/1998 | Larson et al. | 714/36 |
| 5,802,264 * | 9/1998 | Chen et al. | 714/7 |
| 5,835,953 | 11/1998 | Ohran | 711/162 |

OTHER PUBLICATIONS

Green, R.J., et al., "Designing a Fast, On–line Backup System for a Log–structured File System", *Digital Technical Journal*, vol. 8, No. 2, pp. 32–45, (1996).

Hultgren, C.D., "Fault–tolerant personal computers safeguard critical applications", *I&CS Instruments and Control Systems*, vol. 65, No. 9 Radnor, PA, US, pp. 23–28, (Sep. 1992).

* cited by examiner

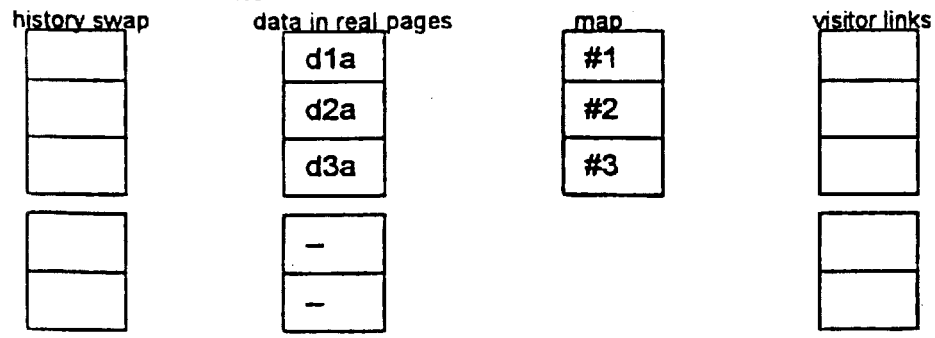
Figure 13A: Initial state
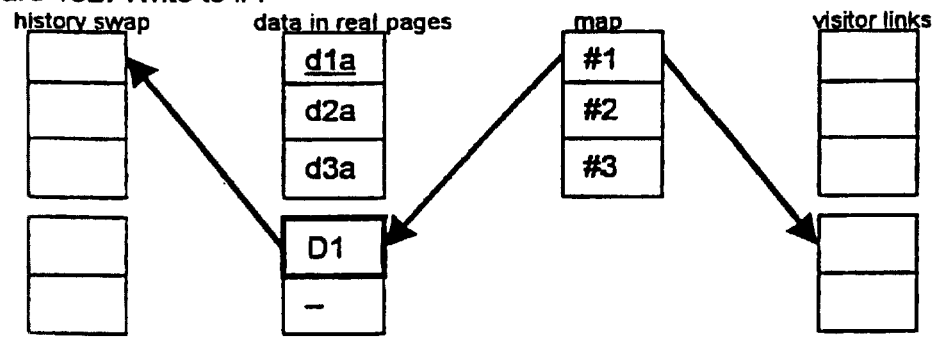
Figure 13B: Write to #1
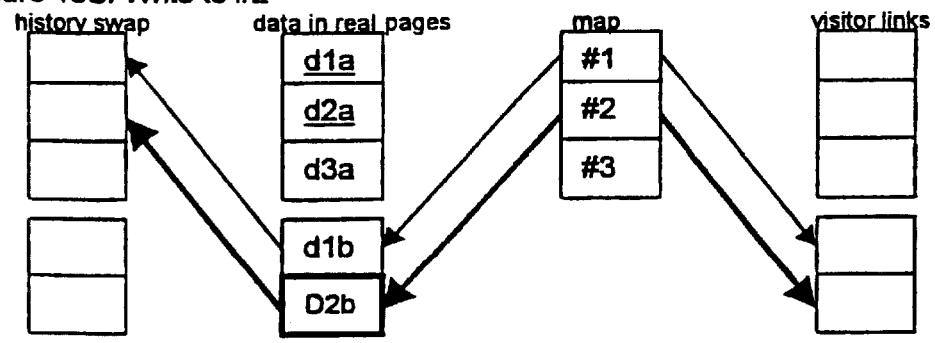
Figure 13C: Write to #2
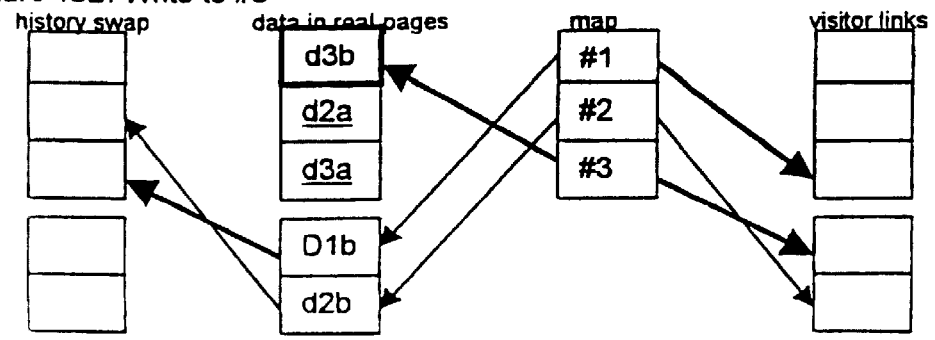
Figure 13D: Write to #3

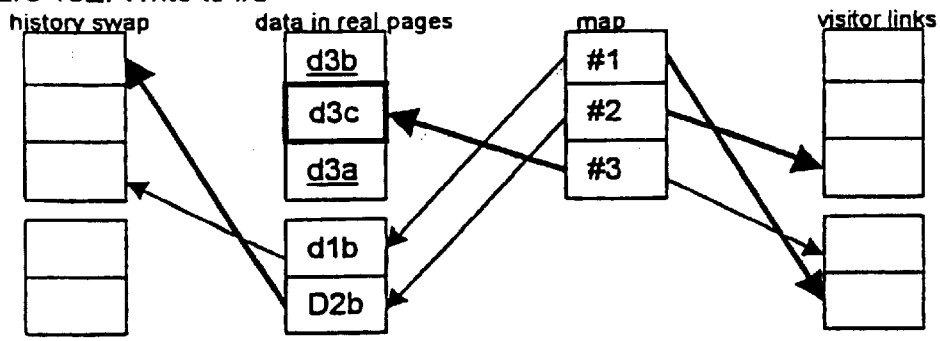
Figure 13E: Write to #3
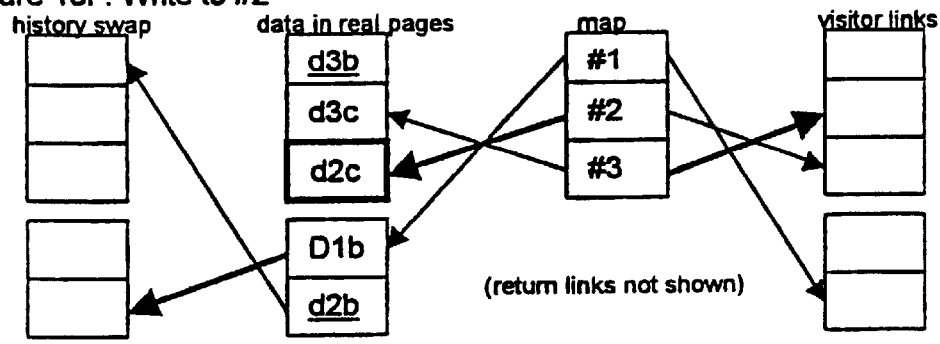
Figure 13F: Write to #2
(return links not shown)
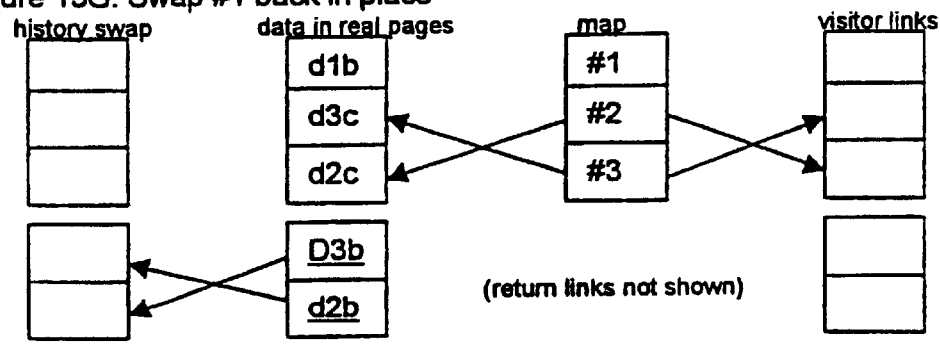
Figure 13G: Swap #1 back in place
(return links not shown)
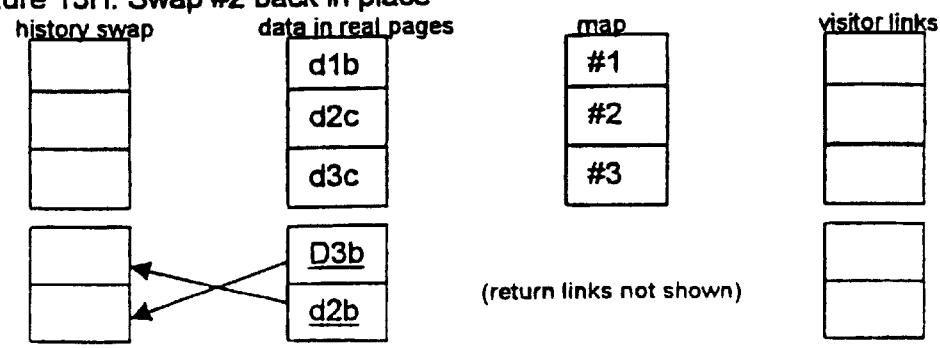
Figure 13H: Swap #2 back in place
(return links not shown)

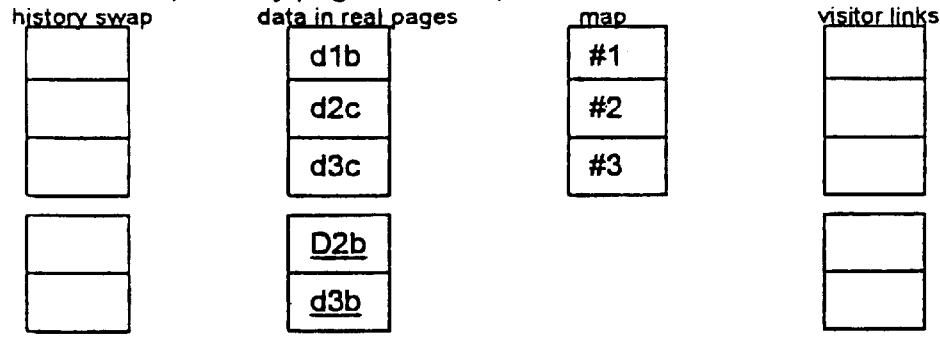
Figure 13I: Swap history pages back in place
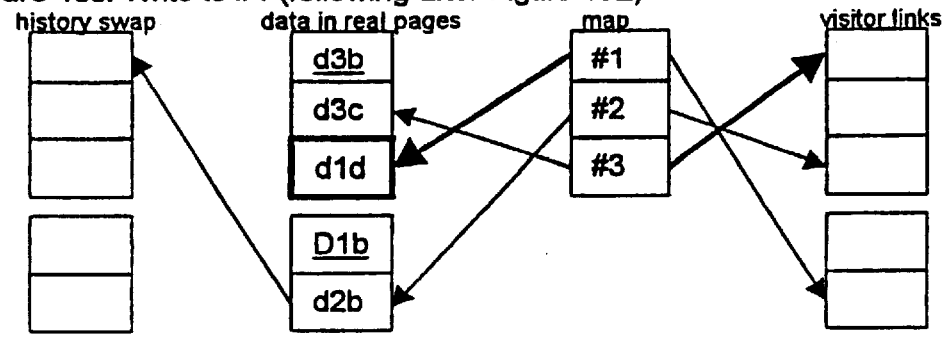
Figure 13J: Write to #1 (following after Figure 13E)
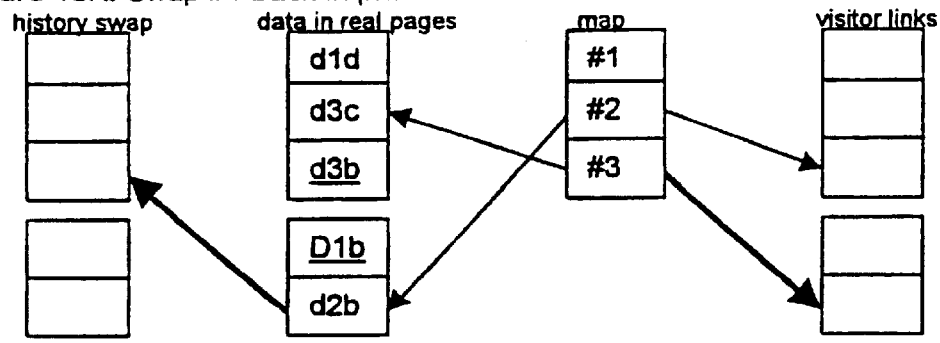
Figure 13K: Swap #1 back in place
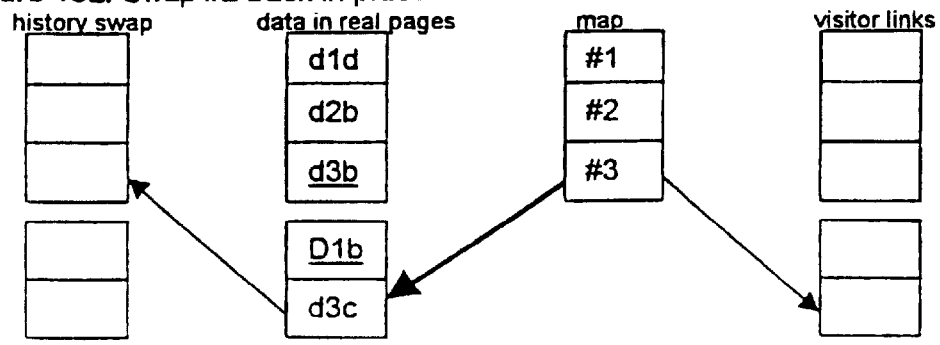
Figure 13L: Swap #2 back in place

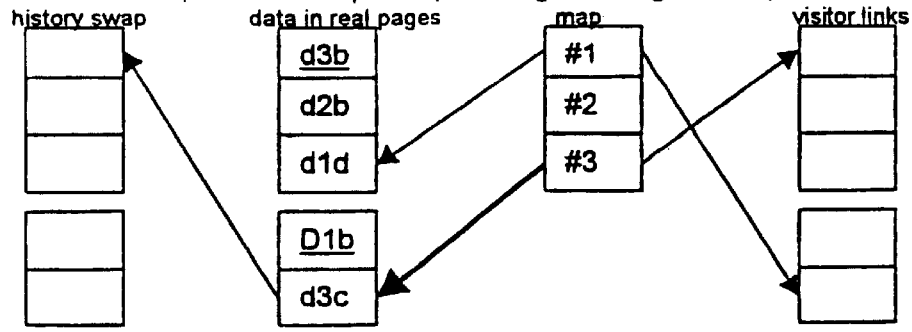
Figure 13M: Swap #2 back in place (following after Figure 13J)
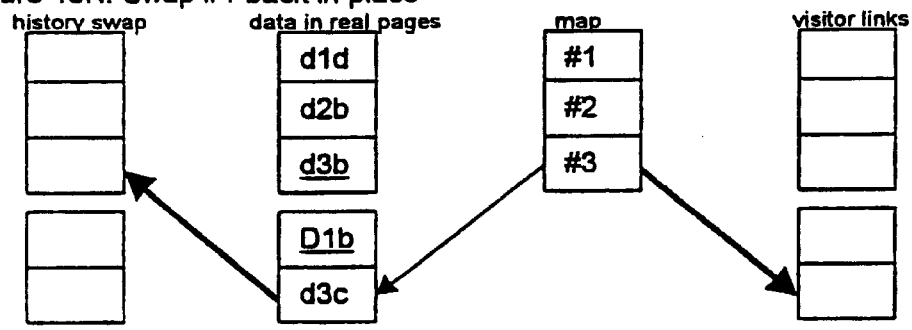
Figure 13N: Swap #1 back in place
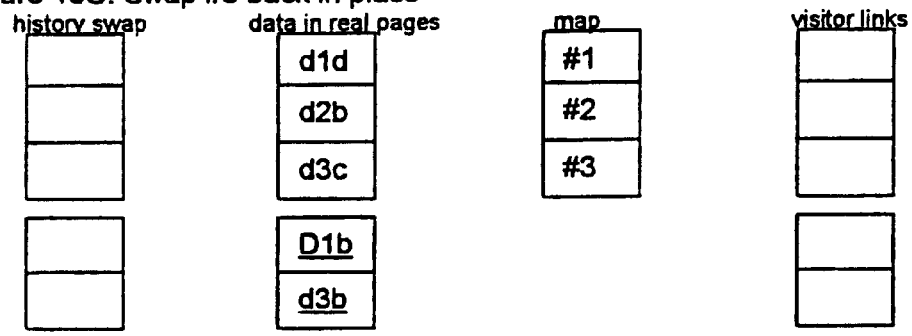
Figure 13O: Swap #3 back in place
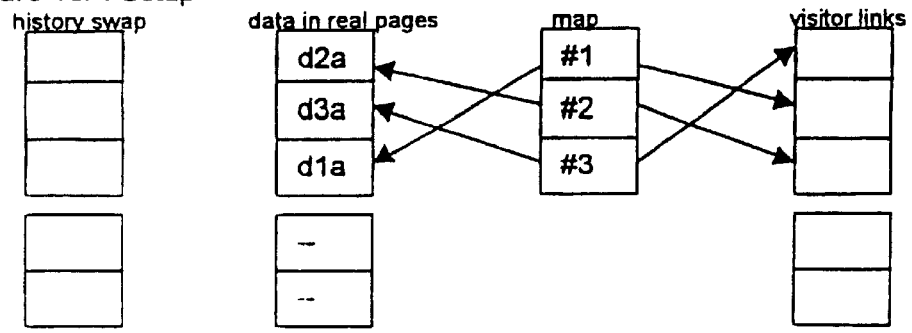
Figure 13P: Setup

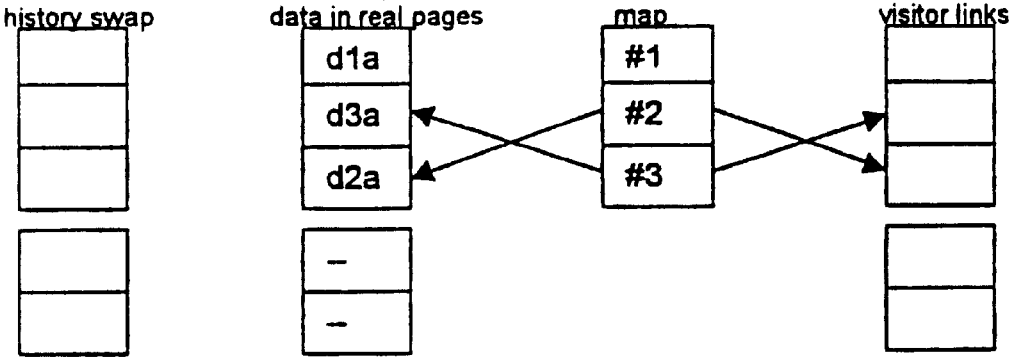
Figure 13Q: Swap #1 back in place
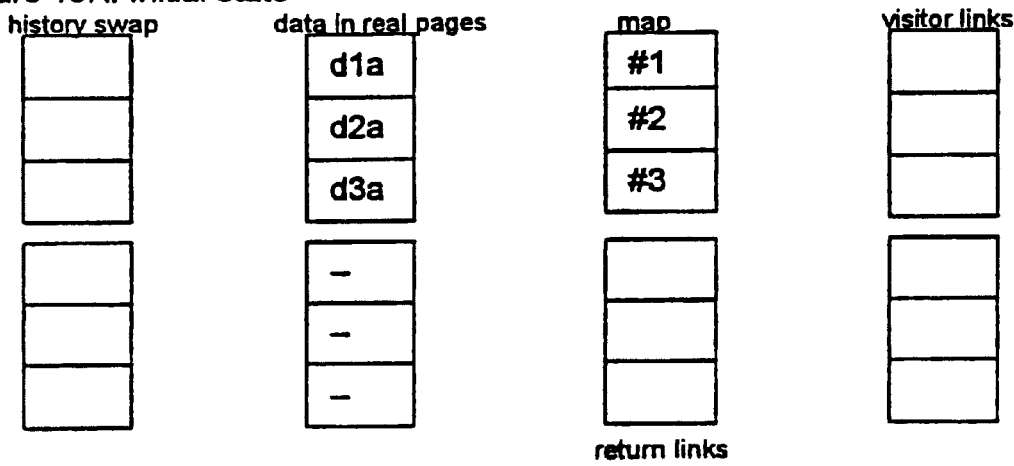
Figure 13R: Initial state
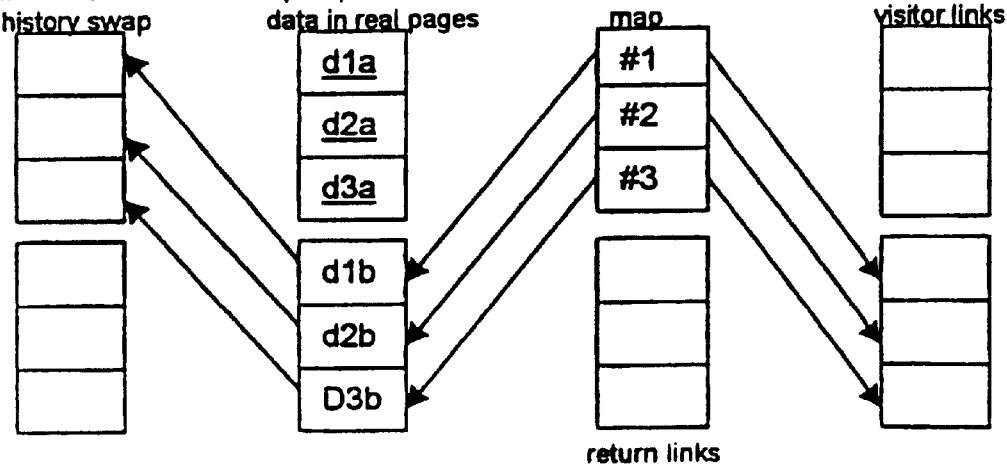
Figure 13S: Write to #1, #2, and #3

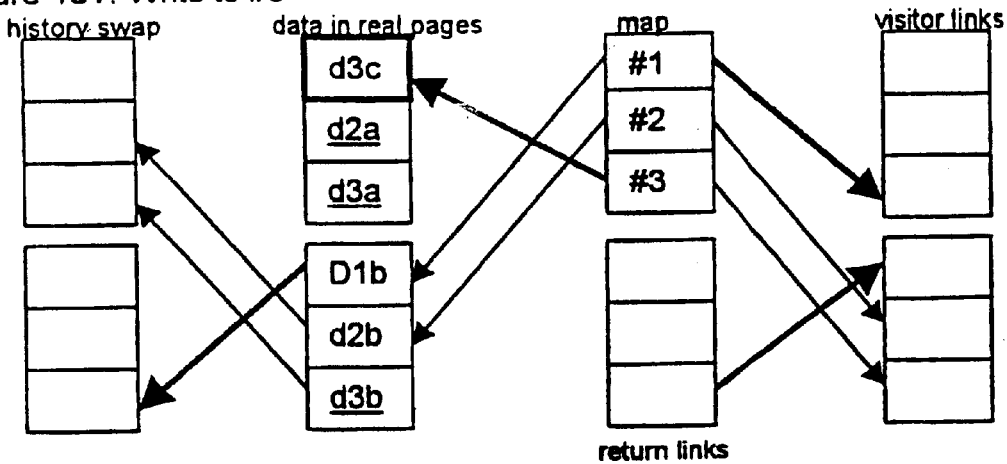
Figure 13T: Write to #3
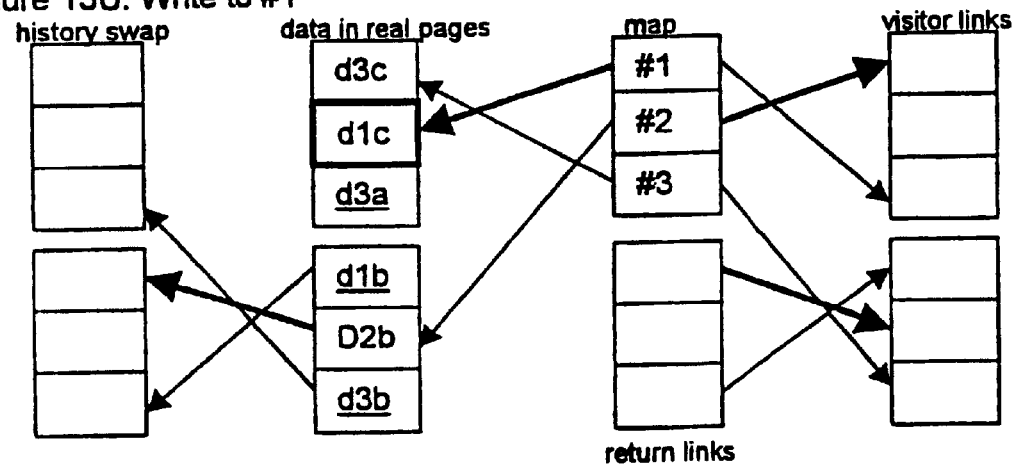
Figure 13U: Write to #1
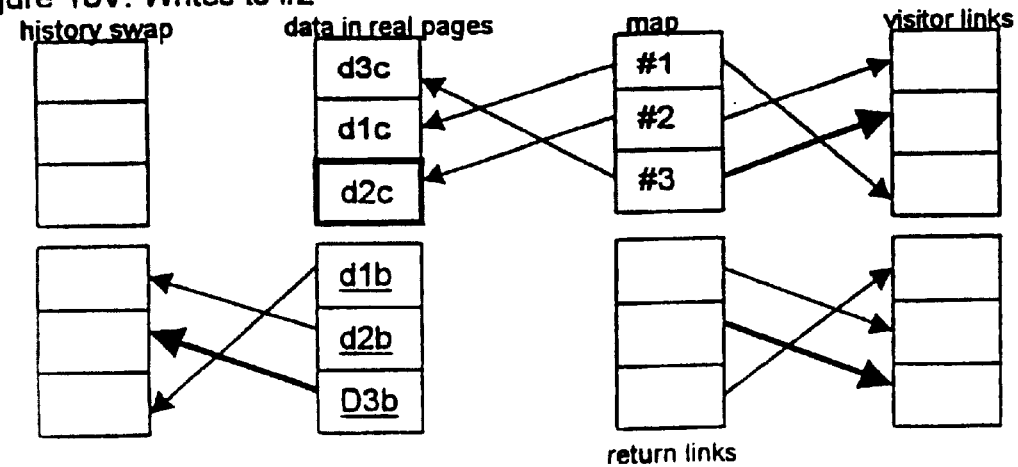
Figure 13V: Writes to #2

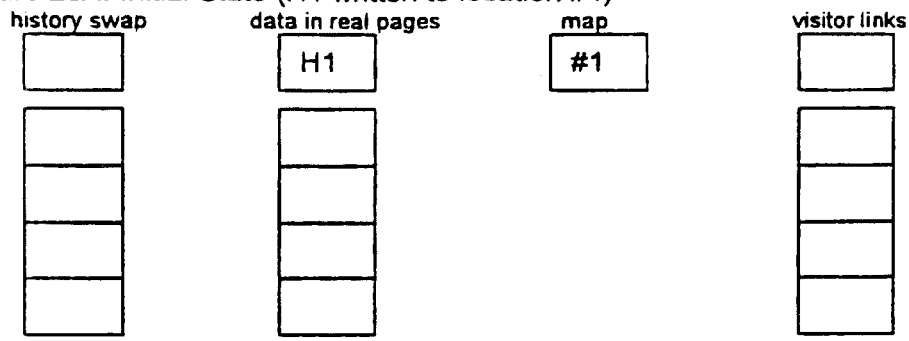
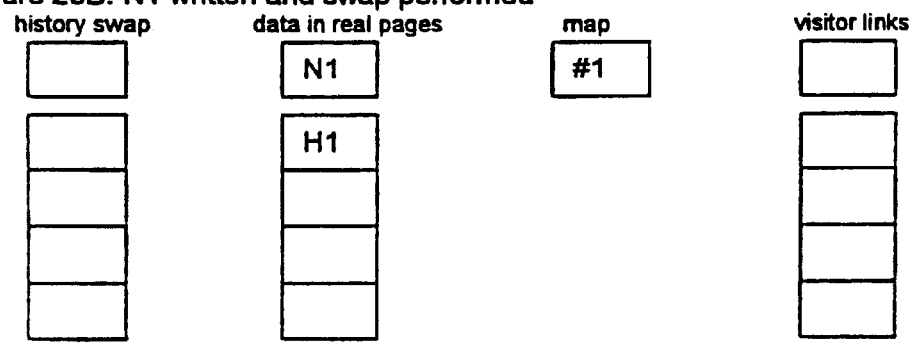
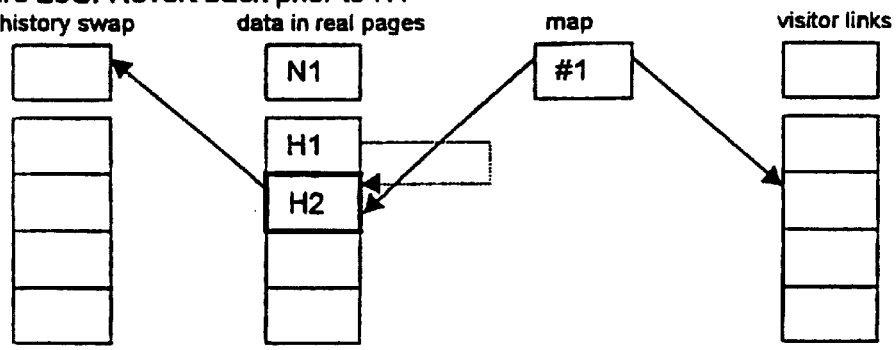
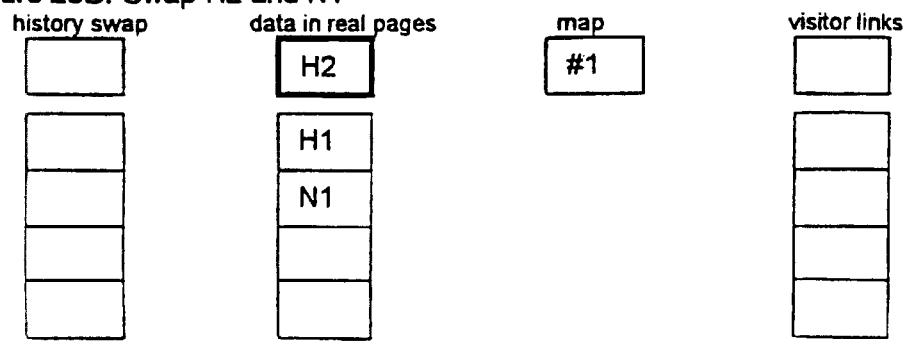

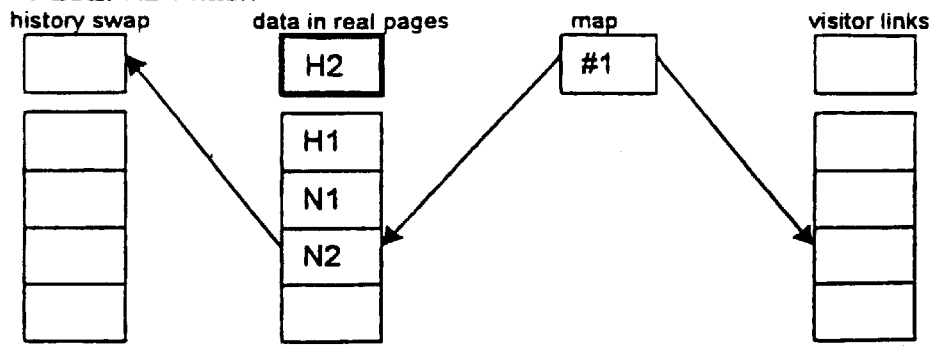
Figure 20E: N2 written
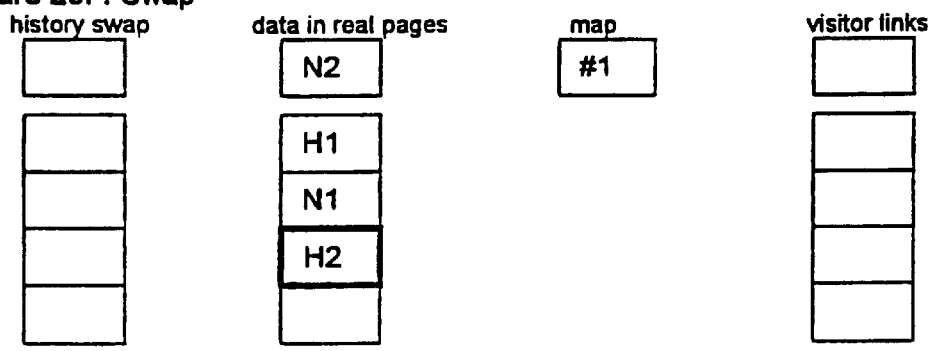
Figure 20F: Swap
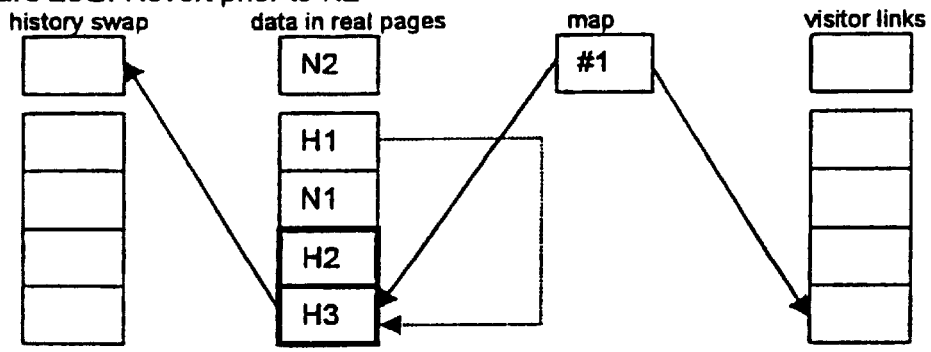
Figure 20G: Revert prior to N2
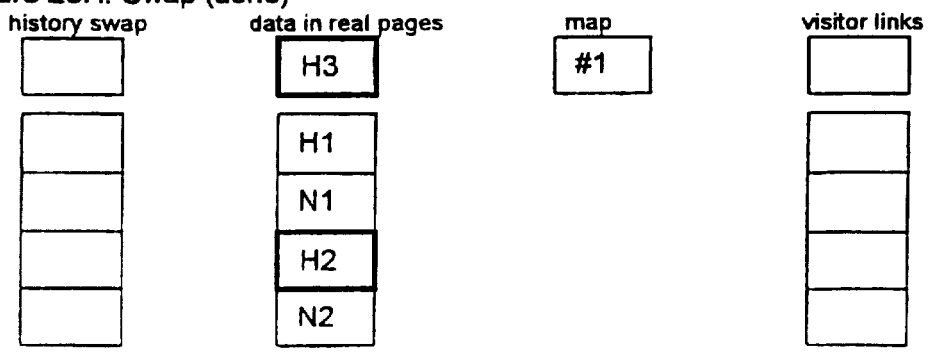
Figure 20H: Swap (done)

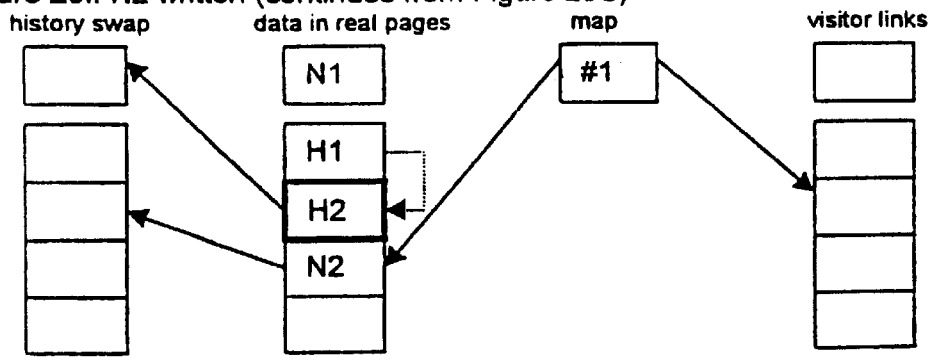
Figure 20I: N2 written (continues from Figure 20C)
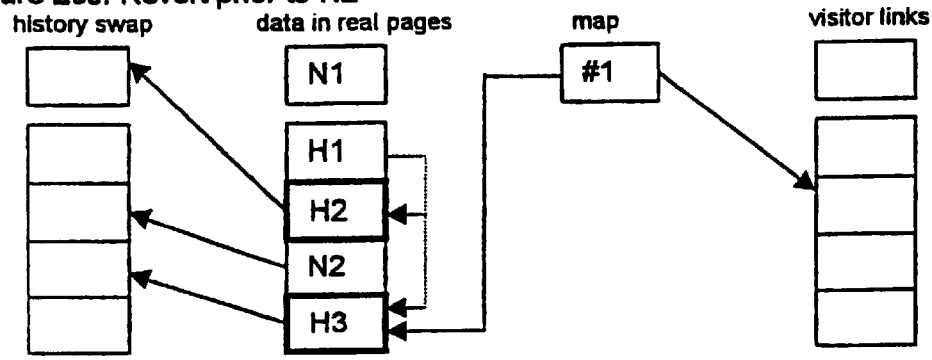
Figure 20J: Revert prior to N2
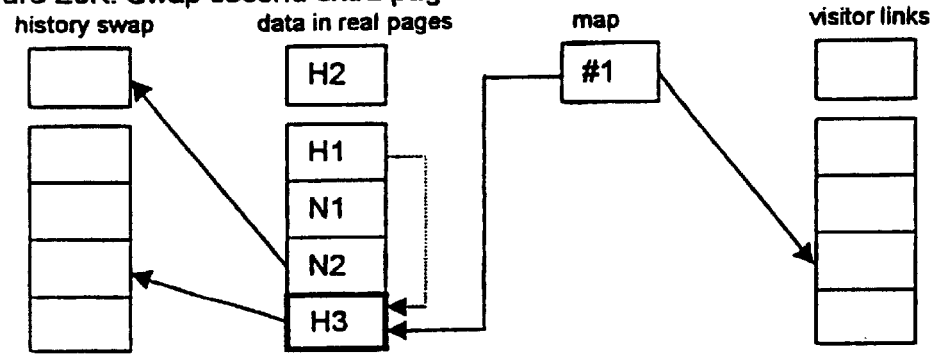
Figure 20K: Swap second extra page
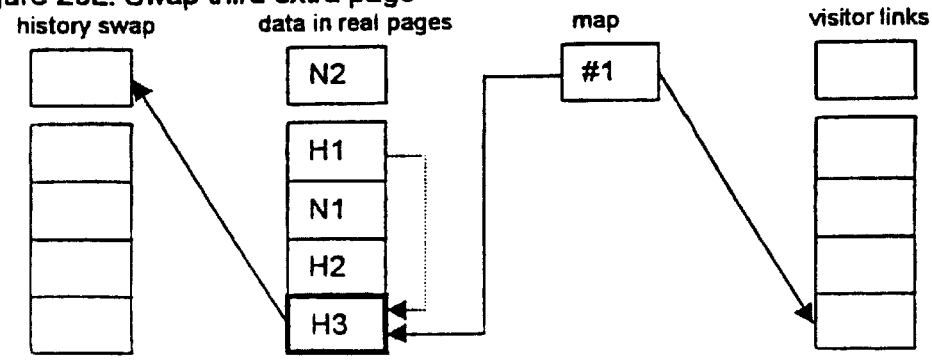
Figure 20L: Swap third extra page

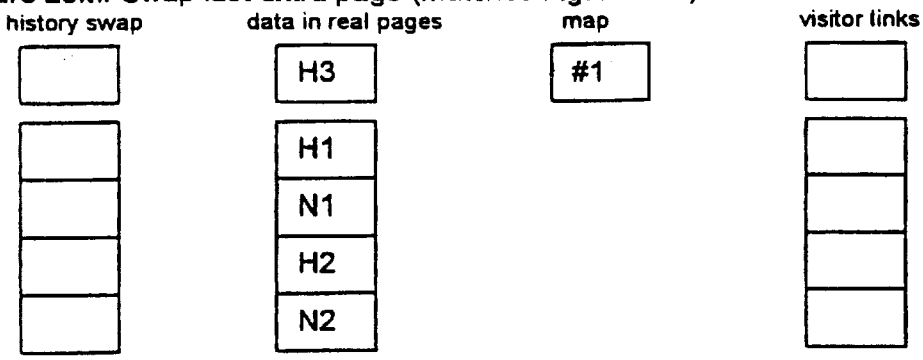
Figure 20M: Swap last extra page (matches Figure 20H)
Figure 21
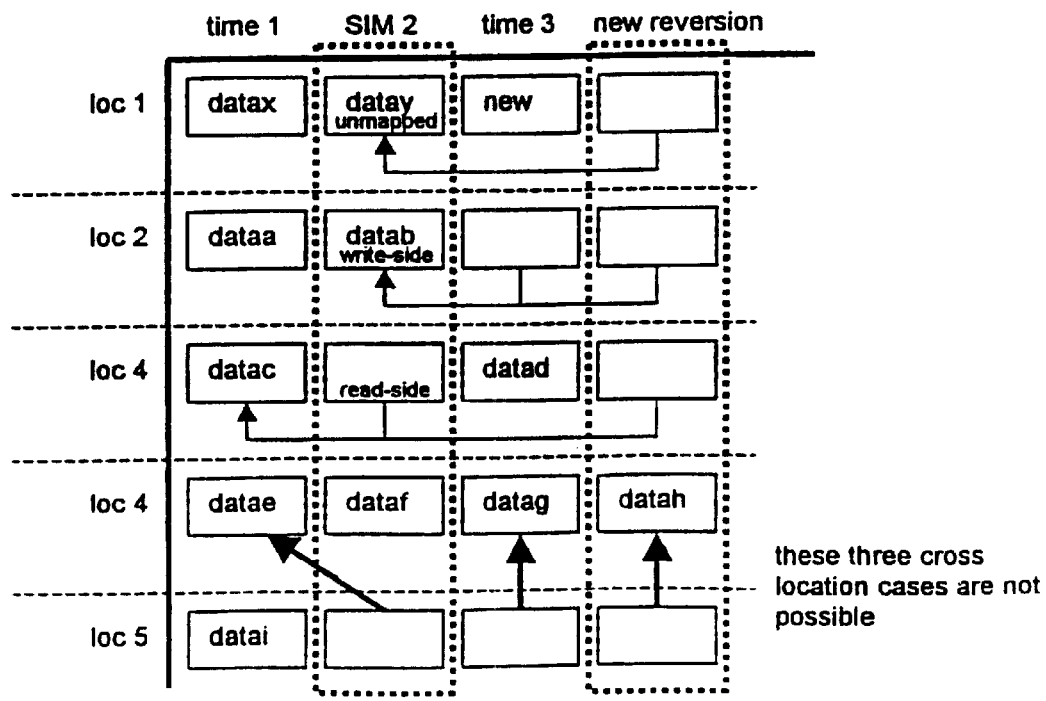
Figure 22

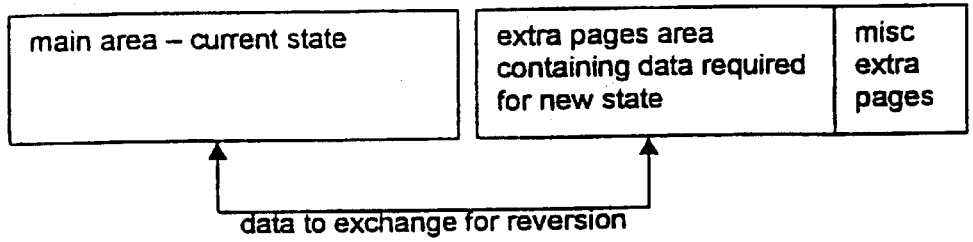
Figure 23
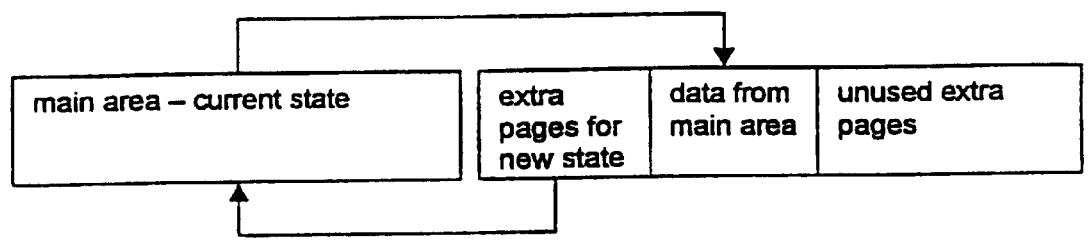
Figure 24
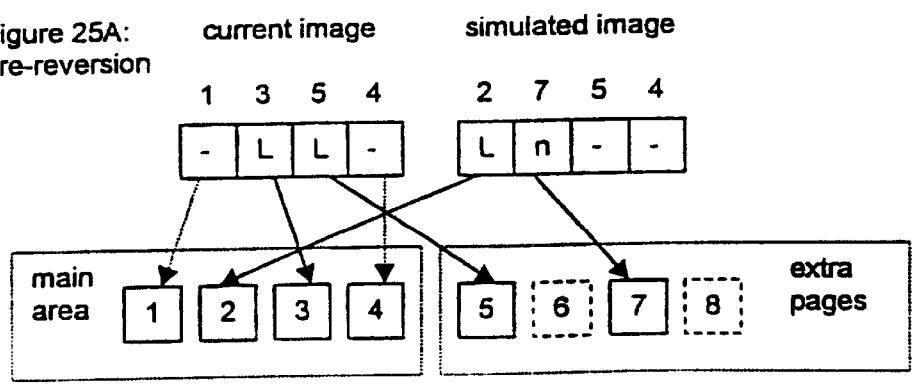
Figure 25A: pre-reversion

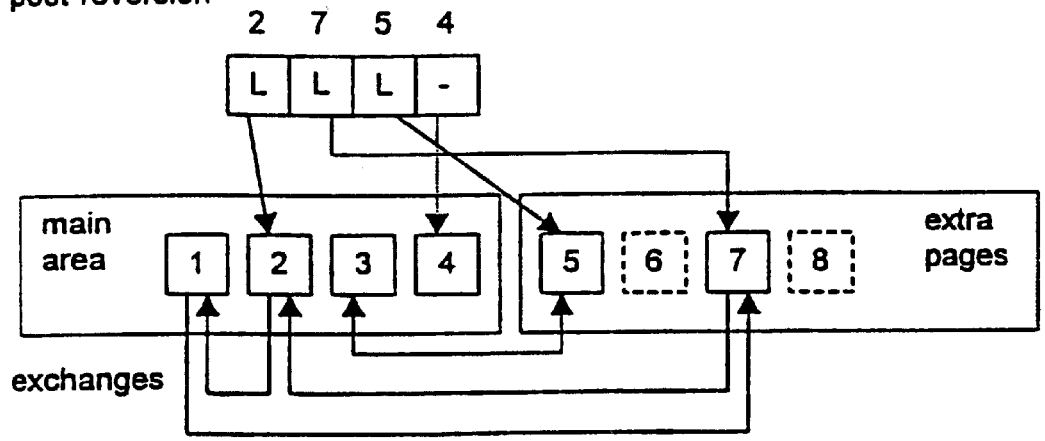
Figure 25B: post-reversion
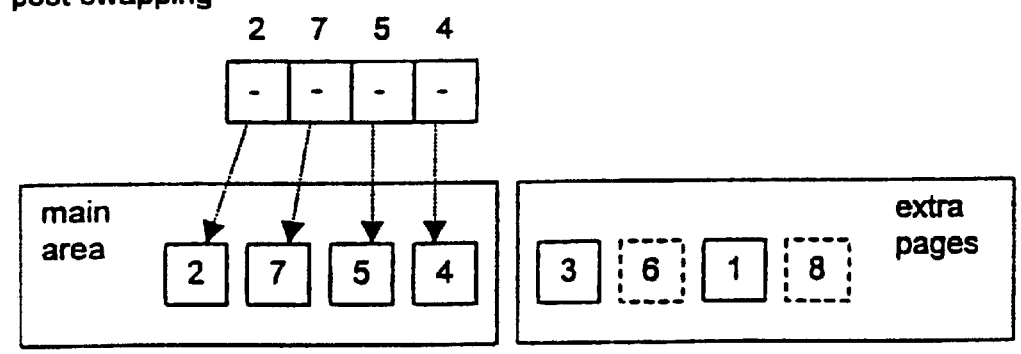
Figure 25C: post swapping
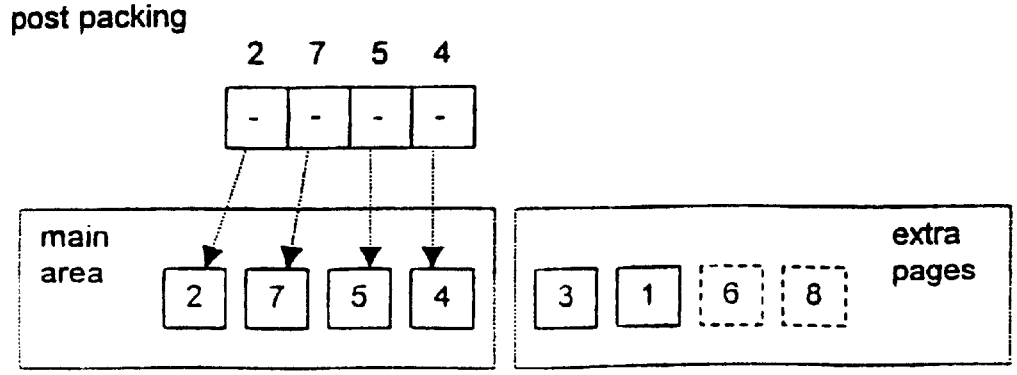
Figure 25D: post packing

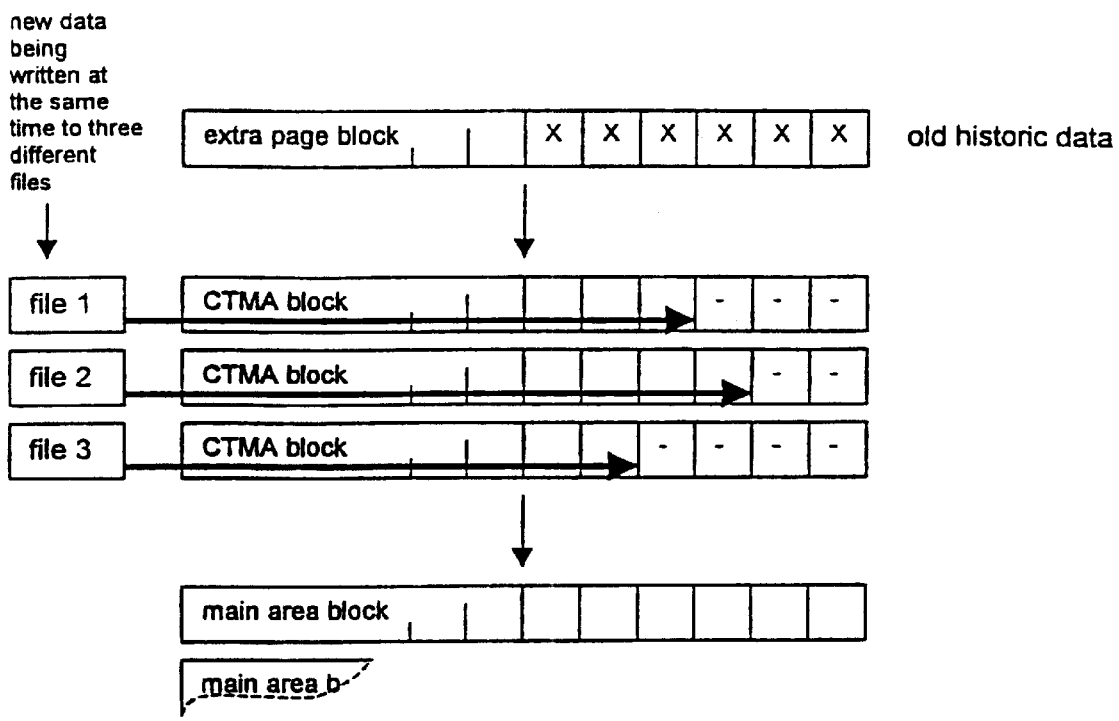
Figure 29
Overwrite in main area block, CTEX blocks at maximum
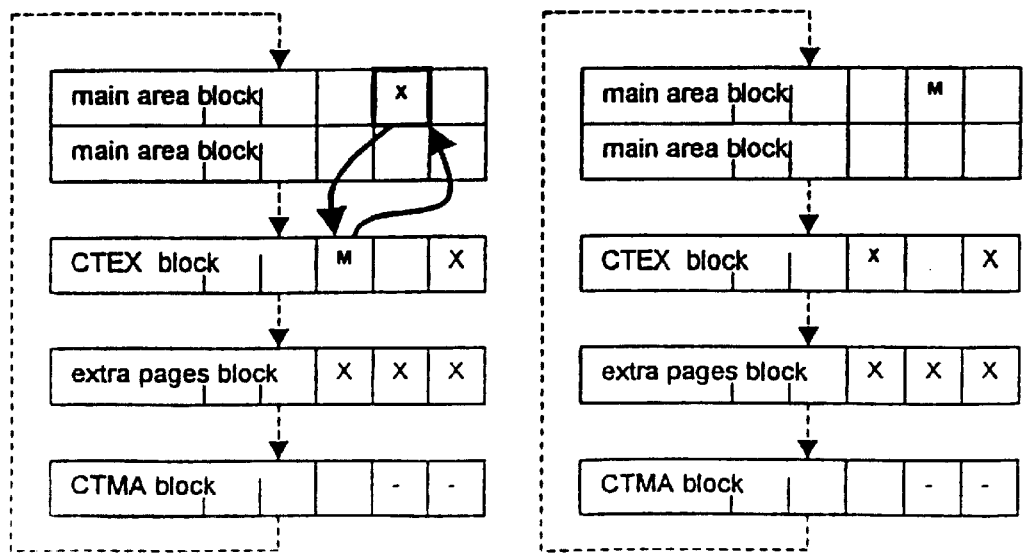
Figure 30 (before and after)

Overwrite in main area block, convert to CTEX block
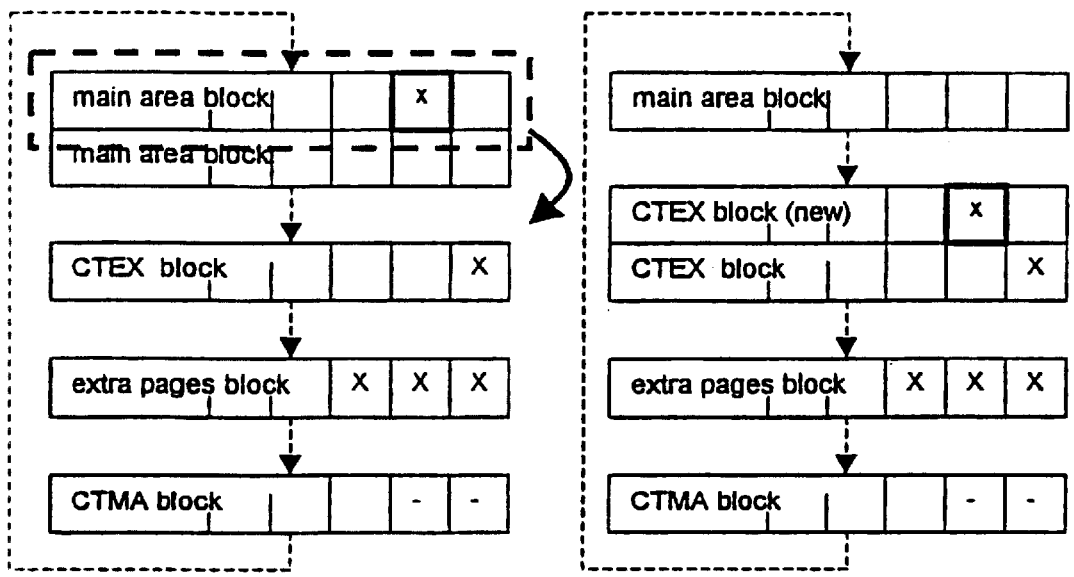
Figure 31 (before and after)
Overwrite in CTEX block
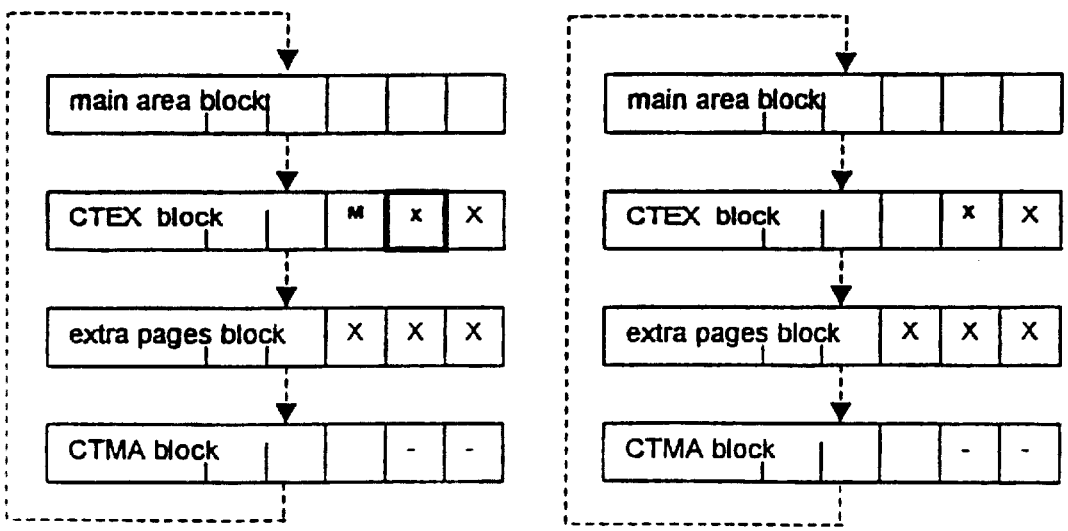
Figure 32 (before and after)

Overwrite in CTMA block
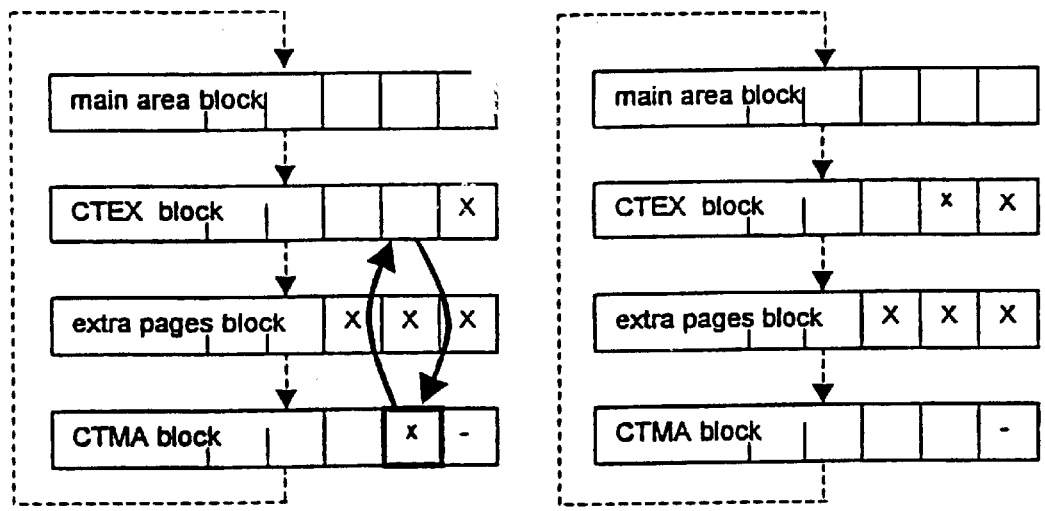
Figure 33 (before and after)
Concluding a Write Session
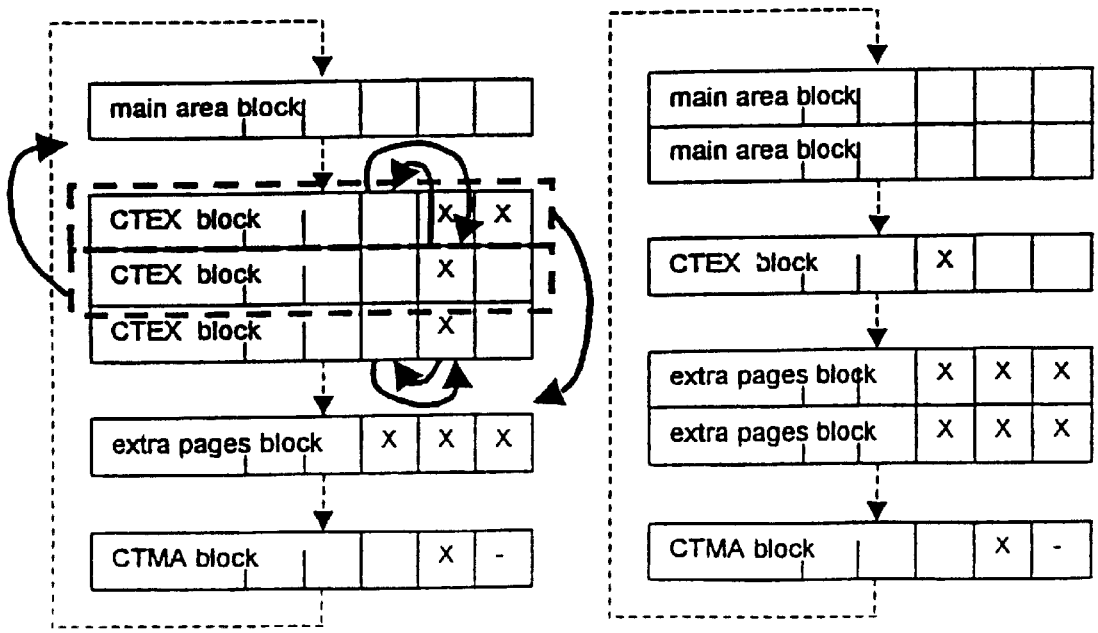
Figure 34 (before and after)

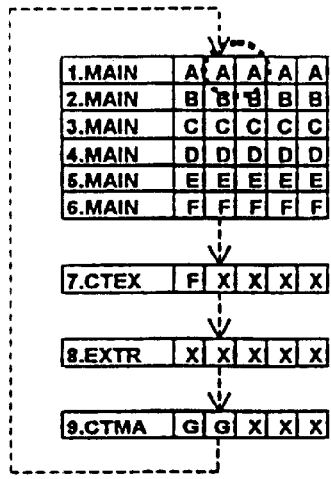 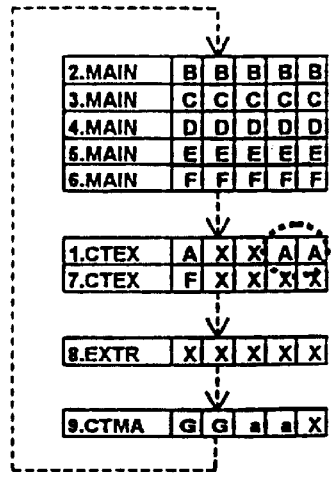 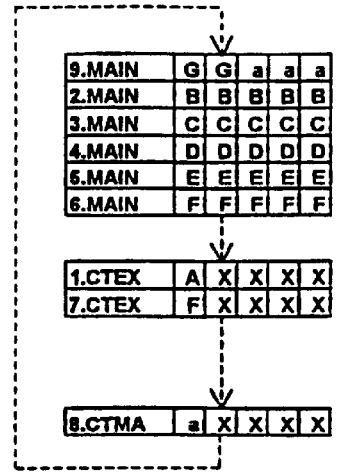
Figure 34A    Figure 34B    Figure 34C
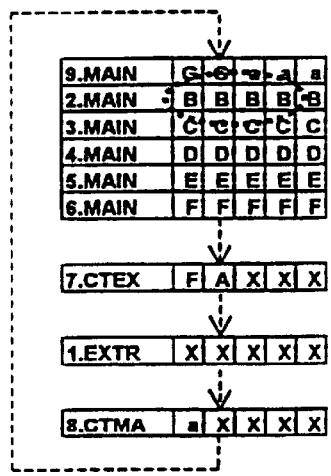 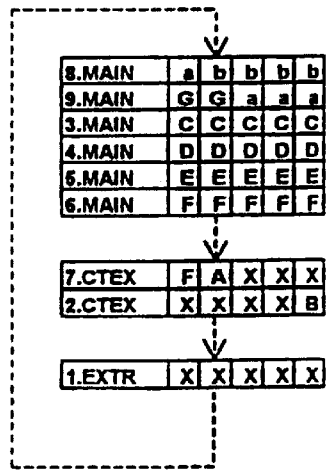 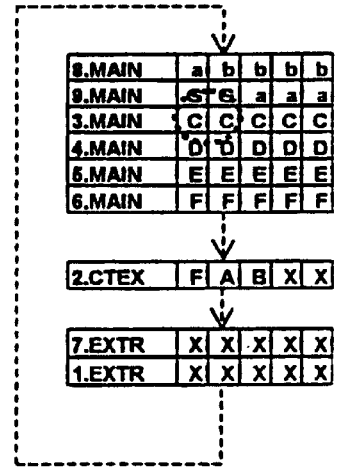
Figure 34D    Figure 34E    Figure 34F

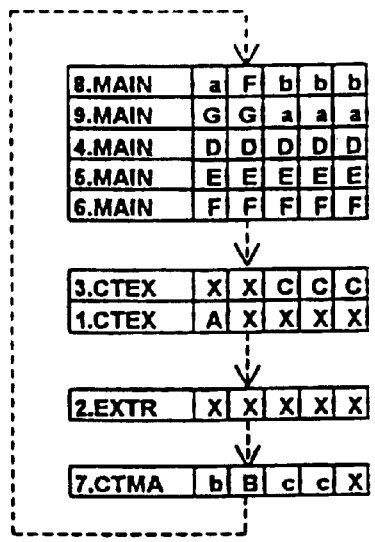
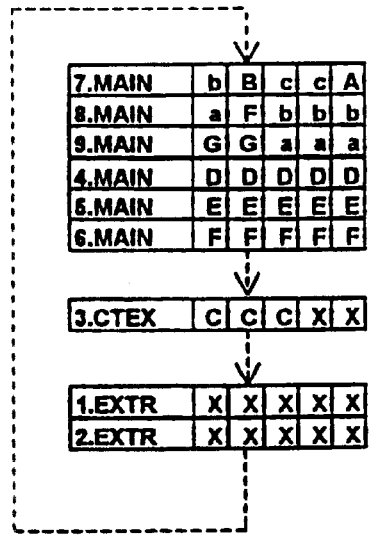
Figure 34M　　　　　　　Figure 34N
|  | A | B | C | D | E | F | G | a | b | c | X |
|---|---|---|---|---|---|---|---|---|---|---|---|
| from 34H | 1 | 1 | 3 | 5 | 5 | 5 | 2 | 4 | 4 | 2 | 12 |
| from 34N | 1 | 1 | 3 | 5 | 5 | 5 | 2 | 4 | 4 | 2 | 12 |
Figure 34O
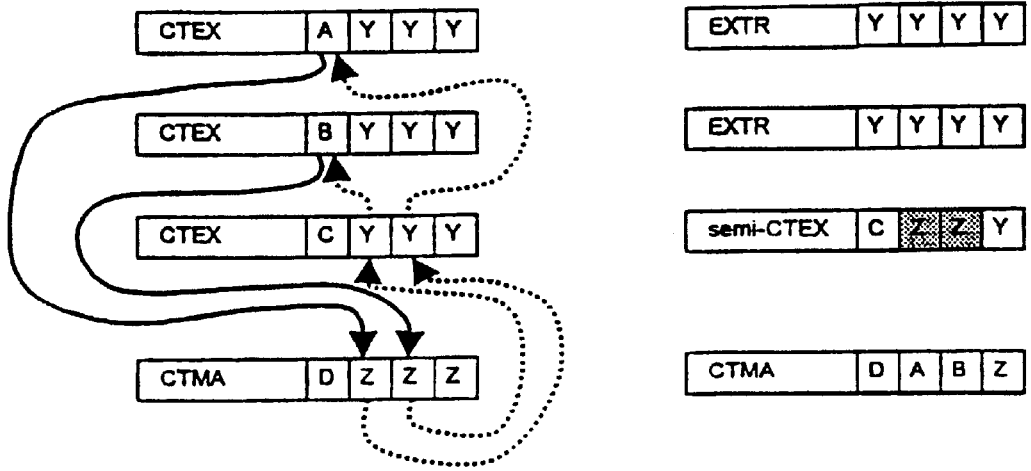
Figure 34P (before and after)

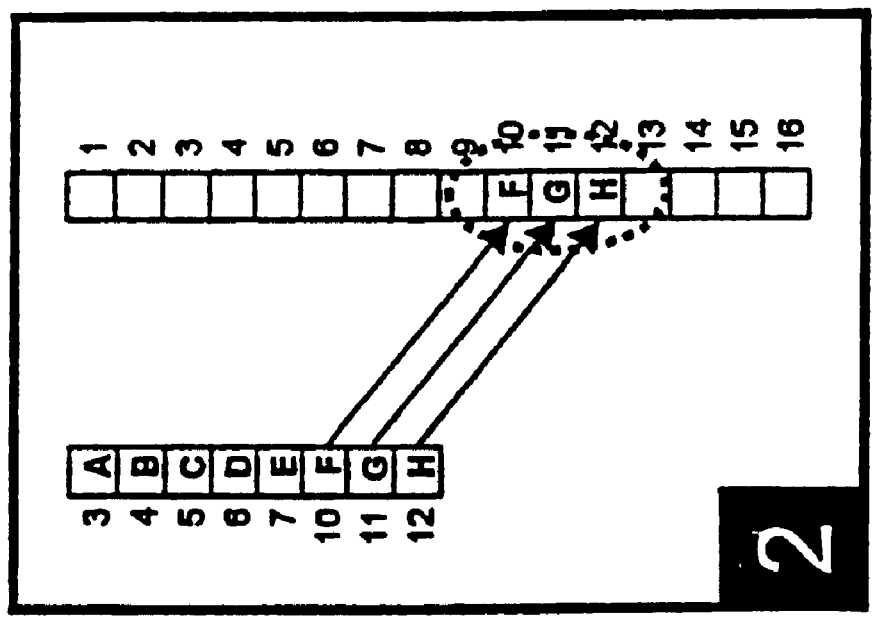
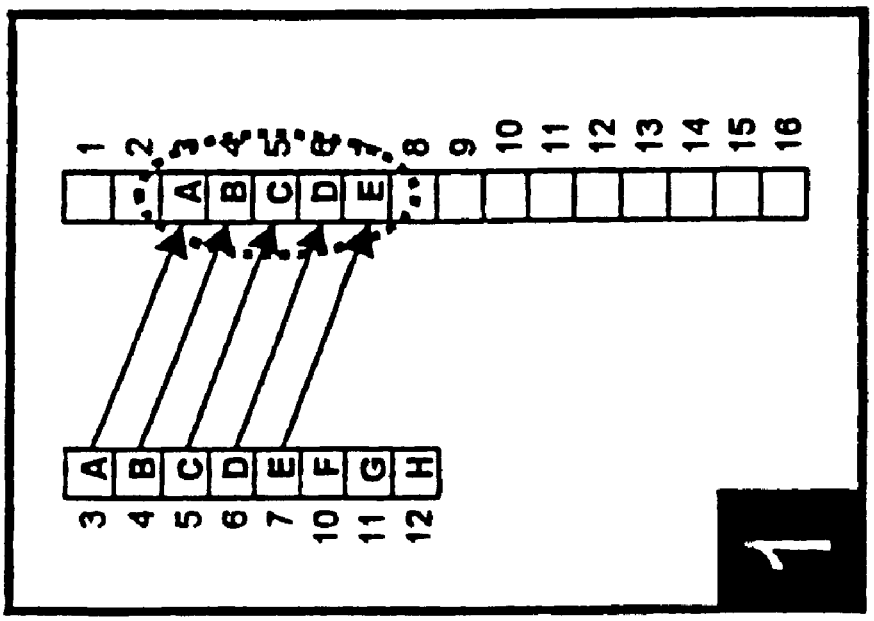
Figure 37

| swap.. D with G | swap... A with B | swap... J with K |
| --- | --- | --- |
| E with H | B with C | L with M |
| F with I | C with D | J with N |
| | | |
| read D, E, F, G, H, I | read A, B, C, D | read J, K, L, M, N |
| reorder in memory, write to swap area, and switch page | reorder in memory, write to swap area, and switch page | reorder in memory, write to swap area, and switch page |
| write G, H, I, D, E, F | write B, C, D, A | write N, M, J, L, K |
| clear swap handler request in switch page and update it, making the system stable | clear swap handler request in switch page and update it, making the system stable | clear swap handler request in switch page and update it, making the system stable |

Figure 43 swap A with B (#1), B with C (#2), and C with D (#3)

| processing.. | scan forward.. | track_loc.. |
| --- | --- | --- |
| A from #1 | | B |
| | B or C? yes | C |
| | C or D? yes | D's location final for A |
| | | |
| B from #1 | | A |
| | B or C? no | |
| | C or D? no | A's location final for B |
| | | |
| B from #2 | already tracked, skip | |
| | | |
| C from #2 | | B |
| | C or D? no | B's location final for C |
| | | |
| C from #3 | already tracked, skip | |
| | | |
| D from #3 | | C's location final for D | initial locations....

| A | B | C | D |
| --- | --- | --- | --- |
| B | C | D | A | final locations.....

Figure 44

```
i = start of write_data_order array          - READ DATA TO WRITE DATA REORDER
do
  if NOT write_data_order[i] then            - find out of order page (read data)

j = i                                    - cycle through closed loop
    hold_page1 = page[j]
    do
      nj = read_to_write[ j ]                - find where page j belongs (←1 in Fig. 49B)
      if write_data_order[ nj ] then fail    - since closed loop should only be read data
      hold_page2 = page[ nj ]
      page[ nj ] = hold_page1
      hold_page1 = hold_page2
      write_data_order[ nj ] = true
      j = nj
      if j <> i then repeat
    xdo                                      - all done (←2 in Fig. 49B)

xif
  i++
  if i <> end of write_data_order array+1 then repeat
xdo
```

Figure 49A

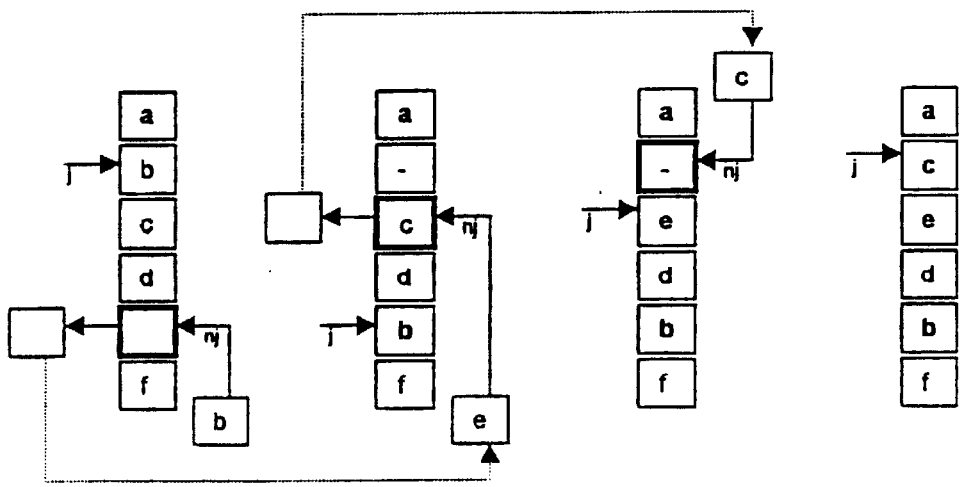

Figure 49B

| i | j | | | | | | | | | | | h1 | nj | | | | | | | | | | data (read→write) | | | | | | | | | | write_data_order | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 0 | | | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | |
| | 5 | 1 | 2 | 3 | 4 | 0 | 8 | 6 | 7 | 9 | | | 5 | 1 | 2 | 3 | 4 | 0 | 8 | 6 | 7 | 9 | A | B | E | F | G | H | K | A | A | H | 0 | 0 | 0 | 0 | 0 | 0 | 0 | 0 | 0 | 0 | |
| 1 | 5 | 1 | 2 | 3 | 4 | 0 | 8 | 6 | 7 | 9 | A | | 5 | 1 | 2 | 3 | 4 | 0 | 8 | 6 | 7 | 9 | A | B | E | F | G | H | K | A | A | H | 0 | 0 | 0 | 0 | 0 | 0 | 0 | 0 | 0 | 0 | ←1 |
| | 5 | 1 | 2 | 3 | 4 | 0 | 8 | 6 | 7 | 9 | G | | 5 | 1 | 2 | 3 | 4 | 0 | 8 | 6 | 7 | 9 | A | B | E | F | A | H | K | A | A | H | 0 | 0 | 0 | 0 | 1 | 0 | 0 | 0 | 0 | 0 | |
| | 5 | 1 | 2 | 3 | 4 | 0 | 8 | 6 | 7 | 9 | F | | 5 | 1 | 2 | 3 | 4 | 0 | 8 | 6 | 7 | 9 | A | B | E | G | A | H | K | A | A | H | 0 | 0 | 0 | 1 | 1 | 0 | 0 | 0 | 0 | 0 | |
| | 5 | 1 | 2 | 3 | 4 | 0 | 8 | 6 | 7 | 9 | E | | 5 | 1 | 2 | 3 | 4 | 0 | 8 | 6 | 7 | 9 | A | B | F | G | A | H | K | A | A | H | 0 | 0 | 1 | 1 | 1 | 0 | 0 | 0 | 0 | 0 | |
| | 5 | 1 | 2 | 3 | 4 | 0 | 8 | 6 | 7 | 9 | B | | 5 | 1 | 2 | 3 | 4 | 0 | 8 | 6 | 7 | 9 | A | E | F | G | A | H | K | A | A | H | 0 | 1 | 1 | 1 | 1 | 0 | 0 | 0 | 0 | 0 | |
| | | | | | | | | | | | | | | | | | | | | | | | B | E | F | G | A | H | K | A | A | H | 1 | 1 | 1 | 1 | 1 | 0 | 0 | 0 | 0 | 0 | ←2 |
| 2 | | | | | | | | | | | | | | | | | | | | | | | | | | | | | | | | | | | | | | | | | | | |
| 3 | | | | | | | | | | | | | | | | | | | | | | | | | | | | | | | | | | | | | | | | | | | |
| 4 | | | | | | | | | | | | | | | | | | | | | | | | | | | | | | | | | | | | | | | | | | | |
| 5 | | | | | | | | | | | | | | | | | | | | | | | | | | | | | | | | | | | | | | | | | | | |
| 6 | 5 | 1 | 2 | 3 | 4 | 0 | 8 | 6 | 7 | 9 | H | | 5 | 1 | 2 | 3 | 4 | 0 | 8 | 6 | 7 | 9 | B | E | F | G | A | H | K | A | A | H | 1 | 1 | 1 | 1 | 1 | 0 | 0 | 0 | 0 | 0 | |
| | 5 | 1 | 2 | 3 | 4 | 0 | 8 | 6 | 7 | 9 | H | | 5 | 1 | 2 | 3 | 4 | 0 | 8 | 6 | 7 | 9 | B | E | F | G | A | H | K | A | A | H | 1 | 1 | 1 | 1 | 1 | 0 | 0 | 0 | 0 | 1 | |
| | 5 | 1 | 2 | 3 | 4 | 0 | 8 | 6 | 7 | 9 | A | | 5 | 1 | 2 | 3 | 4 | 0 | 8 | 6 | 7 | 9 | B | E | F | G | A | H | K | A | B | H | 1 | 1 | 1 | 1 | 1 | 0 | 0 | 0 | 1 | 1 | |
| | 5 | 1 | 2 | 3 | 4 | 0 | 8 | 6 | 7 | 9 | K | | 5 | 1 | 2 | 3 | 4 | 0 | 8 | 6 | 7 | 9 | B | E | F | G | A | H | A | A | H | H | 1 | 1 | 1 | 1 | 1 | 0 | 1 | 0 | 1 | 1 | |
| | 5 | 1 | 2 | 3 | 4 | 0 | 8 | 6 | 7 | 9 | A | | 5 | 1 | 2 | 3 | 4 | 0 | 8 | 6 | 7 | 9 | B | E | F | G | A | H | A | K | H | H | 1 | 1 | 1 | 1 | 1 | 0 | 1 | 1 | 1 | 1 | |
| | | | | | | | | | | | | | | | | | | | | | | | B | E | F | G | A | A | A | K | H | H | 1 | 1 | 1 | 1 | 1 | 1 | 1 | 1 | 1 | 1 | |
| 7 | | | | | | | | | | | | | | | | | | | | | | | | | | | | | | | | | | | | | | | | | | | |
| 8 | | | | | | | | | | | | | | | | | | | | | | | | | | | | | | | | | | | | | | | | | | | |
| 9 | | | | | | | | | | | | | | | | | | | | | | | | | | | | | | | | | | | | | | | | | | | |
| 10 | | | | | | | | | | | | | | | | | | | | | | | | | | | | | | | | | | | | | | | | | | | |

Figure 50

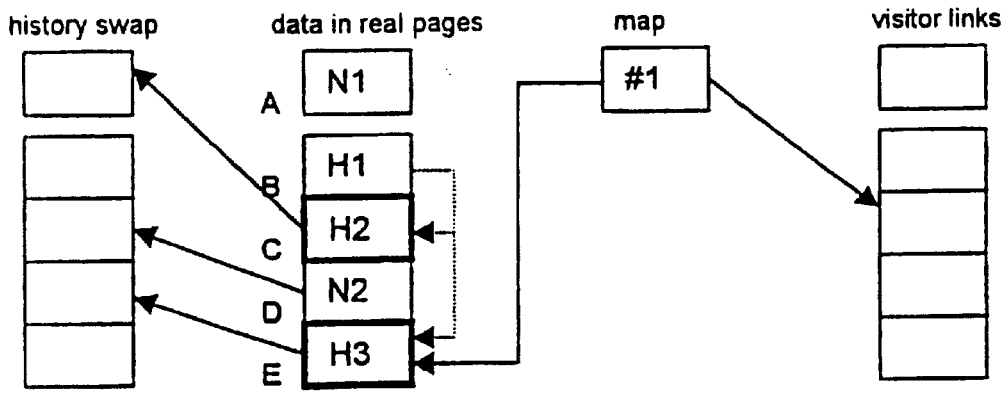
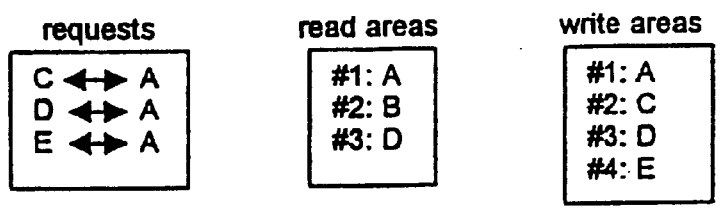
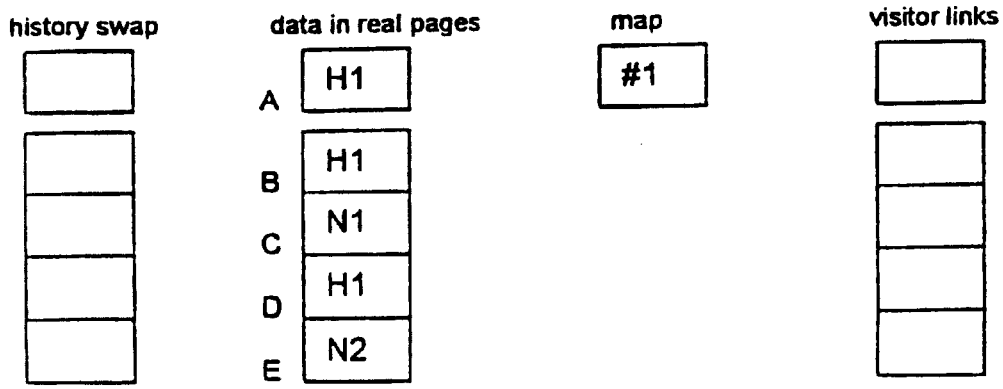
Figure 51

METHOD SOFTWARE AND APPARATUS FOR SAVING USING AND RECOVERING DATA

This application is a Continuation of application Ser. No. 09/105,733, filed Jun. 26, 1998, now U.S. Pat. No. 6,016,553, which is a Continuation-in-Part of application Ser. No. 09/039,650, filed Mar. 16, 1998, which is a Continuation-in-Part of application Ser. No. 08/924,198, filed Sep. 5, 1997 (now abandoned), which applications are made a part hereof.

Continuation Data

This application is a continuation-in-part of U.S. application Ser. No. 09/039,650, filed Mar. 16, 1998 and entitled "Method, Software And Apparatus For Saving, Using And Recovering Data", which is a continuation in part of Ser. No. 08/924,198, filed Sep. 5, 1997 entitled "Method and Apparatus for Saving and Recovering Data", the entire disclosures of which are hereby incorporated by reference herein.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawing hereto: Copyright© 1998, Wild File, Inc. All Rights Reserved.

TECHNICAL FIELD OF THE INVENTION

The present invention pertains generally to the storage of digital data, and more particularly to method and apparatus for the backup and recovery of data stored by a digital computer.

BACKGROUND OF THE INVENTION

The applications that run on computers typically operate under an operating system (OS) that has the responsibility, among other things, to save and recall information from a hard disk The information is typically organized in files. The OS maintains a method of mapping between a file and the associated locations on a hard disk at which the file's information is kept. storage. Periodically a backup (copy) is typically made of the disk to address two types of problems: First, the disk itself physically fails making the information it had contained inaccessible. Second, if the information on disk changes and it is determined the original state was desired, a user uses the backup to recover this original state. Backups can be made to the same disk or to an alternate media (disk, tape drive, etc.).

The present invention provides a method and apparatus for information recovery focusing, in one example embodiment, on the second situation not involving a physical disk failure, but where information is altered and access to its original state may be desired. Some typical examples would be: a computer system "crashing" during an update of a piece of information, thus leaving it in neither the original or "new" state, the user changing information only later to desire to restore (or just reference) the original state, a computer virus altering information, or a file being deleted accidentally.

The following are established backup methods and systems:

1. Tape Backup
2. Optical Disk Backup (WORM)
3. RAID Systems
4. Tilios Secure Filing System
5. File Copies Tape backup traditionally involves duplicating a disk's contents, either organized as files or a disk sector image, onto a magnetic tape. Such a tape is typically removable and therefore can be stored off-site to provide recovery due to a disk drive malfunction or even to an entire site (including the disk drive) being destroyed, for example, in a fire.

When information is copied from a disk to tape in the form of a sector level disk image (i.e., the information is organized on the tape in the same manner as on the disk), a restoration works most efficiently to an identical disk drive. The reason for such an organization is speed. Reading the disk sequentially from start to end is much faster than jumping around on the disk reading each file one at a time. This is because often a file is not stored continuously in one area of the disk, but may be spread out and intermixed with other files across the entire disk. When information is copied one file at a time to a tape it is possible to efficiently restore one or more files to a disk that may be both different and already containing data (i.e., when restoring a saved disk image all prior data on a disk is overwritten).

Tape backup focuses on backing up an entire disk or specific files at a given moment in time. Typically the process will take a long time and is thus done infrequently (e.g., in the evening). Incremental backups involve only saving data that has changed since the last backup, thus reducing the amount of tape and backup time required. However, a fill system recovery requires that the initial full system backup and all subsequent incremental backups be read and combined in order to restore to the time of the last incremental backup.

The key shortcoming of tape backup is that you may not have performed a recent backup and therefore may lose the information or work that was subsequently generated. The present invention addresses this problem by employing a new method of saving changing disk information states providing for a continuously running disk backup system. This method could be implemented on a tape drive, as a tape drive does share the basic random read and write abilities of a disk drive. However, it would not be practical for the same reasons a tape drive when used as a disk is generally not very effective: extremely slow random access times.

Write-once optical disk backup as performed by a WORM drive has many of the same qualities as tape backup. However, because of the technology involved, it is not possible to overwrite data. Therefore it provides some measure of a legal "accounting" system for unalterable backups. WORM drives cannot provide continuous backup of changing disk information because eventually they will fill.

A RAID system is a collection of drives which collectively act as a single storage system, which can tolerate the failure of a drive without losing data, and which can operate independently of each other. The two key techniques involved in RAID are striping and mirroring. Striping has data split across drives, resulting in higher data throughput. Mirroring provides redundancy by duplicating all data from one drive on another drive. No data is lost if only one drive fails, since the other has another copy.

RAID systems are concerned with speed and data redundancy as a form of backup against physical drive failures. They do not address reverting back in time to retrieve information that has since changed. Therefore RAID is not relevant to the present invention other than being an option to use in conjunction with the present invention to provide means for recovery from both physical disk drive failures as well as undesired changes.

The Tilios Operating System was developed several years ago by the assignee hereof. It provided for securing a disk's state and then allowing the user to continue on and modify it. The operating system maintained both the secured and current states. Logging of keystrokes was performed so that in the event of a crash, where the current state is lost or becomes invalid, the disk could easily revert to its secured state and the log replayed. This would recover all disk information up to the time of the crash by, for example, simulating a user editing a file. The secured disk image was always available along with the current so that information could be copied forward in time—i.e., information saved at the time of the securing backup could be copied to the current state.

The Tilios Operating System could perform a more rapid backup because all the work was performed on the disk (e.g., there was no transfer to tape) and techniques were used to take advantage of the incremental nature of change (i.e., the current and secured states typically only had minor differences). Nonetheless, the user was still faced with selecting specific times at which to secure (backup) and the replay method for keystrokes was not entirely reliable for recreating states subsequent to the backup. For example, the keystrokes may have been commands copying data from a floppy disk or the Internet, both of whose interactions are beyond the scope of the CPU and disk to recreate.

Simply creating a backup a file by making a copy of a file under a new name, typically changing only a file's extension (e.g., "abc.doc" is copied to "abc.bak") has been a long standing practice. In the event the main file (abc.doc) is corrupted or lost, one can restore from the backup (abc.bak). This process is much the same as doing a selective tape backup and carries the issues of managing the backups (when to make, when to discard, etc.).

In summary, a RAID system only deals with backup in the context of physical drive failures. Tape, WORM, Tilios, and file copies also address backup in the context of recovering changed (lost) information.

No Specific Backup Request or Time

The traditional backup process involves stopping at a specific time and making a duplicate copy of the disk's information. This involves looking at the entire disk and making a copy such that the entire disk can be recreated or specific information recalled. This process typically involves writing to a tape. Alternatively, a user may backup a specific set of files by creating duplicates that represent frozen copies from a specific time. It is assumed the originals will go on to be altered. This process typically involves creating a backup file on the same disk drive with the original. Note that a "disk" may actually be one or more disk drives or devices acting in the manner of a disk drive (storage means).

In both of these cases the user must make a conscious decision to make a backup. In the second case a specific application, like a text editor, may keep the last few versions of a file (information). However, this can lead to wasted disk space as ultimately everything is duplicated long after files have stabilized. In other words, while working on a document a user may likely want to revert to a prior version, but once finished and years later, it is very unlikely the user would care to re-visit the last state before final.

The technology of the present invention seeks to eliminate the need to pause and make backups or decide which files should be backed up in the context of short term information recovery. That is, recovering information that was known reasonably recently as opposed, for example, to recovering information that has been lost for a long period of time.

Backup of a Disk's Directory is Important

Another situation where information recovery is very important is when the directory system for a disk, which identifies what and where files are located on disk, gets corrupted. This occurs, for example, due to a system crash during the directory's update or due to a bug in the operating system or other utility. In either case, losing the directory of a disk's contents results in losing the referenced files, even though they still exist on the disk. In this case the information the user wants to restore is the disk's directory.

A final example of why a user would want to revert to a backup is when the operating system gets corrupted (the executable or data files that are essential to run a computer) due, for example, to installing new software or device drivers that don't work.

Clearly there are many reasons a user might want to go back in time in the context of information being manipulated on a computer's disk. Traditional backups offer recovery to the time of the backup. However, these system-wide backups are limited in frequency due to the amount of time required to scan the disk and duplicate its contents. In other words, it is not feasible to backup an entire disk every few minutes as this would require significant pauses in operation and an enormous amount of storage. Keeping historical copies of files as they progress in time has the drawback of eventually forcing the user to manage the archives and purge copies in order to avoid overflowing the disk. Obviously, one cannot keep a backup of all files on a disk whenever they are changed for all of time without requiring an unlimited disk, which does not exist.

One approach to retaining discarded data on a more or less continuous basis is described in U.S. Pat. No. 5,325,519, entitled "Fault Tolerant Computer with Archival Rollback Capabilities", to Long et al. ("'519 patent"). The '519 patent discloses a storage device which includes processing circuitry for detecting access requests to alter data in respective locations of a storage device, and, prior to executing such requests, storing the data in such locations in an audit partition region of the storage device. The device of the '519 patent can subsequently restore the data retained in the audit partition region to its previous location on the device, and thereby return the storage device to a previous state. The device and approach of the '519 patent, however, inherently introduces delays in writing data to the storage device. In some cases, these delays may make it infeasible to use this technology. Therefore, there remains a need for a more fast, flexible and dynamic way to retain historical information in a computer system.

SUMMARY OF THE INVENTION

The present invention is a method and apparatus for disk based information recovery in computer systems. This applies to all types of computer systems that utilize one or more hard disks (or equivalent), where the disks represent a non-volatile storage system or systems. Such types of computers may be, but are not limited to, personal computers, network servers, file servers, or mainframes. The invention stipulates using the otherwise unused pages or special dedicated pages on a hard disk in a circular fashion to store the recent original states of information on the disk that is altered. Collectively these extra pages represent a history buffer. These history pages can be intermixed with the OS's data and thus the present invention relies on re-mapping of disk locations between the OS and the actual hard disk. Using the information stored in the history buffer, another mapping can be made through which the state of the entire disk (excluding the extra pages) can be reconstructed for any time in the past for as far back as the history buffer contains information.

In another embodiment, the invention provides a method, and corresponding apparatus, of protecting the resources on a computer necessary to operate a data storage device, wherein the computer has a processor for executing program code. The method disallows the processor from altering the resources unless program code execution passes through a gate which validates that the code executed by the processor is trusted code and is authorized to alter the resources. The trusted code re-enables the protection of the resources prior to the processor returning to execution of non-trusted code.

In yet another embodiment, the invention provides a method, and corresponding apparatus, comprising recording original states of altered data on a disk, over some period of time, sufficient to recreate the disk's image at various points within the period of time, and writing the recorded data as well as the current operating system (OS) visible image of the disk to another secondary storage medium, such that the medium can be used to recreate the disk's OS visible state at various points in time.

BRIEF DESCRIPTION OF THE DRAWING

FIGS. 10–17 illustrate a write example, wherein the disk has multiple page locations and some page locations are assigned to the main area and the other for extra pages.

FIGS. 20–25 illustrate reverting a disk to a prior state.

FIGS. 29–34 illustrate writing to a disk.

FIG. 37 illustrates a normal write operation.

FIGS. 42–52 illustrates low-level swapping.

DETAILED DESCRIPTION OF THE INVENTION

Figure 1:
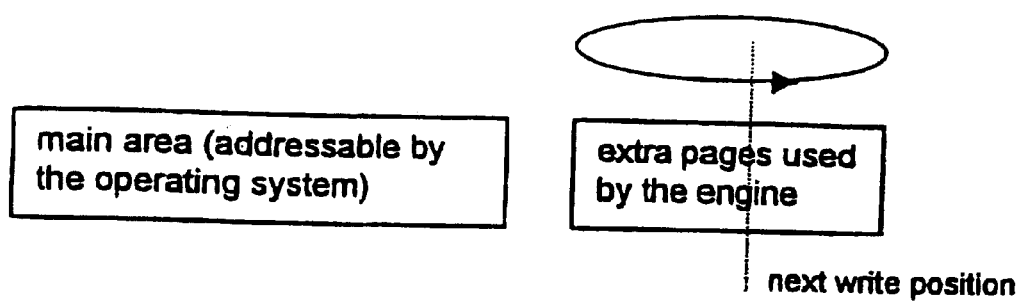
FIG. 1 illustrates the main area and extra pages of a storage disk.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

This application describes five software methods for information recovery in which the backup (historic) data is kept on the same hard disk as normally used by the user. In addition, a method is described for extending the backup services to utilize a second hard disk, and so provide a degree of hardware redundancy. A method is also described wherein a user can boot a computer from a disk image that is based on and yet isolated from that which is normally used. Also described is a method to revert a computer system's memory (RAM) and disk states back in time.

On-Disk Information Backup and Recovery

A computer's operating system (OS) typically stores information on a hard disk. The example embodiments of the present invention present five fundamental methods of recording the original state of information prior to its being altered. The first four methods work substantially outside of the OS's method of organizing and assigning its file to disk pages. They substantially differ in performance and how they utilize the disk. The last method calls for integrating the process of saving and retrieving original states of altered information directly into the OS's filing system.

1. Move Method: Move before overwrite
2. Divert Method: Divert and later swap into place during free time
3. Temp Method: Temporarily re-map, swap into place during free time
4. Always Method: Always re-mapped, reorganize during free time
5. File Method: Implemented in the filing system at the file or portion of file level.

BRIEF SUMMARY

A reasonable objective for all the methods is providing transparent near-term backup services to a user. The aspect of transparency means the user is not required to specifically call out for backups, nor is their daily routine otherwise impacted. This is accomplished by automatically saving the prior states of altered data on their hard disk, thus providing a means to restore to earlier times. However, in order to avoid impacting the user's routine, this saving process must not substantially reduce the disk access throughput to which the user is accustomed.

The Move Method involves first reading data about to be overwritten and saving it in a disk-based history buffer. It has the drawback of fundamentally being slow. The Divert Method uses a relatively small area on disk to save newly written data, thus attempting to move the work of saving prior states into the background. It has the drawback that a fixed-size buffer eventually overflows and then degrades into the Move Method.

The next three methods offer better solutions to the throughput problem. The Temp Method utilizes mapping to allow the history buffer and the area accessed by the OS (main area) to exchange roles. Thus, the user can write very large amounts of data without a noticeable impact on disk access throughput It has the drawback that a lot of background swapping must be done in order to return pages to their unmapped locations. The Always Method attempts to place newly written data directly over the oldest historic data, and so often entirely avoids the problem of moving data It has the drawback of requiring permanent re-mapping of the OS's page assignments. The File Method assumes integration with the operating system and uses the OS's file mapping to eliminate one of the maps from the Always Method.

The Comparison of Methods section found toward the end of this document, with its associated figures, more fully visually illustrates the nature of these different methods.

Terms

Throughout this document the terms current disk image, simulated disk image, main area, and extra page area are used. The current disk image refers to the non-historic view of the disk. It consists of the data last written by the user. If no historic logging was in place on a disk, its current image is the data the disk now contains. The simulated disk is to the user and OS a completely independent disk. However, the engine at a level below the OS creates this disk on the fly from the current image and saved historic data. The actual hard disk is generally divided into two basic areas consisting of main and extra pages. The main area holds the pages belonging to the current image. In the extra page area the historic data is kept. The main area map re-routes accesses to the current image to possible alternate locations assigned by the engine. Historic page descriptors in the history map manage the historic pages. Main and extra pages can temporarily swap roles, either within their own areas, or with pages from the opposite area. Therefore, part of the current image may for a moment be mapped to a page belonging to the extra page area, which normally holds historic data.

The expression "overwritten data" must also be carefully understood. At first one might assume that it is referring to data that has been physically overwritten. This is not the case. A file consists of data that may be overwritten by an application. However, the present invention is concerned with saving the data's original state. This is accomplished by either copying (moving) the data before it is physically overwritten, or re-directing the write and thus avoiding a true overwrite. Thus the expression is referring to the file's data that existed prior to the OS overwriting it, and which is now being preserved as historic data by the engine.

Disk management responsibilities may be segregated out of an operating system into a filing system (e.g., NTFS in Windows NT). For the purposes of this document, when referring to the OS, the reference includes any other subsystems involved with disk management.

The term engine refers to the logic implementing the method currently under discussion. Various methods are discussed and each has its own engine.

The word "extra" in the term 'extra page area' is conceptually founded in the idea that what is not visible to a user is extra. A disk physically has a given capacity. However, some of this disk, in the Move, Divert, and Temp Methods, is set aside and hidden from the user. Thus the user-visible disk size (main area), which is that reported by the OS, is less than its true size. The storage that is not visible to the user is "extra," which the engine utilizes.

The OS assigns disk locations to various structures under its control (e.g., files). However, because some the engines re-map the OS's disk locations to other locations, in order to distinguish between the use of "disk locations" in the context of the OS and the engine, the OS disk locations are called location keys.

The Move Method

The basic elements of the Move Method are described in the '519 patent. In this method, a portion of the hard disk is reserved to store historic information (history buffer). When the OS writes to the hard disk, the information about to be overwritten is read and saved in the history buffer, and then the original write is performed. Reasonable optimization of this process addresses the relative extreme time cost of moving disk heads. A sequence of nearby writes might be delayed and combined so that the affected data can be read as a block, moved to the history buffer, and then the original writes performed.

Without using any method to save original states of altered information, a single write typically involves positioning a disk head at a specific location on disk where the data is to be written. The Move Method increases this to a disk read and two disk writes. This involves the positioning of the disk head three times: once to the target area about to be overwritten so that its data can be read, once to the history buffer to save this original data, and finally back to the target area to overwrite the new data.

Caching writes in memory and committing them to disk during free time can reduce or eliminate the impact on the user, even though there is a tripling of time in the actual writing of the data. When the user through a computer application writes data to disk, the OS really stores the data in RAM, allowing the user to continue as if the writes had actually occurred. Then some time later the filing system performs the actual disk writes. Although using the Move Method of saving original states triples the duration of this background write process, in theory the user had been free to continue working and so should not notice the performance degradation.

The flaw in this process is that a RAM cache is often insufficient to hold the mount of data typically written. For example, word processing documents can easily be megabyte in size. Graphic image files are even larger. If the cache overflows then writing cannot be delayed and so the user must wait until it completes. Thus they see the tripling of the write time. It can also be argued that the writing of smaller amounts of data, even if the time is tripled, say from 0.1 seconds to 0.3 seconds, is not as important as larger amounts of data. If it normally takes 10 seconds to save a file and it now takes 30 seconds, most users would consider this a serious and potentially unacceptable performance impact to using the Move Method of saving original states.

The Divert Method

According to one example embodiment of the Divert Method, new data is written to the end of the history buffer and later during free time swapping it, along with the historic data, into place. This increases the amount of new data that can be written without falling back to having to move data before overwriting. The limiting factors are the size of the history buffer and the mapping process required to re-direct reads to the history buffer, should the desired data that was recently written not yet have been swapped into place. In other words, one must deal with read and write accesses to data that has moved out of place.

The downside of this method is again in the answer to the question of what happens when so much data is written that this method cannot be used. That is, the system's performance suffers in that the Move Method must be used. For example, if it normally took ten minutes to load a CD-ROM, it may instead take half an hour. This is unacceptable for most users. Granted this method reduces the likelihood of a slow down, as now a large file can be written without a performance degradation, but the situation of loading an even larger amount of data is still a problem.

Re-Mapping

In order to be accepted by most users, a reasonable method of saving original states must yield disk access performance similar to when no method is in use. This must be true for common situations such as writing a large file or loading large amounts of data, such as occurs when installing a new software system. An important aspect of this technique is using re-mapping techniques to allow the placing of data in alternate locations without having to fall back to the Move Method and its problematic overhead.

The following two methods fall into the class of those utilizing re-mapping to save original disk states. The details presented here relate to the present invention avoiding performance problems associated with re-mapping.

The Temp Method

The Temp Method yields, even under circumstances where a large amount of data is overwritten, similar disk access performance compared to no method (not saving prior states). The Temp Method builds on the Divert Method in which newly written data is diverted to the end of the history buffer and later swapped into place. However, the Temp Method does not focus on diverting writes to an alternate buffer. Rather, the Temp Method avoids the inherent size limitation of a buffer and thus the possibility of it overflowing. If an overflow occurs the Move Method is forced into the slow Move Method. The Temp Method, on the other hand, is not collecting up changes in a fixed-size buffer, but immediately writing the changes out to a re-mapped location. Thus, with enough writes, the Move Method's buffering can overflow, whereas the Temp Method always has some alternate location to which to write new data.

Prior states of a disk are maintained by reserving on the disk an "extra" area in which old copies of altered information are saved. (See FIG. 1.) Thus when the OS writes to the main area, which is the area of the disk of which it is aware, the pages about to be overwritten are, at least eventually, moved into a circular history buffer (extra pages). Therefore, a prior state of the disk can be reconstructed by combining the current image with the appropriate data in the history buffer. (Of course, you can only go back in time as far as prior states have been saved in the history buffer.)

As already discussed, there is a performance problem in simply moving data about to be overwritten to the history buffer. A write to the main area now requires three steps: (1) a read of the data about to be overwritten, (2) the writing of this old data into the history buffer, and finally (3) completing the original write. The problem is not that this extra work is required, but that the work must be done at the time of a write, and so the overall write performance suffers. In the case where the OS RAM cache or other type of cache is sufficient to hold a burst of writes, and the method's extra disk accesses are done in the background, the overhead is not visible to the user. However, if many writes are done such that the cache overflows, the resulting three times slow down is excessive.

Figure 2:
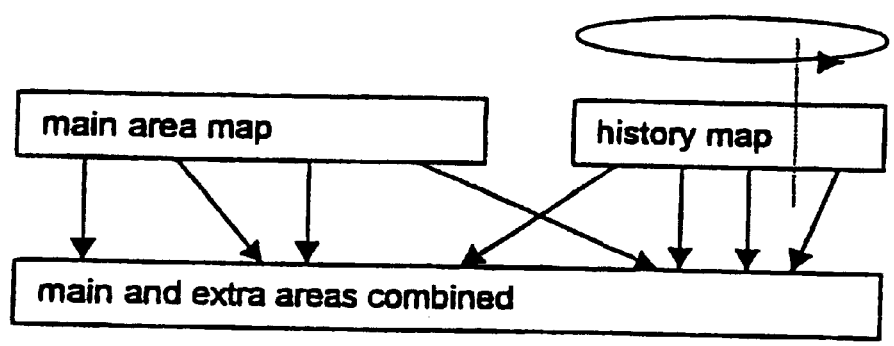
FIG. 2 illustrates how two maps can be used to represent the main area and history buffer of a disk.

One solution according to the present invention is to utilize maps that allow re-direction of a write to an alternate location, with the old location becoming "part" of the history buffer by a note made in a map. Thus when a write occurs to some location X, which is diverted to an available historic page Y, the maps are adjusted. The location originally associated with X now becomes historic data that is part of the history buffer. The location associated with Y, which had contained very old historic data, now becomes part of the main image that is visible to the OS. FIG. 2 shows how two maps could be used to represent the main area and history buffer.

The mapping scheme allows this method to operate continuously and maintain old states of altered data, without ever having to pause and move data around. The problem that arises over time is that what was continuous areas in the main area in effect become fragmented over the entire disk. This significantly reduces disk access performance. Most operating systems and associated utilities take care to manage the organization of data on disk to minimize fragmentation—that is, data likely to be read as a block (like a file) is located in adjacent locations. By re-mapping the OS's allocations the engine re-introduces fragmentation.

To solve this problem the engine employs the maps to allow for heavy write access to the disk, but at the same time, knowledge of where the main and extra pages areas are is retained. Thus, in the background the pages are moved back into place, restoring the main and extra pages areas to their independent and non-mapped states.

In most situations this approach has little visible impact on the disk's performance. However, it is possible for the user to see degradation in performance due to fragmentation from re-mapping.

It is assumed the mapping system is cached and efficient so that it introduces little overhead. Since data is likely written in large blocks like when a user saves a word processing document) the initial diversion to the extra pages area does not cause fragmentation. In fact, write performance is enhanced since writes to different areas of the disk, which would normally involve time intensive seeks, are instead re-directed to the continuous extra pages area. Fragmentation arises during subsequent passes through the history buffer where its pages, after the initial pass, have now been sprinkled about the main area As more passes are made, the problem worsens. This is the case where the system's performance degrades because of re-mapping.

Figure 3:
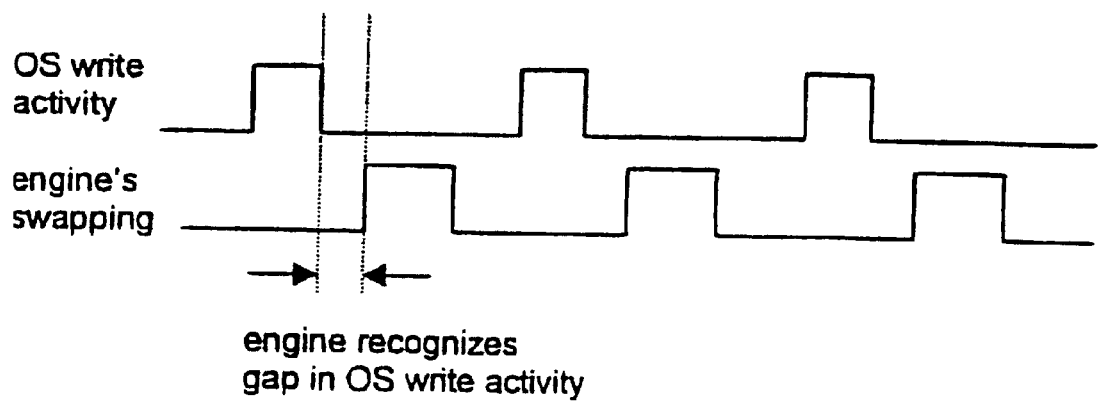
FIG. 3 illustrates short burst write activity to a disk.

However, degradation in performance is not likely for two reasons. First, there is typically a substantial gap in time between heavy but short write accesses. Therefore, safe points are established and the engine has time in the background to swap main and extra pages back into place. In other words, during the gaps in disk activity, the engine is de-fragmenting. Examples of time gaps would be, while editing a large document or graphics file, the intervals between file saves. FIG. 3 illustrates short burst write activity.

The second reason performance degradation is unlikely is that the engine shuts down under a reasonably heavy long continuous stream of writes. The amount of data written must be large relative to the size of the extra page area. Such large amounts of writes occur, for example, when loading data from a CD-ROM. This situation is detected when most of the extra page area is overwritten within the same write session. A write session is a transitional sequence of writes with stable states only before and after the writes. In this case the main area map is frozen and logging of historic data ceases.

In order to cause deep fragmentation due to re-mapping, a series of writes would be required in which a large amount of data was written with little background time available for the engine de-fragment (swap), and yet not so constant as to cause the engine to shut down. Such a situation is probably rare, on at least personal computers. Short and long bursts of disk writes do not lead to this type of fragmentation, as just explained.

Figure 4:
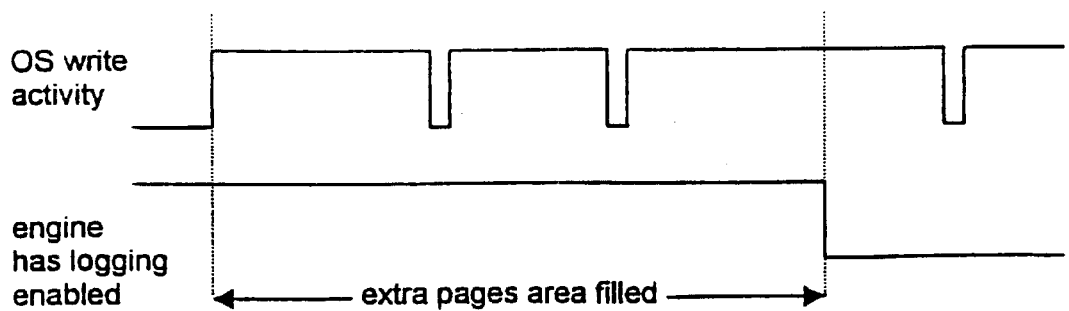
FIG. 4 illustrates an extended period of reasonably continuous write activity to a disk.

When the engine shuts down under heavy writes there should be no substantial impact on performance. If the extra page area is around 10% of the total disk, then the main area map only covers this area even though the entire disk is being overwritten, perhaps many times. In a shutdown, the engine gives up logging, writes data to wherever the mapping last placed a given location, and simply tries its best to allow normal operations to continue. In this situation the engine acknowledges that it cannot provide any recovery services. FIG. 4 shows an extended period of reasonably continuous write activity.

A user would not want to restore to a point in the middle of a long continuous data write sequence, as in general there are no guarantees to what is on the disk. For example, many operating systems require an application to close a file before information regarding the file's existence is written to disk. Before that, even if days of writing had occurred, the data written would not be recovered in the event of a crash. Therefore, when so much data is logged in the circular history buffer that the starting point of a large write sequence falls off the end of the circular buffer, then there is no purpose in continued logging. Logging creates a path back to the disk's state at the beginning of the sequence. When that is lost, the knowledge of how to restore the remaining and future parts of the sequence is not useful. Thus, it is acceptable to shut down logging when the history buffer is overrun with reasonably continuous data writes. Note that part of the definition of "continuous" is that the OS does not provide safe point status along the way.

Figure 5:
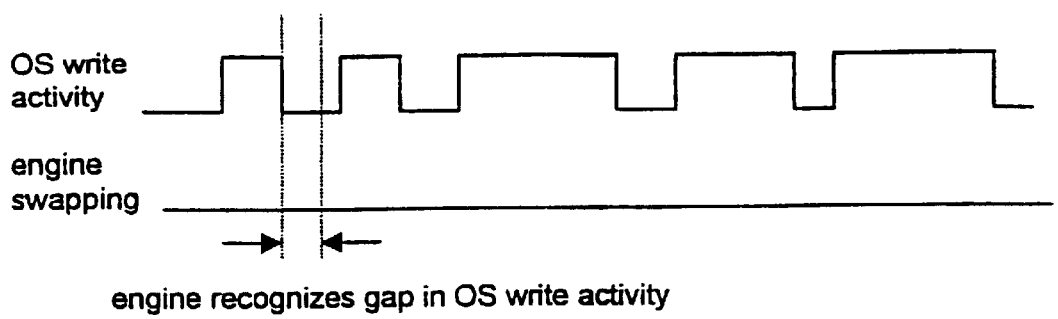
FIG. 5 illustrates a case of frequent write activity to a disk, but with sufficient gaps to establish safe points.

FIG. 5 illustrates the situation leading to deep fragmentation. It involves a long sequence of writes. However, time gaps or other clues provide for many safe points thus making logging useful. A user may not be able to restore to the starting point of the long sequence that has fallen off the end of the buffer, but there are plenty of safe points further ahead. FIG. 5 shows this case of frequent write activity, but with sufficient gaps to establish safe points. The gaps are not sufficient for background swapping, thus preventing de-fragmenting. Fragmentation therefore becomes increasingly a problem: the engine, due to re-mapping, breaks up what the OS thought were continuous areas on disk, and therefore access to these areas is slower. The slowdown occurs because the disk head must move to many different positions on the disk surface in order to read what the OS thought was a large continuous block of data.

It is helpful to consider the relative sizes of structures in the context of heavy continuous write activity where the engine freezes the map and disables further logging. Assume for this example a one-gigabyte disk drive where 100 megabytes is allocated to extra pages. The main area map will have grown to cover the 100 megabytes and involves about 3.2% overhead (allow 16 bytes per 512 byte page), or about 3.2 megabytes. This is large enough that it is unlikely to fit entirely in RAM. A root is required, plus one mid-level node, and 200 low-level nodes (200,000 entries stored 1000 per node). However, the first two levels of the tree will generally be in RAM with a low-level node being fetched every 1,000 page accesses. This assumes that OS accesses involve typically a sequence of pages allocated in sequential locations, and so the engine is not constantly hopping from one low-level node to another.

The upper portion of the tree indicates whether a low-level node fetch is required. If the entire OS visible disk (main area) was written (900 megabytes), 11% of the time you will go through a low-level node. Thus, as the mapping boundaries of the low-level nodes are crossed, one of every 1,000 accesses requires the fetch of another node. This is a negligible overhead. In the other 89% of accesses the upper two levels of the tree are cached and immediately indicate direct (unmapped) access, adding negligible overhead.

Next consider the context where heavy but intermittent disk writes have caused the main map to grow to span the entire visible 900 megabytes. The map would be nine times the size of the prior, or 28.8 megabytes. This would require one root, plus two mid-level nodes, and 1,800 low-level nodes (1.8 million entries stored 1000 per node). Again the top two levels of the tree are generally cached. However, now all accesses go through a low-level node. If in a reasonably worst case situation a low-level node is fetched every accesses, the overhead is 5%. This is still pretty reasonable for a worst case situation, noting it resolves itself automatically when given sufficient background time for swapping.

Figure 6:
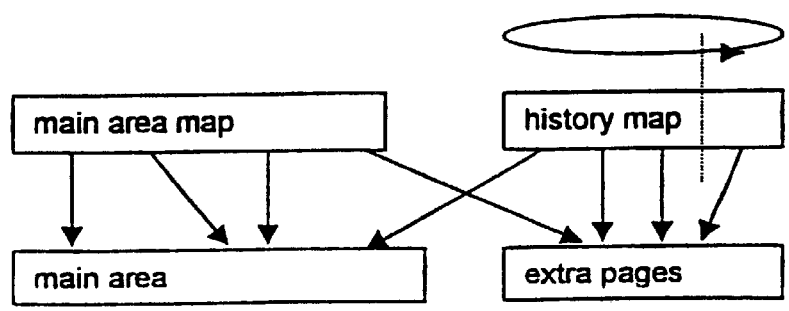
FIG. 6 illustrates two maps referencing pages in both the main and extra areas.
Figure 7:
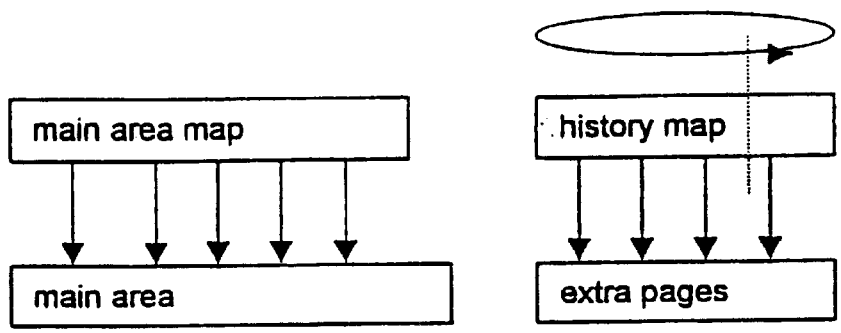
FIG. 7 illustrates the effect of swapping so that the history map only references pages in the extra page area and the main map only references pages in the main area.

FIG. 6 illustrates the two maps referencing pages in both the main and extra areas. In other words, pages belonging to one area are temporarily swapping with pages from the other area. FIG. 7 shows the effect of the swapping so that the history map only references pages in the extra page area and the main map only references pages in the main area.

Figure 8:
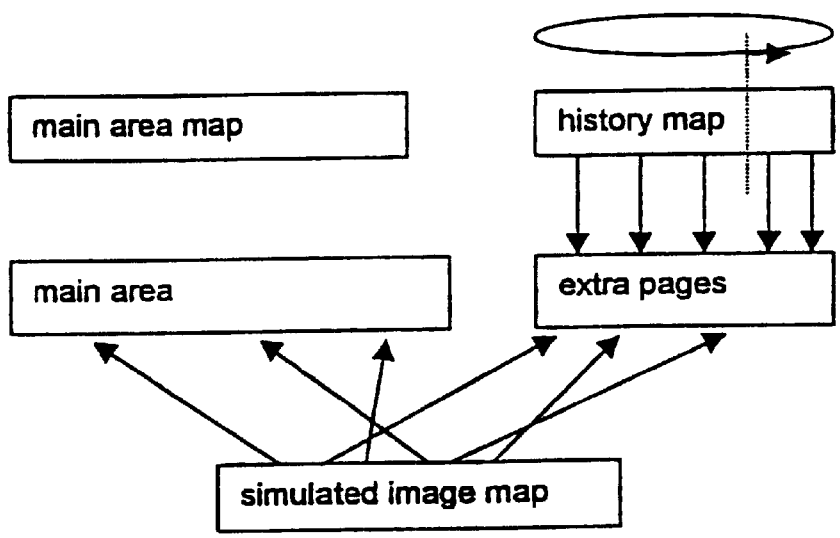
FIG. 8 illustrates shows the main area map's links removed.

In order to reduce the space required for the main and simulated image maps, it is assumed by definition that any location that is not represented in the map directly corresponds to the indicated storage location. In other words, the location is not mapped. Therefore, as the background process swaps pages to the area in which they belong, the main area map shrinks to nothing. FIG. 8 shows the main area map's links removed, indicating that all storage is in its stated location. The simulated image map is also shown. It consists of differences with the main area map reflecting pages that must be "restored" from the history to reflect the main area from an earlier time, as well as any changes since made to the simulated version. Note that once the simulated version is changed it represents a fork in time where the main and simulated versions share a common state at a certain point in time but both may subsequently have been changed in different ways.

Safe Points and Switching States

A basic purpose of the engine is to provide means for rolling back the state of a disk to a previous time. This involves maintaining original and current states and a mapping system to guide how these should be combined to create a given state corresponding to some specific time in the past. In practice it is not useful to restore a disk to a transitional state where information was in the process of being updated. For example, if you were to save a word processing document, you would like to see the disk either before or after a save. Restoring to the time during the write process should be avoided since there is no guarantee as to what the user would see. Therefore, the concept of a safe point is introduced which corresponds to times at which the disk is reasonably usable. These times are identified from large gaps in disk activity, which are assumed to indicate the OS has flushed its caches, or specific signals from the OS indicating such, when available.

The user is allowed to select only a safe point in time to which to revert. This implies the engine need only flush its own information to disk at these times. It also implies that the process of logging is not one of recording each write and its original data in a time-ordered sequence, but of changes from one state at a given safe point in time to to the state of the next safe point. Therefore, the stable (non-transitional) information maintained on disk by the engine switches at distinct points in time, the safe points, to include the next disk representation. Note that logging the prior state for every change provides the necessary information for transitioning at safe points, but is overkill.

It is only the first original state of a given page that changes many times between safe points that need be recorded in the history buffer. It is only the page's last state that is saved as part of the main image. In other words, if during a transitional period the OS (applications) writes to the same disk location repeatedly, only the last state needs to be maintained in order to represent the upcoming safe point.

Note that the engine's switching to a new stable state of its internal data is generally an independent process from any flushing of data from within the OS. It is possible at some random point in time for the engine to pause and flush out all its maps and other data required to represent the data thus far written by the OS. However, it has just been pointed out that if the OS's data is incomplete (transitional) there is no point in providing recovery to this time. Therefore, synchronization of the engine to the OS avoids useless stable transitions in the engine.

If the OS constantly maintains a reasonably usable disk image and time gaps are not sufficient to indicate the only reasonable points to which to recover, then one could go to the extreme of allowing the user to recover to any point in time. This would require the logging of the prior states of all changes and an update process that keeps the engine's internal data constantly current. Such a design is not warranted for personal computers and is not addressed in the presented methods.

The time between safe points during which the disk is in transition is referred to as a write session. Again, if, during a given write session, more than one write occurs to a given location, then only the data's initial state before the first write is saved. Thus, subsequent writes directly overwrite the page. There is no need to save intermediate states during a given write session. Failure to filter out subsequent writes from the history buffer causes no harm other than needlessly taking space.

One technique of detecting subsequent writes is keeping a session index along with the re-mapping information. If only a small portion of the disk is re-mapped, then the additional disk overhead is minimal. However, it is possible to map a large portion of the disk. This total mapping is the rule in the upcoming Always Method. In order to reduce the four byte (session index) per page overhead from the re-mapping mechanisms, it is recommended that a bit map is maintained in RAM. Each bit indicates if a corresponding page has been overwritten in the current write session. Given a page size of 512 bytes, then 100 k of RAM indicates the status for 400 hundred megabytes of disk. If the bit map is blocked so that the 400 megabytes can be spread across the disk, mapping only the currently active areas, then this 100 k can handle the overwriting of 400 megabytes of data within a given write session. This ratio is reasonable given RAM and disk costs, and likely amount of data to change during a write session. When the next safe point begins, this bit map is simply cleared.

In Use Bit Maps

In addition to historic data, the engine must keep a variety of other "overhead" information on disk; for example, the maps. The general question arises as how to modify this overhead information without introducing points in time at which, if the system crashed and restarted, the information would have been corrupted. Since the engine is expected to revert only back to safe points, in the event of a crash, it is assumed the disk would come back up in its state as of the last safe point.

A method of maintaining the engine's overhead information in such a way as to insure that the last safe point's data is always available, is to doubly allocate space for all such information. Two bit maps are used to indicate which of the copies corresponds to the last safe point and which copy, if any, corresponds to the transitional data. Any changes since the time of the last safe point are considered transitional and are written to the "other" allocation. Thus the stable bit map indicates which allocations make up the overhead information corresponding to the last safe point Should a crash occur, on restart the stable version is loaded. Otherwise, under normal circumstances, the transitional bit map indicates either the same allocation as that in the stable bit map or the other allocation, which would contain altered transitional data. When the next safe point is reached in time, and all data has been flushed to disk, then the current transitional bit map becomes the new stable bit map.

The Switch Page

The In Use Bit Maps facilitate the duplication of altered internal engine data during transitions. A switch page is used to indicate which of the two In Use bit maps are playing the stable and transitional roles. The switch page is the root to all the engine's internal data. It is allocated at a predefined location with space for two copies. Whenever the page is updated, both copies are written. If for some reason the first copy is not successfully written (for example, the system crashes) it is assumed the second copy will be valid. Thus, when booting up and reading the switch page, the first copy is read, where if the read fails (e.g., disk crashed during its write), then the second copy is read.

It is recommended that one assume the switch page can be successfully partially written prior to a crash. Therefore, reading the page would not produce a disk error but yield corrupted data. By including an incrementing switch page update count at the front and start of the page, as well as a CRC or checksum, this problem case is avoided. When reading the switch page, the two update counts are compared and the CRC validated. The switch page is only read at boot time, placed in a RAM, and subsequently periodically written during the user's session.

Information in addition to that relating to the In Use bit maps can also be kept in the switch page. The limiting factor of what to keep in the switch page is insuring its update is relatively efficient (e.g., not too much data to write). The other information typically found in the switch page is: a version number, the next write area, root links for the current and simulated image maps, low-level swap information, and parameters for tracking the general logged data pages.

The Main Area and History Maps

Trees are used to implement the main area and simulated maps. Given sufficient background swap time the main area map is reduced to nothing, which indicates re-mapping is not active. The entries in the main area map contain the following fields:

1. The actual location of the corresponding data (0=no re-mapping).
2. The visiting page location (corresponds to the data actually stored at this location).

The history map, where there is one entry for each extra page, should be implemented as a table. These entries are typically always active, indicating the original locations of their associated extra pages. At any time, the "history buffer" is the collection of pages indicated by either following the temporary swap links, when active, or referencing the associated extra pages. The fields in a historic page descriptor (HPD) that make up the history map are:

1. Page Type (not in use, historic, special).
2. Original location of the represented data.
3. Swap link. Location that has temporarily received the data that normally would be found in the extra page corresponding to this entry (0=none).
4. Return link. Visiting page location (correspond to the data actually stored in this entry's extra page). Only maintained if it indicates another extra page.

The swap link indicates the page that really has the data that normally is associated with the HPD's extra page. This link indicates either a main or extra page. If null then no re-mapping is in effect The return link is used only when the swap link indicates an extra page. In this case the HPD associated with the referenced extra page has its return link set to indicate the HPD with the referencing swap link. In other words, the swap link is like a "next" link and the return link is a "last" link as in the context of a double link list.

Figure 9:
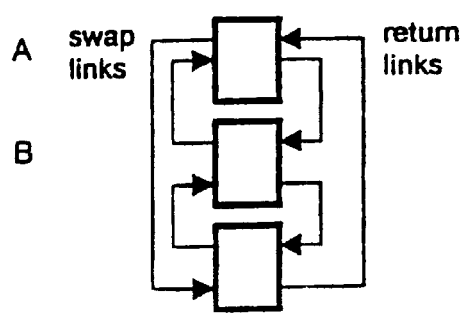
FIG. 9 illustrates a three-way swap.

Viewing these links as forming a link list is appropriate. The system is not limited to simply two HPDs where there is a link from HPD X to Y and one from Y to X. As the engine runs and after multiple passes through the HPDs, aging progresses and the swap and return links can involve more than two HPDs. For example, in A's location you might find B, in B's you might find C, and in C's is A. Thus a three-way swap is required to get the data back in place. FIG. 9 shows this situation.

Writing to the Main Area

The following are the eight steps performed by the engine when the OS writes new data to a specified disk location (SL). It is assumed the engine has not been disabled. Note that if the last data written to this location is from the current write session then the new data simply overwrites it. Otherwise the following steps act to save the original data in the history buffer.

1. The next available "logical" location to receive data is determined by looking to the next location in the history buffer (map) to write (HP).
2. The swap link for this logical location in the history buffer is checked to see if it should in fact use the extra page directly, or instead, go to where its contents have temporarily been placed. This is the effective write location (EW).
3. The new data is written to EW.
4. A note is made of the real location (OL) of the data that would have been overwritten by the write under normal circumstances. In other words, determine where the main area map entry currently indicates the data for SL is located.
5. The main area map entry for SL is updated to indicate its data is at EW.
6. The swap link for the logical extra page location is updated. It is changed to OL, which indicates the actual location that had contained the data for SL.
7. Set the visitor link for EW to SL, if EW is a main area page.
8. Set the visitor link for OL to HP, if OL is a main area page.

A Write Example

Figure 10:
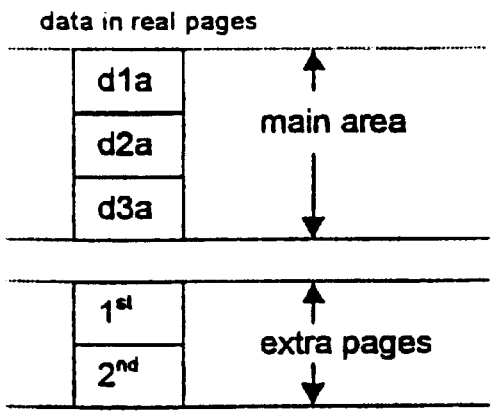
Figure 11:
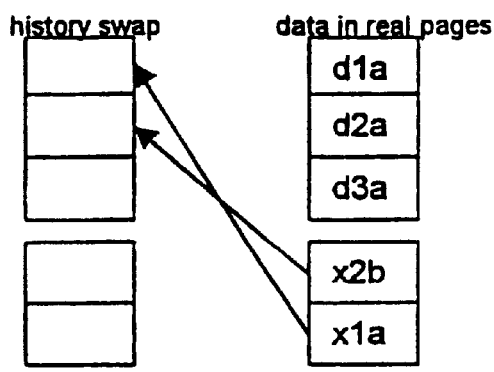

The following example assumes a disk that has five page locations where three are assigned to the main area and the other two are for extra pages. See FIG. 10. No attempt is made in this example to account for or show how the various HPDs and trees would actually work, nor any detail as to how the allocation of HPDs and extra pages work. The return links in the HPDs are also not shown for the write sequence.

The example starts by illustrating how five writes are handled, to locations 1, 2, 3, and then 3, and 2. The example then continues on into the Swap Section.

For the two extra pages there are associated HPDs. An arrow pointing into a duplicate disk layout represents the value of a HPD's swap link. The arrow runs from the referencing extra page (HPD) to the indicated disk location. Note that the duplicate disk layout is not new or additional storage. It simply represents the same storage as shown under the "data in real pages" heading. See FIG. 1 in which the swap links for the two history pages show that "x2b" and "d2a" have been swapped as well as "x1a" and "d1a".

Figure 12:
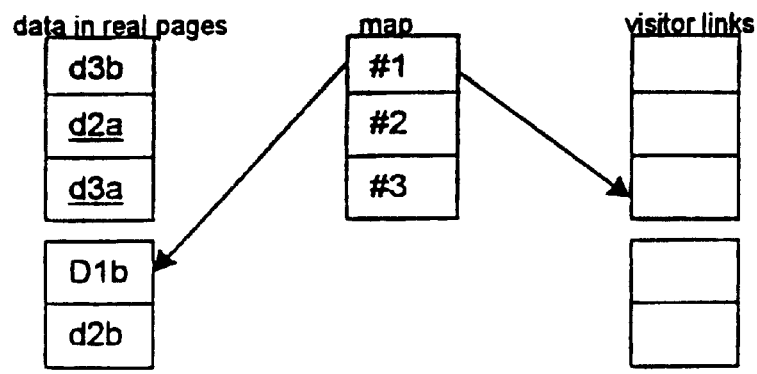

Keeping the flavor of duplicating the disk layout to more clearly show links, another copy is made under the "visitor links" heading. The main area map has two links for each page location: one indicates where the data for the associated location really is found, and the other indicating the page whose contents have been temporarily been placed at a given location. In FIG. 12 the main area map for location #1 indicates that the data "D1b" for this location is really in the first history page. However, if location #1 was actually read, the visitor link indicates the data "d3a" that belongs in location #3 would be returned.

Data is represented by three characters: the first is normally "d" but is changed to "D" when the location corresponds to that last written in the extra pages area. This implies that the next location, wrapping around to the top of the area, represents the next location in which to save historic data. The second character is a number that indicates the true location to which the data belongs. For example, "d3b" when all re-direction mapping has been undone, should appear in location #3. The last character represents the version of the data. "D1a" is what is first written to location #1, "d1b" is what is next written to this location, and so forth.

If the three characters representing a data item are underlined, then the data is historic (a saved copy of previously overwritten data), otherwise it is part of the main (current) disk image. Only historic data can be tossed as one never discards parts of the main disk image that is visible to the OS.

In FIG. 13A, the initial state of the engine is shown. There is nothing in the extra pages. No links are active in the main area map thus indicating that, for example, the contents for location #1 is in fact located at location #1. The main area contains "d1a", "d2a", and "d3a" in their respective locations.

In FIG. 13B, a write of "d1b" is done to location #1. Since the system cannot write into location #1 without losing its prior state, the write is re-directed to the first location in the extra page area. This page's swap link is set to location #1 since this is where its data really belongs. Similarly, if you go to location #1 you will find "d1a" which is only visiting this location until it can be swapped to where it belongs. As shown, the visitor link indicates the first extra page location. If you exchange location #1 and the first extra page location, all the links would disappear. However, there is a rush and another write in FIG. 13C has occurred. The swapping is put off.

In FIG. 13C, a write of "d2b" is done to location #2. The process is much the same as in FIG. 13B. However, note that the data goes to the second extra page as it is "next" after "D1b" that was the last written in the previous frame. Again, another write occurs before there is time for swapping.

In FIG. 13D, a write of "d3b" is done to location #3. The first question is where should the write be diverted? Notice that in FIG. 13C, "D2b" was at the location of the last written extra page, which was the second (bottom). Therefore, the next to re-use—that which represents the oldest historic data—is the first (advance, wrapping back to the top). However, again looking back to FIG. 13C, it is seen that the contents of this page have been swapped with location #1. Therefore the new data is written to location #1 and so overwrites "d1a" which gets discarded forever. The map is updated to indicate location #3's data "d3b" is found at location #1.

Next, the swap link is updated for the first extra page. This swap link indicates the location whose real data is now the newest historic data. This is the data that was just overwritten: the write request was to location #3 and so its prior state is now referenced as that associated with the extra (historic) page. In FIG. 13C, it is seen that no mapping is done and so the data "d3a" is normally what would be overwritten. Thus the swap link is set to indicate here and the data in this location gets underlined, as now it is historic.

Turning now to the visitor links, it is seen that these reflect the owners of the actual data in the locations whose contents or interpretation of their contents have changed. So first, a write is done to location #3 that gets diverted to location #1. Therefore the visitor link for location #1 indicates location #3. Second, the data that had been stored in location #3 would, if there had been time, been moved to the first extra page. Therefore the visitor link for #3 indicates the first extra page.

Swapping Pages

Swapping is performed in the background (while the system is otherwise idling). The process is divided into two phases. First, all main area pages are swapped into place. Second, the extra pages are swapped among themselves so that no redirection is in effect. This insures that as one walks sequentially through the history map, the corresponding extra pages are also in sequential order. This is optimal when diverting a sequence of writes to the history buffer.

The preceding example has shown how to write data to the main image. Now page swapping will be discussed. In FIG. 13G it is assumed some free time is detected and the engine starts to reorganize the main area The approach is to generally walk through the map, swapping pages back where they really belong. The map entry processed in this FIG. 13 is for location #1. The map indicates location #1's data is found in the first extra page. This data is swapped with that which is really in location #1. Following the map's visitor link it is seen (from FIG. 13F) that it is the data from the second extra page that is really in location #1.

Therefore, to perform the swap of a main page with another, there are four steps:

1. Change the map entry to indicate location #1's data is in location #1. This is done by setting the redirection and visitor links to null.

2. Then one goes to the HPD associated with the data that was visiting in location #1, the second extra page, and change its swap link to indicate where the visiting data has been swapped. This would be where location #1 was originally diverted, the first extra page. If this location had been in the main area then its map link would require an update.

3. The first extra page contains location #1's data However, if it had been in the main area, which it wasn't, then one would set its visitor link to the second extra page (location #1's original visitor which is being moved to the first extra page). Of course, if the visitor link update results in linking to itself then the link is simply cleared. However, this later case would already have been handled in the prior step, so the update can be skipped.

4. The maps have now been updated, noting it is the transitional maps and not the stable versions that are changed. The actual data "D1b" and "d3b" is now swapped and the transitional maps eventually made stable.

In order to optimize the flushing of map data and disk access, the swap algorithm should buffer up a reasonably large series of swaps and optimize the disk access. In other words, if one is swapping locations #1 with #10 and #2 with #11, it is more efficient in terms of reducing disk head movement to do both swaps simultaneously: #1 and #2 with #10 and #11. This is discussed in detail in the Low-Level Swap Section.

In FIG. 13H, swapping for location #2 is processed. This results in the clearing of all links for the main map, thus indicating all main area data is in its desired location. The only further swapping required is in the extra page area. The advantage of reorganizing is that as historic pages are saved they are allocated one after each other on disk. This reduces disk transfer (seek) time.

For another example of the swap algorithm, one looks back to the state after FIG. 13E's write. In FIG. 13J "d1d" is written to location #1. FIG. 13K shows the results of executing a swap on location #1. Continuing from FIG. 13K, in FIG. 13L location #2 is swapped back in place. The results of swapping of location #3 back in place are much like FIG. 13I except the first and second extra pages contain "D1b" and "d3b" respectively.

The swap operation can be performed on any locations requiring it without regard for order. To illustrate this, refer to the final state in FIG. 13J. FIG. 13M shows the effects of swapping location #2 back in place (previously, location #1 was swapped). Swapping location #1 back in place produces FIG. 13N. And finally, FIG. 13O shows everything back in place after swapping location #3.

In FIG. 13P there is set up a situation in which a swap will involve only main area pages. All examples so far have always involved a main area and an extra area page. FIG. 13Q shows a swap of location #1 into place.

Up to this point, the write and swap main page algorithms have been discussed. The swapping done was used to reorganize the main area. In doing so, the temporary exchanging of pages between the two areas, the main and extra page areas, are resolved. The two areas become independent That is, the main area only contains pages that are current and directly visible by the OS (no re-mapping). The extra page area contains all the historic saved pages and none from the main area. An example of this state is shown in FIG. 13H.

What is also shown in FIG. 13H is that the HPDs are still indicating their data is redirected, albeit to other extra pages.

The direct mapping achieved in the main area (the map indicates that location #1 is at location #1, etc.) has yet to be achieved in the extra page area In FIG. 13H there is seen two extra pages that need exchanging. If the swapping was simply limited to pairs of extra pages, then the process would be clear: run through the HPDs and if a HPD indicates its data is located at another extra page, then exchange them.

The flaw in this approach is that more than two pages may be involved in a swap operation. In other words, it may be a set of three or more pages that are involved in a cross-linked system. This is demonstrated with reference to FIG. 13R.

Notice the addition of return links located under the map. These correspond to the extra pages that are represented across from them on the bottom. Whenever a swap link is set in an HPD that indicates another extra page, this HPD's return link is set to point back. Thus the two extra pages are pointing to each other.

Figure 14:
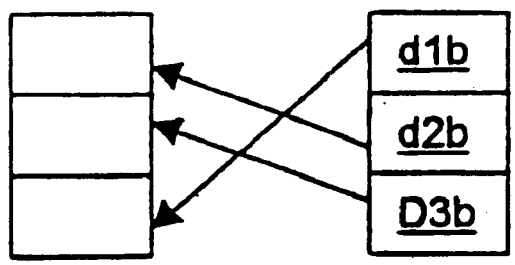

In FIG. 13R there is seen three main pages and three extra pages. In FIG. 13S there is a write to locations #1, #2, and #3, in this order. This leads to FIG. 13S. In FIGS. 13T, 13U, and 13V there is a write to #3, #1, and #2. On completion the extra page area is left with a three way swap required to restore a direct mapping between the HPDs and their respective extra pages. This is shown in FIG. 14.

One approach to reorganizing the extra page area would be to start at the first HPD and follow the swap links until the entire chain is known. Unfortunately there is no guarantee that the chain does not involve many pages (HPDs) and it is therefore beyond the ability of the system to swap in one timely step. Therefore the chain must be broken into shorter circular lists. However, this involves scanning the entire list, which is generally a lot of work.

The solution is to add the return links that create a double link list system, which is one that can be easily edited. The extra page area swap algorithm is much like that used for the main area except that it is known that only one area is involved—the algorithm is a double link list deletion. Keep in mind that the linking in the extra page area is only complete when the two areas have been made independent (by first re-organizing the main area).

The algorithm for swapping an extra area page at my_location and its my_data with another extra page is:
1. Save mapping data for my_location in my_old_visitor and other_location. Get HPDs for both (other_hhe and visit_hhe). Clear swap link (covers both).
2. If my_old_visitor is the same as the other_location, then this means the data that was in my extra page belongs to the page in which my_data is stored. Therefore after performing the swap, the other page will also have its desired data. Clear its swap link (covers both), noting other_hhe and visit_hhe point to the same HPD.

However, if the other page that had my_data and the page whose data I had (visitor) are not the same then adjust their HPDs. Set the other page to know where to put the data just written to its associated extra page (its visitor is what was my visitor). Set my visitor to know where its data has been swapped (to what was my swap page).

3. Perform swap and save the changes.

An optimization for the swap step is to reduce it to a move if my_location is in the unallocated zone of the next write area. When a page ultimately winds up in this zone, its contents are by definition unstable and therefore no update is required. Practical use of this optimization is minimal since reorganizing the extra page area where linking exists in the next write area is unlikely. It is not possible to discard the movement of data to other_location, even if other_location is in the next write area, since this may not be the data's final destination.

Figure 15:
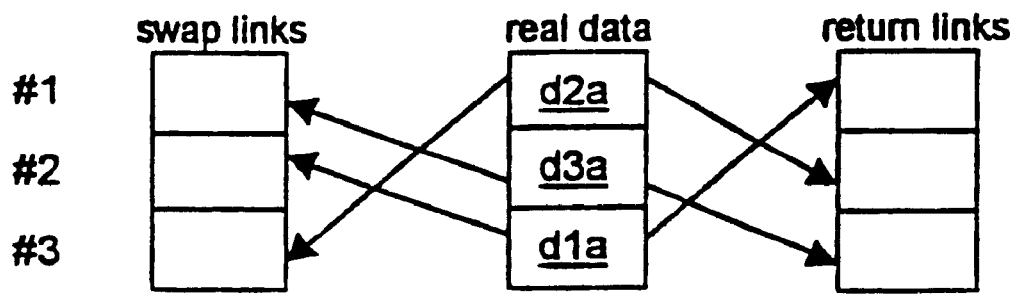
Figure 16:
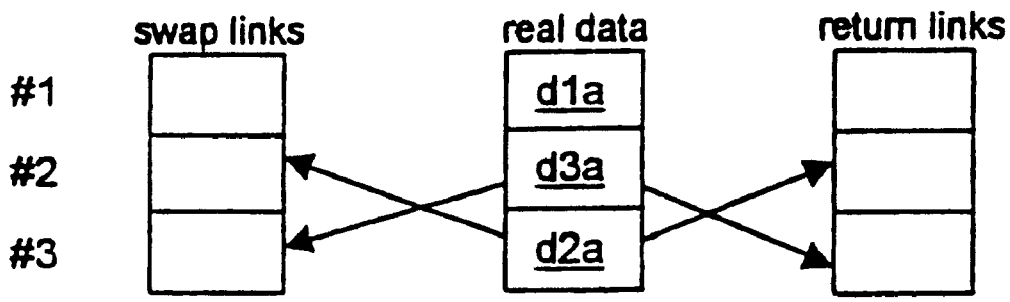
Figure 17:
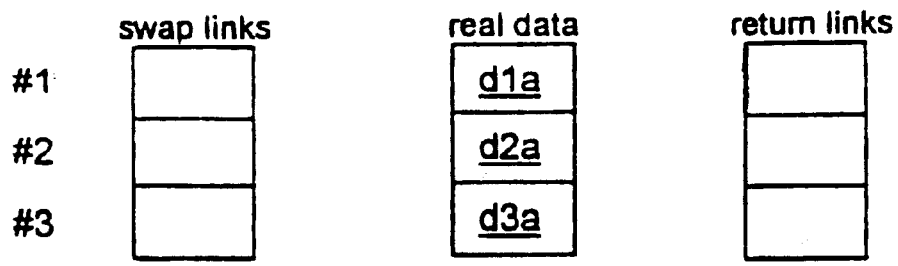

In FIG. 15 the extra page swap algorithm is performed on the situation based on FIG. 13V. FIG. 16 shows the swap of location #1 into place. In FIG. 17 the swap of location #2 into place inherently also handles the swap of location #3.

Allocating in the History Buffer

Figure 18:
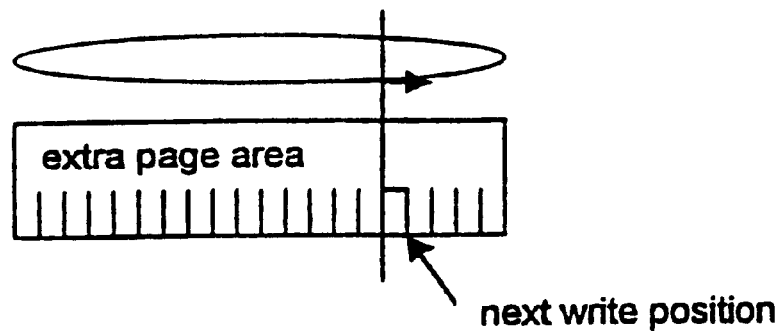
FIGS. 18–19 illustrate allocation of the history buffer.

It will now be described how extra pages are actually allocated, noting that their effective location may in fact be temporarily in the main area. If a next write position (allocate) in the extra page area is used, then it is necessary to update the switch page that contains the next write position for every allocation. In other words, one would look to the HPDs to find a suitable page at or just beyond that at the next write position (stepping over any pages that are not allocable). One would make the allocation by changing the page type to "not in use" (and therefore its contents are officially unknown) and advance the next write position. Next, one needs to make the changes part of the stable version so that one can modify the newly acquired page. This is a lot of disk flushing to get just one page. See FIG. 18.

Figure 19:
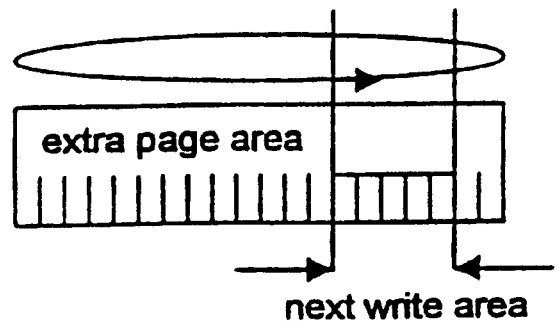

Use of a next write area, as opposed to a next write position, is a scheme that allows a single update of the switch page to set aside a whole area in which allocations can freely be made. Essentially, once a page is included in the next write area, its contents are considered transitional. Therefore, from the point of view of the stable version, the allocable pages in this area are all treated as unused (not in use) regardless of their corresponding page types in the stable HPDs. Thus the stable version can be trimmed of blocks of allocable storage. This is done during transitional processing minimizing the disk flushing required to process a series of allocations to simply a single update of the switch page. FIG. 19 illustrates the concept of a next write area.

The size of the write area is chosen by trading off the fact that the larger the area, the more historic information is discarded in one step, even though only a few allocations were required, with the desire to avoid frequently advancing the area during a given transition.

General Logged Data

In addition to tracking the original states of changed pages the engine must also track various other data. For example file activity (open and closes), program activity (launches), system boots, keystrokes and mouse activity, as well as other information. At a minimum the engine must track the location of safe points in the history buffer. General logged data pages support this need. These are pages that get mixed into the stream of normally allocated history buffer (historic) pages. As with historic pages they are de-allocated as the circular system wraps around and re-uses the pages.

This method of saving miscellaneous data in general logged data pages that are mixed in with the historic pages is a good way to save information that is to come and go in much the same way as historic data. Other methods are certainly possible. Note that care should be taken to avoid prematurely losing "notes" about historic pages before the pages themselves are discarded. For example, discarding information about the oldest safe point's location before discarding all the historic data after the safe point makes the saving of all this historic data pointless. Without the safe point marker it cannot be used.

Looking at the Past in Terms of Files

Although the ability to access an earlier state of a disk based on selecting a time provides a useful and base method of retrieving "lost" data, the process of selecting a time is often made based on information such as file modification times stored in the general log (described in the prior section). In fact, the entire retrieval operation may hide the process of establishing a simulated disk. For example, the act of selecting a file to retrieve from a list, wherein the list is constructed from information in the general log, can automatically lead to the steps of creating the appropriate simulated disk, copying the file, and closing (de-activating) the simulated disk. Thus, the user may come to access historic information based on a selection other than directly choosing a time.

One of the best ways to indirectly index into the past is through file names. For example, consider a user who has the ability to access their historic disk states over the last month. Sometime during this period the user created a file, used it for an hour, and then deleted it Although the user can establish a simulated disk to any point in the last month, the knowledge of precisely to what time to go in order to retrieve the file, generally requires the use of the file activity information stored in the general log. Presenting the contents of the general log correlated with time, along with a search ability, provides the user an efficient method for retrieving the file in the current example.

However, there is an additional method for locating files that no longer exist. This method is more consistent with the industry standard Windows95 Explorer utility for finding files. Explorer uses two windows that essentially allow the user to walk through the levels in a file hierarchy: one window shows the current expansion of and position within the hierarchy, and the other shows the files (and other additional directories) available at this position.

The present invention provides an extension to Explorer wherein the user can right click on a specific file and have the option to view a list of old versions of the file. This list is constructed by scanning the general log. However, the approach does not handle the case where the file has been deleted, renamed, or moved and so cannot be selected.

The additional method is to create a new type of special "disk" that can be examined through Explorer, where this disk does not correspond to any standard physical hard disk, but instead whose contents are generated based on file activity entries in the general log. The file hierarchy for this special disk is formed by combining all relevant file entries currently found in the general log and sorting them. Duplicates are removed, but their associated reference times (that is, when the file existed in time) are noted and used to present a list of old versions, should such be requested. This special disk appears much like the real disk on which it is based, except that if a file ever existed at some location in the hierarchy, providing the file can still be retrieved using saved historic disk states, the file will remain present regardless of whether it was subsequently been deleted, renamed, or moved. In summary, this special disk shows all available old versions of files and directories for another disk in the form of a hierarchy, as presented by Explorer.

Note that it is useful to allow the user to select a file that can be retrieved from the past, and to automatically launch the appropriate application to view the file, referencing either the file on a simulated disk or copying the file from a simulated disk to a temporary directory. (The contents of this temporary directory, when no longer in use, are eventually automatically purged.) This allows the user to not only know of the existence of an old version of a file, but to view its contents without actually formally retrieving the file, as the viewed file is automatically discarded. Therefore the viewed file's existence in terms of being retrieved is hidden from the user in that the user does not have to manage the viewed file on disk.

Simulated Image

The simulated disk image is one that initially corresponds to OS visible disk data from an earlier time. The simulated image is typically viewed through the OS by the user as simply another disk drive. Once established, the user may write to the simulated image, and by altering it creates effectively a fork in time. Eventually when the simulated image is discarded any changes will be lost.

The method of establishing the simulated disk image is to run through the HPDs starting with the current time and go backwards, up to and including the desired reversion time (safe point). For each HPD a corresponding entry is added to the simulated map, thus mapping a current location to an original state. Effectively each HPD processed is undoing a change. If an entry already exists in the simulated map, it gets overwritten. This case indicates a given location has been altered multiple times since the desired reversion point. As the map is initially built, all its entries are flagged as associated with original data. Subsequently, if data is written to the simulated disk then entries of a second type are added to the map. These are pointing to the pages that hold the differences from the initial state.

If a second request to establish a simulated disk image specifies an earlier time than the present simulated disk image, and nothing has been written to the present simulated disk image, then one can start the walk back from the present simulated image (map). This avoids having to start from the current time and building up to the present simulated image time when this work is already readily at hand.

The algorithms for handling a read and write to the simulated image were described in U.S. application Ser. No. 08/924,198, referred to above.

Reversion and the Delayed Move Map

The normal method of reverting a disk to a prior state involves establishing the prior state on the simulated drive, making any further desired adjustments, and then "copying" the simulated drive to the current (which effectively saves the original current state). In some cases there is not sufficient space in the history buffer to allow the straightforward saving of the original current state prior to the reversion and so another method is used. This special case is discussed later.

If there is no difference between the current and simulated images, then the request is ignored. An appropriate status is returned for log-related considerations.

FIGS. 20A through 20H illustrate activity to a disk in which there is one location in the main area and four extra pages to save historic states. FIG. 20A shows the initial state where location #1 maps to and contains value H1. In FIG. 20B a new value N1 has been written to location #1 and the swapping process performed to put everything in its desired location. In FIG. 20C a reversion back to H1 occurs which basically involves copying H1 to location #1. The new copy of H1 is designated H2 even though its value is identical. Frames D through H show this process repeated, thus creating effectively two additional copies of H1, namely H2 and H3, both of which are highlighted.

When performing a significant reversion, that is, one where many pages are affected, a lot of time can be spent duplicating the old original saved states and making them current. There is a certain amount of overhead in copying the simulated map to the current, but the bulk of the time is spent actually duplicating saved states. Although a mapping system is used, the duplication must be done since the data needs to be effectively in different location (in the main area). Further, the historic data used to establish the reversion may at some later time fall off the end of the history buffer (and be discarded). Therefore the duplication must occur. However, in order to avoid a long duplicating delay before the system can be used, another "delayed move map" is introduced.

As its name implies, this new map provides for moving data on the disk without actually having to do the move. What is nice about using this map in conjunction with a reversion is that the reversion, as shown in the FIG. 20 sequence, involves both duplicating and an eventual swap. Use of the delayed move map incorporates the duplicating process into the swap process. For example, instead of moving A to B and then swapping B with C, this swap can simply read from A instead of B. Further, the process becomes a background process, thus yielding faster response to the user.

For each mapped location, a delayed move map entry has two fields. An entry is classified either as a read-side or a write-side type. In the read-side case the source location indicates, for a read, the true location of the data. The link field associates all locations that logically have the value of the source location (though the actual duplication has not yet been performed). If a write occurs to a read-side entry, then it is discarded. This involves unlinking it. Using its source location field as a key into the map, the list header located in the redirected page is found, and then the entry referencing this is identified, and finally the mapping entry is unlinked and discarded. See FIG. 21.

The write-side case represents a page whose contents are being referenced in the handling of reads for other pages. If a read is done to such a page, the mapping has no effect. However, if a write is about to be performed to a write-side page, then the page's contents must first be written to all the linked pages. After the duplication has been done, the read-side and write-side entries are discarded.

Normally it is expected a write-side entry corresponds to a historic page whose contents are being "copied" to new pages using the map. Eventually this historic page falls off the end of the circular history buffer and is re-used, at which time its value is changed. Just before the change, the original value is read and written to all referencing read side entries. The case of a read of a write side entry occurs, for example, if a simulated drive is established that references the page.

Again, the intent of the delayed move map is that it is gradually eliminated as part of the normal swap process after a reversion. Thus the duplication overhead associated with a reversion can be reduced and delayed. However, in the event the swap process does not get performed before affected data is accessed and/or modified, the map keeps things straight and performs incremental duplication as required.

Background reorganization typically reduces the delayed move map to nothing or near nothing. A final background flush process insures that any mapping is eventually eliminated. This is further discussed shortly.

FIGS. 20I through 20M continue after FIG. 20C and illustrate the situation where multiple reversions without any swap processing (or other resolution of the delayed move map) result in stacked (more than one) redirection to a page by way of the map. The progression past FIG. 20C to FIG. 20D and beyond involves the swap process at which point use of the delayed move map is resolved.

The delayed move map linking is represented by dashed lines and arrows in the FIG. 20 sequence.

A reversion performed only in the maps should be at least one order of magnitude faster than actually duplicating the data. The reasoning is that each delayed map low-level node maps about 1,000 pages and so, given clustering of at least 10 pages accessed per low-level node, the duplicating process should be about 10 times faster. Keep in mind that eventually a swap must be performed and so the overall impact is less than a doubling of performance (swap is more intense than a copy). However, the map allows all the work to be performed in the background, which is perhaps a more important feature.

In the case where one is adding a mapping to the delayed move map and finds that the source is already mapped, one simply adds onto the source's link list. This situation arises when multiple reversions occur without having had time to unwind the first's mapping.

A given link list never grows by more than one entry per reversion. In essence this is because a redirection for a given location is to a page that represented the same location at a prior time. A location is never redirected to a page that represented another location as seen by the user.

In a reversion, because the source is always in the simulated disk image and the redirected page in the new image, and because both represent the same location, there can only be one added link between the two. Therefore if the simulated disk cannot reference the same page twice and within the new reversion this cannot occur, then it is not possible to grow a write-side link list by more than one entry in a new reversion. In other words, if A uniquely references a page Ap, and B uniquely references a page Bp, and within a reversion A can only be redirected to B, then the link list growth is controlled. See FIG. 22.

This maximum list growth assumption may be used by the low-level swap processing in assuming what is the worst case number of delayed moves that must be performed when a write-side entry is overwritten.

The specific core algorithm for performing a reversion is to cycle through the simulated map and "copy" each entry to the current image. Since this is effectively writing to the main image, the normal processes allow for an undo of the reversion, should one be desired. The copying process is normally done using the delayed move map.

Special Case Reversion

A complicating factor in doing a reversion occurs when the duplication of data is so much that it interferes with the reversion. Take the case as an example of where most of the extra pages are involved in restoring the desired state. The process calls for copying this information to the main image, which in effect copies all of the original states in the main area to the extra page area If actual copying of data is done during the reversion process, then there is the potential of losing data required to complete the reversion. In other words, as the engine reads one part of the history buffer and writes to another, portions of the buffer may be re-used before they have been moved to the main image. See FIG. 23.

FIG. 24 illustrates the more typical situation where the amount of data involved in a reversion is a relatively small part of the extra page area A reversion is a process of duplication involving normal writes into the historic area. In the prior case where the extra page area was too small to allow duplication then special case processing is required.

The reversion process must take care to process pages chronologically in the history buffer, as opposed to any other order such as, for example, sequentially by location. This insures that HPDs are not re-used until their contents have been processed. Care must be taken to make this process crash-proof. Since the initial state prior to reversion is being discarded as part of the reversion, recovery after a crash must complete the reversion. One cannot return to the pre-reversion state, as required data is gone.

There are two basic approaches to solving this problem. First, the reversion can simply recognize two states: the original current and the desired, as represented by the main and simulated maps. The reversion process would involve switching roles. The downside to this approach is that all states before the current are lost. However, this is inherent in the situation where most of the history buffer is required to do the desired reversion. Doing all the work in the maps allows the process to be crash proof: you would either return to before or after the reversion: the maps are duplicated whereas the extra page area is not.

The second approach is to carefully cycle through the HPDs and do the "copy" in such a way as to never overwrite data not yet processed. Since most of the extra page area is involved, and the part that is not involved is the first utilized for the copying process, this approach yields results that are effectively identical to the first approach. However, this process actually moves the user's data and therefore can require a large amount of time. On the other hand, adjusting maps and allowing the actual moves to occur in the background (swap) yields faster user response.

Therefore there is no advantage to the second approach. In both cases the current and simulated (reverted) images are exchanged. A subsequent reversion can "undo" this process but can go no further back in time. Therefore the first approach is recommended as it is faster.

FIGS. 25A through 25D illustrate a mapbased reversion where the current and simulated images are "exchanged" and all other historic data tossed (6 and 8). Note that the current image map is not maintained but can be rebuilt should another reversion be requested.

Initially in FIG. 25A, the current image map represents to the user a disk image of 1, 3, 5, and 4. The simulated image represents 2, 7, 5, and 4. The "n" represents a link to a page that was written to the simulated map. One could require the swap process to re-order the pages before starting a reversion in order to reduce the current image map, but this is time intensive and another re-ordering will be done after the reversion. Although algorithmically it may be easier to perform a reversion with no re-mapping pending, it is best to avoid any delay in straightening out the re-mapping and allow a reversion based on a non-trivial current image map. A trivial mapping is one in which there is no re-mapping.

FIG. 25B shows a newly established current image map representing the original simulated image. The linking shown in FIG. 25B indicates how the pages must be exchanged in order to accomplish the normal "swap" processing. FIG. 25C shows the results of the swapping, and finally, FIG. 25D shows the historic data packed in the extra page area.

There are four key processes demonstrated in this sequence:
1) Combining of the current and simulated image maps into a new map,
2) Establishing of the linking among the pages to support swap processing,
3) Initializing of the HPDs to support a possible re-reversion, and
4) The packing of historic data within the extra page area.

Packing is done to maximize the unused extra pages available for use before requiring the re-use of pages associated with the original current image. As soon as such pages are recycled, then a reversion to the original current image is no longer possible. Note that the packing process, unlike the swap process, involves actually moving HPDs and their associated data In the swap process the HPDs stay in place and only the data pages are moved.

The need for packing arises when, during the time period which a reversion is going to step over, the same location is written multiple times. Thus the extra page area corresponding to this period contains multiple versions of the same page. Since after the reversion only two states are retained, those intermediate states as represented by the multiple versions of the same pages can be discarded. Their presence in the history buffer represents unused holes that can be recovered by packing. If packing were not done, then the number of extra pages between the first and last associated with the original current image is unnecessarily larger.

The method to determine how to do a reversion, either by copying data forward in time (normal) or by the special case logic, is to first evaluate how much data would need to be copied forward under the normal situation. This is effectively the number of pages actively represented by the simulated map. Next one must determine the size of the extra page area that is available for writing before one would reach data involved in representing the simulated map. If there is sufficient space to save the original states of overwritten pages, then a normal reversion is performed, otherwise the special case logic is used.

The Always Method

The core techniques of the Move, Divert, and Temp Methods of saving historic states of a disk require essentially no knowledge of the nature of data read and written by the OS. All the methods over time return a disk to the state in which data is located where expected by the OS. Saved historic data and the associated overhead is kept in a pre-allocated off-to-the-side area on disk.

The Always Method deviates from the prior three in that it assumes that some basic knowledge is provided by the OS regarding the organization of data on disk. With this knowledge the Always Method's engine takes over the role of really determining where data is placed on disk.

A major implication of this new role is that the engine must cover the traditional de-fragmentation problem. That is, as the OS allocates from its pool of available disk locations a set for a given file, the likelihood that these locations are consecutive decreases over time. Thus when one reads or writes to a file, if its contents are sprinkled over the disk, then the total access time dramatically increases as opposed to when a file's contents are all located nearby.

Information Provided by the OS

Information regarding the disk locations that should physically be nearby as well as those that are de-allocated is periodically provided by the OS. The information may come indirectly from the OS by way of an intermediate program. This intermediate program might, for example, scan the OS's directory and disk allocation structures, compare them with notes it made on the last scan, and forward the differences appropriately.

1. A set of set of locations that should be nearby: {loc_id, . . . }, . . .
2. The set of de-allocated locations: { loc_id, . . . }

The information builds upon that last specified as well as what is inferred from disk accesses (e.g., previously de-allocated pages that are overwritten by the OS are now assumed to be in use). Initially all disk locations are assumed available (de-allocated by the OS). Under some conditions the engine may request that all adjacency and de-allocation information be re-supplied, instead of an incremental update from the known state.

As the system runs, it is recognized that the adjacency information becomes dated and may not reflect the optimal organization. Since this information is used to optimize the disk, incorrect adjacency information at worst leads to non-optimal performance. As long as the percentage of incorrect adjacency information is relatively small, the impact on performance is typically small.

Benefits and Drawbacks

This engine takes a leap from the other methods by treating the disk locations supplied by the OS as simply lookup keys into the engine's own mapping systems. There is no attempt to place data written by the OS to some specified location, either immediately or eventually, at this location. An exception is the case where the engine is removed and the OS resumes direct control of the disk. OS-generated disk locations are referred to as location keys.

There were three primary reasons that the previous methods avoided moving data on disk to locations other than expected by the OS. The first dealt with adding overhead to the read side of accessing the disk (in the Always Method's engine, re-mapping is regularly required). The second reason was the assumption that the OS (or associated de-fragmenting utility) had good reason to place the data at the supplied locations. And third, by re-arranging allocations on disk it is more time consuming to return to an unmapped state. A subtle aspect to this third reason is psychological. Users may fear a software program that "re-arranges" their data on disk and requires that the program be running in order to access the data.

Regarding these reasons to avoid always re-mapping, this method squarely addresses the first two. It employs caching to minimize read-access overhead due to re-mapping. The responsibility for optimally organizing a disk is moved to the engine, with the OS providing guiding information.

The concern about placing the disk long-term in a form which is directly unusable by the OS, and that takes considerable effort to make directly usable, is real for those users that need to disable the engine quickly. Perhaps they want to run software that directly accesses the disk (e.g., another OS that is not supported by the engine). On the other hand, it may be more psychological. People don't want to have to have another program (the engine) running properly in order to access their data. "What if something goes wrong?" might be a typical question. On the other hand, the purpose of the engine is to aid in recovering from situations where things have gone wrong and in those cases one hopes it does not make matters worse.

The benefits of this engine are five-fold: First, often the engine writes data directly to its relatively final resting spot on disk, thus avoiding any swapping. Even though the Temp Method manages to avoid a user-visible performance degradation, the swapping significantly adds to the total amount of disk access. Second, de-fragmenting is automatically performed. Third, all the OS's unallocated disk space is used to hold historic states. Although the engine has a minimum amount of disk space to store historic information, the ability to use unallocated storage may greatly enhance a user's reach back in time. Most users have a significant amount of free space on their disk, if for no other reason, than that it is unwise to substantially fill a disk (as it is easy to overflow).

The fourth benefit is that the engine has few interfaces with the OS and so it more easily adapts to and is isolated from the various operating systems. And fifth, the engine is more likely to hold up under more constant disk write activity without falling into a state of deep fragmentation. If, relative to a file's size, large continuous sections of it are overwritten, then the engine typically allocates these optimally on the disk. If small random sections of a file are modified, then the nature of access is already non-sequential and so fragmenting the file has less of an impact on performance. See the Temp Method and its discussion of deep fragmentation concerns.

Desired Location Map

Figure 26:
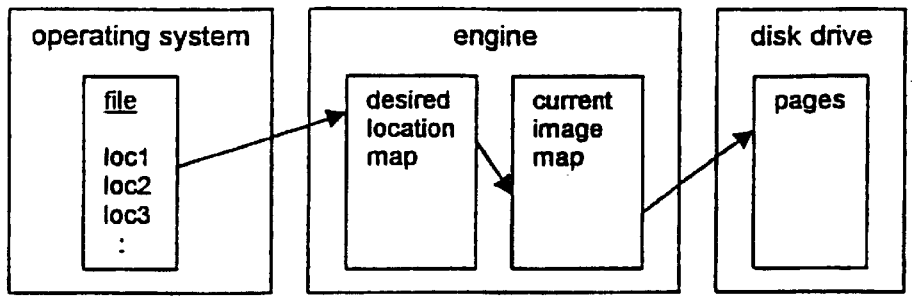
FIGS. 26–27 illustrate how a disk read access moves from the operating system through the engine to the disk drive.

FIG. 26 illustrates in general how a disk read access moves from the OS through the engine to the disk drive. The OS initiates a read of a location associated with a file. Without the engine this would be the location on disk of the desired data. However, when using the engine, this location is simply a lookup key. The engine looks up this location and determines where it has really been assigned. This desired location is then run through a current image map that indicates if it has a temporary re-mapping. The disk is then finally accessed.

The role of the desired location map in the engine is to map a location as specified by the OS to where it has really been assigned (desired location). Past this stage the engine borrows from the Temp Method in providing for a current image map that allows yet another redirection. This re-direction occurs when, for various reasons, the desired location is not available and so the data is stored in an alternate location. Thus the desired location map reflects where data should optimally be located, given de-fragmenting and other concerns, and the current image map reflects the needs and actual organization of the moment.

The engine's use of a double mapping system is very powerful. It allows for quick major re-organizations of data on disk and thus minimizes interference with the user's ability to continue working. Immediacy is achieved by initially only logically "moving" data using the desired location map. The move is accomplished by adjusting the map, rather than actually going to disk and moving the data. Changing a map is many times faster than actually moving disk data. Granted, the user does not realize any performance gains by the logical move. The disk head must still travel far and wide to pick up non-optimally organized data. However, the framework is laid to move to the more optimal organization incrementally and in the background.

Figure 27A:
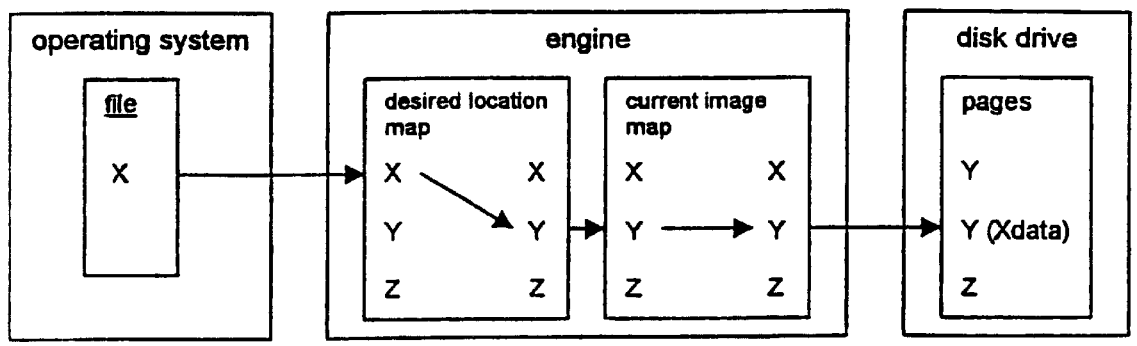
Figure 27B:
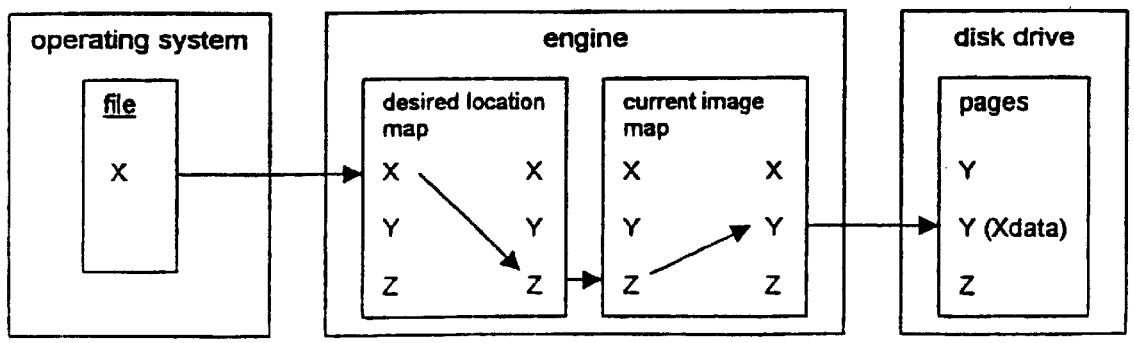
Figure 27C:
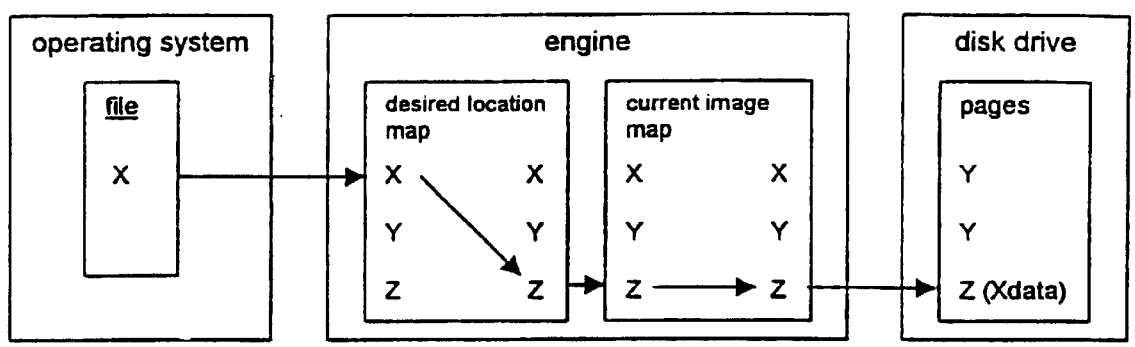

Double mapping is what allows changes to the desired location map without actually moving data on disk The second current image map is adjusted many times faster than actually moving data, and this second adjustment can compensate for a change to the desired location map. Thus, for example, before changing either map, the OS would present a location key X, which correlates to data at disk location Y (FIG. 27A). It is determined that overall access to this data is better achieved if it is at location Z. One could move the data and request the OS to direct future references to Z, but this is time-intensive and therefore delays the user. Instead, the desired location map is adjusted to indicate that any reference by the OS to location key X is really at Z. At the same time, since the data is not really at Z, the current image map is adjusted to indicate that temporarily the data for Z is really at Y (FIG. 27B). Then, in the background, the engine eventually moves the data to Z and the current image mapping is removed (FIG. 27C).

Note that when accessing back in time through a simulated drive, the desired location map and blocking maps must also be restored. Changes to these maps are logged using the same mechanism that handles the General Logged Data. This facilitates re-creating them as they were at various points in time.

Blocking of Disk

Aside from management overhead, the disk basically contains data visible by the OS and historic data representing the original states of data overwritten by the OS. Consistent with the Temp Method, data that is visible by the OS is called the current image and generally is located in the main page area. The historic data is located generally in the extra page area It is visible to the OS through a simulated disk along with any appropriate data from the current image. These "areas" as a result of the engine's mapping, are typically intermixed and spread across the physical disk.

The goal of the engine is, in general and for the main area, to physically organize it so that sequential page allocations corresponding to a given file are, after all mapping, sequentially allocated on disk. To a lesser degree it is desirable to locate small files within a given directory near each other. In other words, the engine seeks to keep the main area de-fragmented, based on adjacency recommendations from the OS. Thus, when sequentially reading a file the corresponding pages are fetched physically from consecutive locations on disk. This minimizes the need to move the disk head.

The goal, in general, for the extra page area, is to physically organize the historic pages in chronological order, within a circular system. Thus when allocating the oldest historic pages for re-use to hold data newly written by the OS, the allocations are sequential.

It is undesirable to have a single change lead to shifting around the entire contents of a disk. If this were true, almost any disk write activity would lead to massive disk reorganization, which is not good even if done in the background. Thus the approach taken is to organize the disk into blocks of pages that are reasonably independent of one another. Thus small changes in general affect only a handful of blocks, if even that many. Keep in mind that the previously stated major benefit to this engine is that it is more likely to take newly written data from the OS and place it on disk in its relatively final resting spot.

The number of pages in a block is selected by weighing the disk transfer speed against disk head seek (positioning) time. When a block is sufficiently large, the amount of added time to jump from reading one block to another is relatively small compared to the time it takes to read the data from the two blocks. On the other hand, it is best to use the smallest reasonable block size to minimize the amount of data that must be shifted around when manipulating the pages within a block. Further, a small block size facilitates caching blocks in RAM.

The engine has four primary block types. A main area block contains only pages that are currently visible to the OS. An extra page area block contains only historic pages. A CTEX block is one that had been a main area block but is now in the process of becoming an extra page area block CTEX stands for converting to extra pages. A CTMA block is opposite of a CTEX block. Its pages are in the process of converting from extra to main area pages.

Four other block types exist. An unused type deals with storage before it is ever written. An overhead type addresses allocations that hold data internal (overhead) to the engine. There is a special main area direct block whose pages require no mapping. Thus a read access in such a block requires no checking of the desired location, current image, or delayed-move maps. A special CTEX block with unused pages supports the situation where unused pages are exchanged into a CTEX block as part of a consolidation at a safe point.

Block Types
1. Main Area Block
2. Extra Page Area Block
3. CTEX Block
4. CTMA Block
5. Unused Block
6. Overhead Block
7. Main Area Block, Direct
8. CTEX Block, with Unused Pages Allocations of the engine's various internal data structures that are stored on disk are made from different sets of overhead blocks, each set corresponding to a given fixed-size data structure. Thus each set of overhead blocks is managed like an array of fixed size entries. A bit map indicates whether an entry is available or in use. The segregation of sizes avoids fragmenting issues. At most two blocks within a given set should be combined when both fall below half full, thereby returning a block for use in holding historic data. The maximum number of overhead blocks required should be computed and a corresponding minimum number of blocks should be set aside for extra page area blocks. It is from these that overhead blocks are taken and by having a minimum properly established, it is known that an overhead block is always available when needed.

Figure 28:
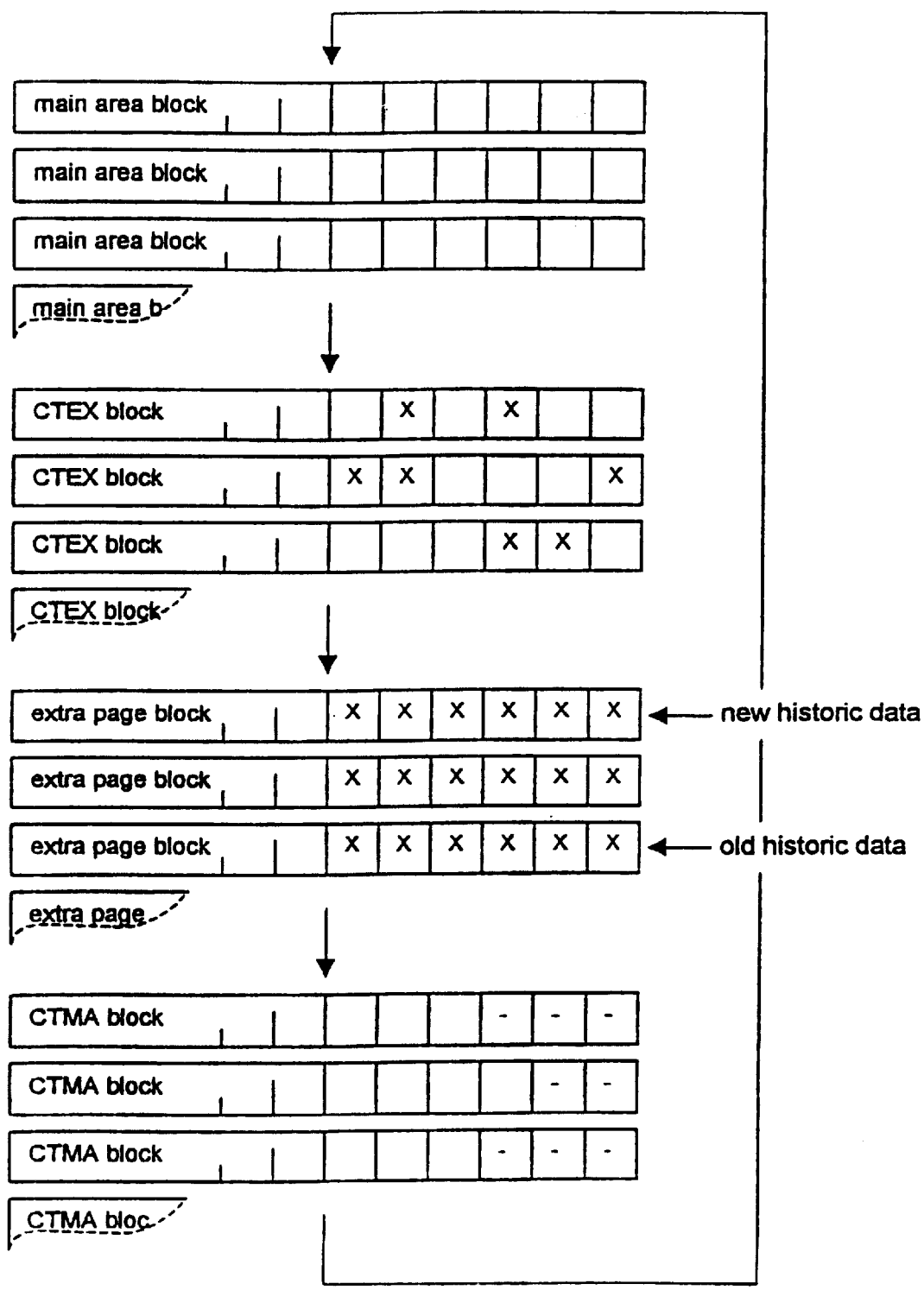
FIG. 28 illustrates the blocking of a disk.

FIG. 28 illustrates the relationship between the blocks as they rotate through the four primary roles. Note that the block types are collectively shown grouped together but in reality the block types are intermixed on disk. The grouping is established through non-physical means such as a table of pointers. An "M" in a block's page indicates main area data (OS visible), an "X" is historic data, and "—" is an unused page.

It is desirable that the order of allocation of extra page blocks corresponds to the blocks' actual order on disk. Thus, if a very large amount of data is written, not only are its main area pages (that are within a block) located near each other (on disk), but the blocks themselves are nearby. This optimization is desirable but is not as important as getting a file's data at least allocated within blocks. To accomplish a perfect extra page block order one likely has to swap historic pages around. Essentially, one is putting all the historic data in chronological order. It should be noted that this exactly how the Temp Method organizes its historic data However, although main area allocations are made out of this area, since they are put back, a file does not retain this initial nice ordering.

The question must be asked, why go through all the work, albeit in the background, to re-organize the historic data when, in fact, a larger file may never be allocated and therefore the work was in vain. If one did not do the reorganization, but waited until a large file was in fact written, then one could rely on the adjacency provisions to eventually lead to background swapping to attain the same end result. Thus one trades off doing background work first, knowing it may be wasted, in order to immediately, possibly write a large file to more optimal locations. It does not appear useful to extensively reorganize extra page blocks.

However, with a little work, a limited form of optimization is possible. One can have an allocation window at the end of the extra page blocks such that the last N blocks are allocated together. This implies their historic contents are tossed, but at the same time, now allows blocks to easily be rearranged using pointers (in the Blocking Map). Thus a window of the N oldest extra page area blocks should be maintained from which CTMA blocks are formed. As new blocks come into this window, and their contents are discarded, a re-ordering optimization is done, if appropriate. A window of a megabyte, or roughly ten blocks, is reasonable. The end result is to re-form larger continuous portions of disk, which may be useful in de-fragmenting. The chances of this optimization coming into play are good because often a user may de-allocate or overwrite a set of files that all reside in the same physical area This original grouping occurs if the files were initially created around the same time, which is reasonably likely.

One final adjustment to this extra page block re-organization is that the window of N pages can be increased to extend all the way through a safe point that has been cut in two. This is because a partial set of historic data for a given safe point is not usable, and so all of its pages essentially become "not in use" as soon as the first page from the set is taken.

Writing to the Disk

When the OS overwrites data, the new data is placed in a CTMA block. Since the new data is placed in unused pages in a CTMA block, diverting the writes here inherently saves the overwritten data, from the file's viewpoint. How this saved (historic) data is tracked is discussed shortly. For now this description will focus on writing the new data.

In addition to supplying the data and the associated location key, the OS, when writing, can also supply a file identifier. If specified, this identifier allows the engine to direct new data from different files to different CTMA blocks. The engine allows a limited number of CTMA blocks to coexist in order to support the OS simultaneously writing to a limited number of files. By sending new data for each file to a different CTMA block, the engine de-fragments the files. As more CTMA blocks are supported at one time, the historic data is more rapidly discarded.

In other words, the CTMA blocks reduce the number of extra page blocks, which reduces the distance the user can see into the past. Of course, this is all relative. If the blocks are 50 k bytes and writing up to 20 simultaneous files is supported, one megabyte of disk is used. This is a small percentage compared to perhaps the gigabyte of extra pages that might exist.

If the OS does not supply a file identifier with each write request, and there is no other way to distinguish location keys data from different files, then new data is simply written page after page into a single CTMA block. However, it is common that files are written one at a time, in which case there are no fragmenting problems. In the long term, the OS supplies file layout information that facilitates de-fragmenting, should it be required.

In general, CTMA blocks are created by taking the extra page blocks containing the oldest historic data, discarding the data, and filling them with newly written data. Once a CTMA block is entirely filled it becomes a main area block. See FIG. 29. However, in the beginning a disk consists of unused blocks and it is from these that CTMA blocks are allocated until there are no more.

When allocating CTMA blocks from the unused pool, as a mapping optimization, one should see if the OS-specified location key, for which the CTMA block is being allocated, corresponds to a page that is within an unused block. If so and there is no other re-mapping of the page in the system, then this unused block should be allocated and the indicated page used. If this is done, then no desired location mapping, current image mapping, nor delayed move mapping is required. Further logic attempts to maintain a one-to-one relationship between the subsequent OS's write locations and those actually allocated on disk. If an entire CTMA block is filled with writes in which no mapping of the OS's location keys to the associated disk locations is required, then the block converts to a special case of a main area block type, a main area direct block. When a read access to such is detected, which is quick to check using the Blocking Map, the normal re-mapping checks are avoided and thus access throughput is enhanced. For most users there is an initial amount of data loaded onto a hard disk for which this optimization is useful. Of course, overwriting any data in a direct block introduces re-mapping and thus the block loses its direct status.

As new data is written, the desired location map is adjusted to associate the OS's location keys with the pages in the CTMA block. Note that the current image map for these locations may indicate a temporary re-mapping, even as the data is written for the first time.

Data becomes historic when overwritten with new data by the OS. Diverting the new data to a CTMA page inherently saves the original data. During the time between safe points, the engine supports more than one CTEX block. These blocks contain both OS-visible data (main area) as well as historic data (extra pages). When a page becomes historic, if it is already in a CTEX block, then other than noting its new status, it does not need to be moved. If the page is in a main area block, and the number of CTEX pages is not at the limit, then the main area page changes to a CTEX type. The number of CTEX pages is limited for the same reason that CTMA pages are limited.

If the number of CTEX pages is at its maximum, and a page in a main area block has become historic, a page swap is performed between the main area block and one of the CTEX blocks. One knows that every CTEX block contains at least one main page, for otherwise the block would become an extra page block. Therefore, a main area page in a CTEX block can be identified and swapped with the newly historic page in its main area block. If a data swap on disk were actually done, this would take considerable time. Instead, the swap is initially accomplished by updating the maps. This situation is borrowing from the techniques in the Temp Method.

It is possible that the OS will overwrite data it has recently written, but not so quickly as to be in the same write session (safe point). Thus the data to be overwritten may be in a CTMA page, which cannot have historic data. The solution is to swap the data into a CTEX page, taking main area data from the CTEX page and putting it in the CTMA page.

In summary, if the OS overwrites data (making it historic) in:

1. a main area block, then a transition to a CTEX page occurs (FIG. 30) or a swap occurs (FIG. 31),
2. an extra page area block, this is not possible as this block's pages are not visible to the OS,
3. a CTEX block, then this block's conversion to an extra page block advances (FIG. 32), or
4. a CTMA block, then a swap with a CTEX page is performed, advancing the conversion of both blocks (FIG. 33).

After the write session concludes, the CTEX blocks are combined into one. This process may yield main area blocks, given a sufficient number of main area pages. Likewise, extra page blocks are also produced, given a sufficient number of extra pages. What is left over, if there are any pages, establish the single CTEX block that is carried over into the next write session. Between write sessions the CTEX blocks are consolidated into one so that a single point in the set of extra pages and last CTEX block marks the session's end. The actual moving and re-arranging of pages is left for the background by initially doing the consolidation in the maps. See FIG. 34.

When combining CTEX main area pages to form main area blocks, the engine attempts to minimize the breakup of continuous runs of adjacent main area pages. It is presumed these runs represent main area pages that are specifically located next to each other as a matter of optimization. The technique of simply filling until full, a given CTEX block with another's main area pages, and then moving on to another CTEX page to fill, is very likely to breakup a good number of runs. Typically, a run is broken every time the filling process hops from one CTEX block to another. A better approach is to first move, in a filling process, continuous runs in which break up does not occur. One should start with the smaller runs first, then use the larger runs to fill in—thus forming main area blocks.

What is not shown in FIG. 34 is the situation where there is a set or subset of CTEX pages, where during a consolidation, their contents are moved to the final partially filled CTEX page. Moving main area pages out of CTEX blocks transforms these blocks into extra page area blocks. Though this process does accomplish the consolidation, there is an alternative to moving the main area pages to the final CTEX page. The problem of dumping main page scraps into the final CTEX page is that, in the next round of consolidation, they may yet be moved again, for the same reason. Given that a block has room for hundreds of pages, there may be considerable multiple moves of the same main area pages until their CTEX block fills and becomes a main area block. The alternative destination for scraps of main area pages is the CTMA page or pages (or establishing one, if required). Moving them here still leads to the desired transformation of CTEX blocks into extra page blocks, but the moved data is not so susceptible to re-moving in subsequent consolidations.

In the following use of FIGS. 34A through 34O, there are details and processes that may differ in actual use. The example focuses on one aspect to make its point, and does not represent the true steps in working system. See the upcoming paragraph regarding the difference between CTEX and CTMA pages.

FIGS. 34A through 34H illustrate the effects of moving scraps to the final CTEX block, whereas FIGS. 34I through 34N move the pages to a CTMA block. The important difference between the sequences occurs in the moving of page "A" twice when a CTEX block is the destination. This example involves an unusually small number of pages making up a block, and so one should realize that in practice, the multiple moving of "A" would be multiplied many times.

FIG. 34A illustrates a starting point. The two circled "A" are overwritten with "a" data. The result is shown in 34B. Another two "A" pages are overwritten (circled) with 34C showing the result. Now, at a presumed safe point, there is a consolidation, moving scraps into the remaining CTEX block (#7). In 34D there is seen the first moving of "A". Now four "B" pages are overwritten with "b" data. The results are in 34E. FIG. 34F shows another consolidation, with two "C" pages getting overwritten and the results shown in 34G. One last consolidation shown in 34H yields the second moving of "A".

Figure 34G:
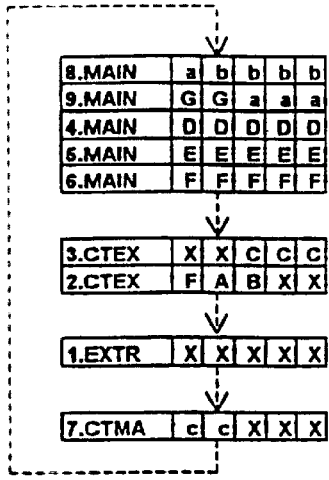
Figure 34H:
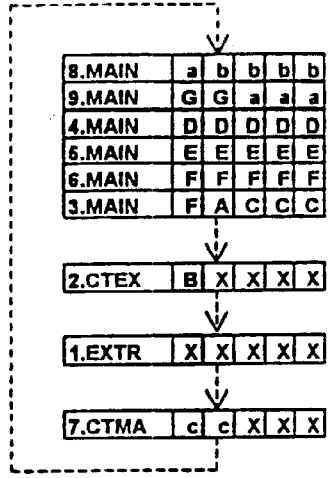
Figure 34I:
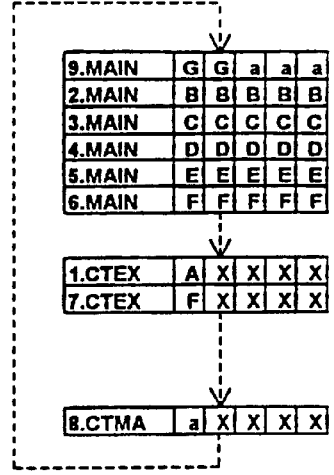
Figure 34J:
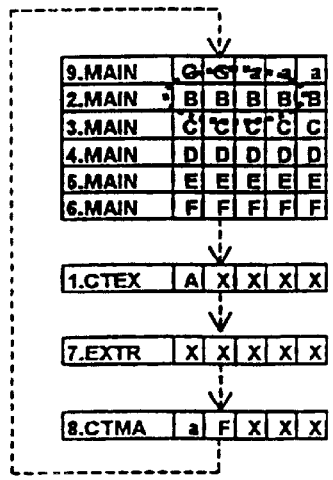
Figure 34K:
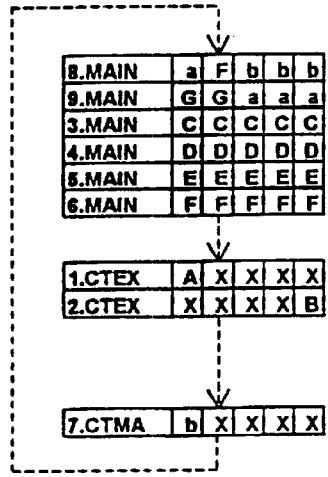
Figure 34L:
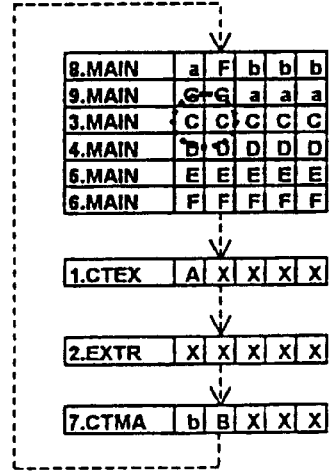

This writing process is now repeated, only with scraps going to a CTMA page. FIG. 34I is identical to 34C and picks up at the first consolidation. The results are shown in 34J. The "B" overwrite occurs and yields 34K, whose consolidation is shown in 34L. The "C" pages are overwritten, yielding 34M, which is consolidated in 34N.

Note both sequences have the same net effect in terms of the data in the system. FIG. 34O tallies up the data in the system, confirming that the sequences produced the same result. However, the sequences differ in where data is placed and how many moves were required to get to this result Keep in mind that the maps, which are not shown in this example, are tracking the pages' locations.

There is a difference between using CTEX and CTMA pages in consolidating main area pages. In addition to moving the main area pages into one of these blocks, one is also moving pages out. The operation is an exchange. In the case of a CTEX block, it is an historic page belonging to the current write session that comes out It is easily moved to another CTEX page (with the upcoming ordering notes taken into account). However, the historic pages in a CTMA block have been "cleared" (set to unused) and therefore cannot be moved into a CTEX block This problem is solvable by supporting a special CTEX block that can contain unused pages, and over time its non-unused pages get moved out. This process transforms the block into an unused type. This optimization is a tradeoff between complexity and increased background swapping. See FIG. 34P where "X" pages are now distinguished as "Y" for those with historic data from the current write session and "Z" for unused empty pages.

During a combine, when moving extra pages between the CTEX blocks, in general as long as the extra pages are from the same write session, then their order within the blocks does not matter. However, if the tracking of duplicate writes is disabled, then it is important not to change the order of duplicated writes. More specifically, the first recorded write (original state) must remain the first. If a swap would yield an undesired duplicate write being relocated to occur first, it is invalidated so as not to interfere with the true first original state.

All extra pages in the final CTEX block should be justified to one side to facilitate marking a point in the block after which historic data for the next write session is appended. Further, during the next write session this CTEX block must be the first filled and migrated to an extra page block to insure that all new historic data is added to the set of extra page blocks after those from the last write session.

The Effect of De-allocating the Disk

It is worth a moment to contrast the write processes of the Temp and Always Methods. In both cases the new data is written to some alternate location other than that specified by the OS. In the Temp Method the diversion preserves the original state of overwritten data. Its focus is maintaining past states. However, the scope of the Always Method includes attempting to place newly written data in likely unfragmented locations. This is a location from which near optimal disk access occurs when accessing the data in its most likely context, that is, with the rest of the data associated with its file.

Writing to a page in the Temp Method displaces the previous contents of the page to the history buffer. A swap is required in order to get the current state of the page back to the location specified by the OS and to get the original state into the history buffer.

One of the major benefits of the Always Method is that writes do not always require swapping. Consider first the case of overwriting a large file. In general, what happens is that extra page blocks are taken and filled with new data, turning them into main area blocks. The main area blocks that had contained the file's original data are turned into extra page blocks as they now contain historic data. Aside from writing the new data to disk (which must be done in any method) the only other activity is limited to adjusting states in the maps, block, and page descriptions. No massive swapping is required.

Knowledge of de-allocations in the OS is periodically provided to the Always Method. The benefit to knowing of de-allocations is that the affected area is made historic without having to wait for the area's overwriting. Further, lots of small (file) de-allocations are consolidated, thus increasing the chances of completely converting main area blocks into extra page blocks. Thus, the process of making "overwritten" data historic moves later in time, from when the data is re-used to when it is de-allocated. This by itself is not likely a big performance improvement. The fact that small de-allocations are combined thus producing more extra page blocks without the need to move out any remaining main area data eliminates some swapping. These are reasons for knowing about de-allocations.

However, a downside to knowing about the OS's de-allocations is that the information must be correct When the engine makes de-allocated storage historic it adjusts the desired location map to indicate such. Therefore, if the OS attempts to read de-allocated storage, since it may no longer exist, the engine returns some consistent state (as well as flags a possible fault condition). Thus, the behavior of the disk as viewed through the engine now differs from that without the engine. With no engine in place, when the OS reads de-allocated pages, it sees the data that was last written. Technically an OS could make assumptions based on the persistence of the state of de-allocated pages. However, this is not likely, and runs contrary to having a utility perform de-fragmentation. Such a utility would make a similar assumption as the engine about the insignificance of the data in de-allocated pages.

There is an important reason for the engine to know about de-allocated pages. It changes the balance between main and extra page area blocks. De-allocating pages converts main area blocks to extra page blocks. Therefore, more storage is available to hold historic information. This provides the user with a greater information recovery reach into the past. If the engine does not receive de-allocation information then pages become historic only by writing new data, which is a process of exchanging pages between the main and extra page areas. Here, the balance remains the same.

If the OS does not inform the engine of de-allocated pages, the engine does not allow the recycling of these pages for the use in holding historic states. This needlessly reduces a user's recovery reach, as the contents of de-allocated pages should never be required. Therefore, the storage can be put to better purposes.

The Move, Divert, and the Temp Methods do not make use of de-allocated storage. They require a fixed area be set aside for holding historic information. On the other hand, the Always Method makes use of unused (de-allocated) space on a disk. This allows for a dynamically sized history buffer. The user automatically has greater recovery reach when utilizing less of the disk, and at the same time, when the user requires more storage, the history buffer yields it back. A minimum history buffer size can be provided, forcing upon the user a disk overflow condition as opposed to giving up the option to revert to some minimal distance back in time.

The OS Cache

The engine generally assumes that writes are passed along to the engine, without re-ordering. Thus, if an application writes A, B, and C to the pages of a file, the engine eventually gets these three writes in the same order. However, an operating system is likely to use a cache that has the potential of reordering the writes. For example, the prior writes of A, B, and C go into a cache. Later, when the cache is flushed, the pages are passed to the engine, but their order could be altered. For example, the pages could come to the engine in the order B, C, and A. This ordering would not reflect the likely order of future read accesses, which is contrary to what is assumed by the engine.

Therefore, when integrating the engine with an OS, the effects of its cache on write ordering should be understood. Appropriate steps should be taken to ensure that the order of writes reasonably predicts the future order of reads.

When Out of Sync with the OS

The benefits have been argued of having some OS knowledge for the purposes of de-fragmenting. The engine wants to know what pages are likely to be accessed after one another, because, among other possible reasons, they occur consecutively in a given file. It is also useful for the engine to know a page's de-allocation status so that it can be reused to hold historic data This information is provided periodically to the engine. Thus, since it is not instantaneously provided to the engine, the engine may have "acted" on incorrect information. This occurs when the OS provides information to the engine but then changes it before the next update. During the time in between updates some percentage of the information may be incorrect In fact, if from one update to the next the information supplied to the engine differs, then by definition the engine had incorrect information during some part of the time between updates.

Given this, the question arises as to the ramifications of acting on incorrect information. Regarding a file's data placement relating to de-fragmenting, the worst that happens is incorrect de-fragmenting. In this case, the engine re-organizes pages on disk thinking it is placing pages belonging to a given file near each other, when in fact, it isn't. The harm is limited to less than optimal access to the data, which is an effect that, in general, does not interfere with the general operation of a computer.

The next area of concern regards the de-allocation status of pages. There are two cases to consider: First, the case when the engine believes a page is de-allocated but the page gets allocated and written before the engine is "told" of the page's allocation. In fact, this is almost always the case. When writing to a new file, the OS gets an unallocated page, puts new data in the page, then writes it to disk. The various directories and maps used by the OS may not even reflect, on disk, the page's change in status before the page gets written.

The OS informs the engine that a page is allocated not simply by writing to it but also by including it in a set of allocations that should physically be mapped nearby each other. However, since this information is provided only periodically and in the background, it is unlikely the data written to files is not flushed before the update.

The act of writing to a de-allocated page is therefore not a problem, but rather the norm. When the OS originally told the engine of the page's de-allocation, an appropriate note was made in the desired location map. Later, the engine detects when a write occurs to this previously de-allocated page. Since the engine does not associate physical disk locations with these location keys specified by the OS, the engine does not interpret the write as overwriting any data at all. It simply fetches a new disk location that had contained very old historic data (from a CTMA block) and assigns it to the OS's location key.

The second case relating to de-allocation is when the engine believes a given location key is not de-allocated when in fact it is. This situation by itself simply leads to the inability of the engine to make use of the page for storing historic data. Thus the user's reach back in time is reduced. However, this condition is resolved in the next update. In order to more quickly inform the engine of de-allocations, a special monitoring program (running under the OS) looks for rapid de-allocations of significant disk space. If such is detected, the program can trigger an update, thus keeping the engine more closely synchronized. However, assuming the user has specified a reasonable minimum amount of disk to reserve for saving historic states, a delay in expanding the history buffer should not normally be of much concern.

The next step in this scenario occurs when the page is allocated to a file and written. Thus the engine thinks the page belongs to a certain file, when in fact it has been de-allocated, but then is re-allocated to perhaps a different file and written. Since the file identifier supplied (if any) along with the write is current, the engine will not incorrectly associate the newly written data with the old file (this is only important if writes are also occurring simultaneously to the old file). In fact, during the write process, the engine is not referring to any of the overall file information supplied during the last update. What the engine sees is that some data is being overwritten.

The overwrite of a page that has been, without the engine's knowledge, de-allocated and re-allocated to another file is handled much like the case where the page was simply modified within the same file. The overwritten page is made historic and the newly assigned location from the appropriate CTMA block takes over its role. The engine may choose to leave the data in the CTMA block, therefore adjusting the desired location map accordingly. Alternately, the engine can seek to put the data back in the existing overwritten location. Thus, the desired location map would not change, the new location is considered only temporary (through re-mapping), and eventually a swap puts it back in its location as specified by the desired location map. This scenario is similar to what occurs in the Temp Method.

In this case where an overwrite's new data diversion is considered temporary, with a swap pending, waiting for the next OS update may yield an optimization. If an OS update occurs before background swapping, an adjustment to the swap can be made to avoid a double move: a first move placing the page in with the old file's data and a second move de-fragmenting the page, moving it near the new file's pages. In other words, if the engine learns before processing pending swaps that a page really belongs to a different file, it adjusts the pending swap to place the page with the new file.

To Move or Not to Move

As set forth above an interesting question was raised concerning where new data that overwrites old data should ultimately be placed: in a new area or in the place of the overwritten data. The latter choice implies that a swap must be done. There is no way to answer this question, at least at the time of the overwrite.

There are two basic overwrite situations. The first is that a small amount of data in a file is overwritten. In this case, assuming the file's existing allocation is optimal, it is best to swap the new data back in place while moving out the original state. On the other hand, if most of the file is overwritten, then it is best to leave the new data in its newly assigned locations, since these locations are likely optimal. The goal in both cases is reducing the amount of swapping. It is difficult to distinguish the cases at the time of the write since one cannot anticipate how much more data will be written in the future, and how fast (i.e., one could overwrite a file but over a long period of time). Further, if a file's size changes then leaving the new data where it is initially written likely reduces further re-arranging: If the size shrinks, then there will be space to recover (packing); if it increases, then perhaps separate areas will have to be combined.

It is recommended that overwrites not be treated as a temporary diversion, as in the Temp Method, but as an attempt at placing the newly written data in an optimal location. The engine relies upon long-term de-fragmenting (based on the OS's updates) so that it can correct the situations where its adjacency assumptions are in error. The correction takes the form of setting up to swap the data back to its originally assigned location. Thus, at worst, establishing the swap and performing it are delayed. What is avoided is moving large blocks of overwritten data around when such does not lead to more optimized conditions.

Thus when data is overwritten, the engine modifies the desired location map to reflect what it hopes is a new optimal placement The swapping mechanism borrowed from the Temp Method is thus utilized differently than with the Temp Method: it is not used to swap pages back to their original overwritten location. It is used, for example, in re-arranging the contents of blocks, facilitating their transition from one block type to another.

Of course, if the engine is informed that a file's storage has been de-allocated before it is re-allocated, then the whole overwrite condition is avoided. The de-allocated storage becomes historic and new storage is assigned when it is re-used. However, applications may either choose to de-allocate a file before writing new data, or simply to overwrite and release any leftover storage. Thus in general it is best to make short term assumptions that imply the least amount of moving. In time the engine can make more optimal assigns, if any, given the wider perspective of the pages on disk that are in use and those which should be located near each other.

None of this is of concern to the Temp Method as it never attempts to select final, near optimal, locations to which to "divert" overwriting data. The Temp Method's diversion is always temporary, which is opposite from the goal of the Always Method.

Disk Access Performance

For the moment, the desire to maintain prior states of overwritten data is put aside. How does the engine's performance compare to the OS directly accessing the disk? First consider writes. Since they are diverted to a reasonably continuous area, the new data transfer itself should be unaffected. The main area map must be consulted for possible temporary re-mappings, but often this map contains no re-mappings and thus introduces little delay. The significant extra work arises in the updates to the desired location map and registering the overwritten data, if any, as historic. Assuming the overwritten pages are located near each other, multi-page updates generally occur within the same CTEX block's historic mapping table. If exchanging historic and main area pages is required because the affected main area block cannot convert to CTEX, more disk access is needed to set up the swaps. However, if writing a single file, this will seldom be the case.

The major concern is with consulting the desired location map. This map is translating the OS's location keys to actual disk locations, subject to temporary re-mapping. This translation is also the major added step in processing read requests from the OS.

The desired location map is a table of dmap entries, one for each location key. A map entry consists of a disk location field packed with a 3-bit type field, in typically four bytes. Since the desired location map is allocated twice so that changes can be made to a transitional version, each location key really requires eight bytes of desired location map support. If the disk's page size is 512 bytes, then the map is using 16 bytes per 512 or about 1.6% of the disk, which is reasonable.

One dmap type indicates that the corresponding key location is de-allocated. In this case there is no real page assigned to this key location. Should it be read by the OS, some arbitrary but consistent data is returned, and a user-alert status is set. Another type indicates an adjacency link, which is discussed shortly.

One might also reserve a type indicating a disk error, should the engine encounter this condition outside the context of an OS read, and thus need to save it for eventual reporting to the OS in response to later reading the location. One scenario might be that a swap was being done and the engine could not read some data As the swap progresses the trouble spot gets re-written with new data and thus cures the condition. However, in general, it is recommended that the engine shut down its background writing processes since disk error conditions frequently reflect correctable problems that are temporary in nature. Thus it is best to alert the user and avoid making any transitions to new safe points as the disk is perhaps only temporarily unreliable.

The dmap type can indicate it is re-mapping the location key in the main area. Note the main area map may again re-map this location. Also, incorporated into the type is adjacency information, which is discussed shortly.

The following table outlines dmap types and the use of the entry's remaining bits.

000: de-allocated page, other bits unused
001: adjacency link, link in remaining bits
010: disk error, other bits unused
011: (unused)
1xy: re-mapped, other bits indicate new disk location
xy: 00=start of adjacency location key set
01=end of set
10=middle of set
11=not part of set With a page size of 512 bytes, and using the 29 bits available for re-mapping disk locations, the addressable space spans 256 gigabytes. Additional precision may be added as appropriate.

Returning to the issue of disk access performance, consider the case of a file consisting of a single page located somewhere in the middle of the disk. When the OS reads this page, one disk access is required to pull in the appropriate section of the desired location map (assuming that it is not already in the cache). A second disk access is then required once the actual location of the page is known. Since only a single disk access is required without the mapping, performance is cut in half. However, very few files are this small, and caching may hide much of the overhead when the OS is accessing small files in succession.

Next consider the case of a larger file that the OS has allocated across five areas on the disk, but that our engine has re-mapped to adjacent disk locations. Now when the data is read, only a single disk seek is required, instead of five. But the catch is the entries mapping the OS's location keys into a single area are, reflecting the OS's allocation of the file, spread out in the desired location map. Thus potentially five different sections of the map must be consulted, thus keeping the overall number of seeks at twice that normally required. The doubling occurs because if a file is read a page at a time, a lot of disk head seeks are required. A seek is required to pick up one part of the desired location map, then jump to read the indicated data, then jump to read another part of the map, then jump back to get more data. It does not matter that the file's data has been located together, as jumps are required anyway to handle the intermixed accesses to the desired location map. This overhead is why the Temp Method sought to avoid long-term re-mapping.

Caching of the desired location map will certainly cut down on the overhead. It has a density 64 times that of the data. In other words, an 8-byte dmap entry maps to 512 bytes of data, which are typical sizes. Thus 100 k of cached mapping is covering 6.4 megabytes of disk. Access may tend to be in regions of the "disk" as viewed by the OS's allocations. This occurs because related files are allocated and de-allocated around the same time. Fragmentation may not be totally random and spread across the whole disk. Thus, in the prior example, if the required sections of the desired location map were cached, there would be a fivefold improvement in accessing the file. However, it takes time to build up caching and so initial accesses still are slow.

A solution to the problem of having location keys that correspond to what should be nearby data spread throughout the desired location map is the use of an adjacency map. This map is built and saved in its own area at the time of an OS update. The map is simply a table that correlates location keys with their re-mapped locations. The corresponding entries in the desired location map cease to indicate re-mapped locations but instead link to the adjacency map.

The example of a file spread across five areas, as allocated by the OS, is now reconsidered. The engine has placed all the data together on the disk and during the last OS update, an adjacency map was built that, in a single map, indicates where all the file's pages are re-mapped. Now there is obtained a read request of the file's first page. A read occurs to the desired location map, which in turn leads to reading the adjacency map, which finally directs one to the page's true location on disk. Thus three disk seeks are required to read the first page, which is a big degradation in performance. However, as reading of the file continues through the five areas, the initial loading of the adjacency map suffices to re-map the remaining accesses. Since the file's data has been consolidated in one area, no further disk seeks are required to read the remaining data. Thus, where the OS would have had to jump around to five areas without the engine, or six or more areas with only the desired location map, the use of an adjacency map has reduced to the count to three. With caching, subsequent reads of the file may require only one seek.

Clearly, one would not want to introduce the overhead of an adjacency map for a file consisting of location keys falling into one or two areas. In these cases it is better to use the desired location map. However, it is still important that the engine know that the pages in these areas should be physically allocated nearby. A record of this, which is the adjacency information supplied in an OS update, is kept by encoding in a page's dmap type a start, middle, and end of adjacency. A fourth state indicates the page has not been flagged to be adjacent to any other page.

The engine scans the desired location map and the adjacency maps to insure that allocations flagged to be adjacent still remain so. Overwriting data, which results in the overwritten data being placed (allocated by the engine) elsewhere, can alter what was a good situation. Depending on the amount of data written, the desired adjacency may be lost. If a small amount of data is overwritten, then a file whose contents were actually allocated together may now physically be placed in different areas. This is corrected with some limited swapping. On the other hand, if an entire file is overwritten, then likely its new locations have maintained reasonable adjacency. In this case no swapping is required, which is the desired goal of the engine. In the first small overwrite case, the swapping that is introduced when the engine realizes that the file has been fragmented works somewhat like the process in the Temp Method that occurs when data is overwritten. However, in the Always Method, the selection of what is swapped is more complex due to the block type requirements.

The downside to an adjacency map is that it adds even more to the disk space overhead of the engine. Eight bytes are typically required for each entry in the map (location key and re-mapped location). This is in addition to the corresponding eight bytes in the desired location map for each entry. Therefore each page has an overhead of 16 bytes, which must be doubled to 32 to account for the stable and transitional versions. Assuming a typical page size is 512 bytes, 6.25% of the disk could be used just in re-mapping. Selective use of adjacency maps, a different scheme to handle transitions, as well as possible packing, can lower the percentage.

An alternative approach to adjacency maps is to have a means of re-sequencing a file's location keys. This is basically standard de-fragmentation run on top of the engine, with the exception that the process must avoid using de-allocated storage as it contains historic information. The best approach reflects the tradeoff between disk space and the "cost" of being more integrated with and knowledgeable about the OS. Standard de-fragmenting modifies the OS's core data structures.

Regarding fragmentation of the OS's location keys, a quick sampling of various heavily-used computers using the standard de-fragmenting utility provided with the Windows 95 OS reported low levels of fragmentation, even after a year of use. Three to ten percent was typical on systems having about a gigabyte of storage. The reason for the low percentages is likely that much of the disk is occupied by applications that were loaded when the system was first brought up, at which time the disk was relatively de-fragmented. The area that has been fragmented corresponds to the user's daily work in which files are created, deleted, and overwritten. With these assumptions it follows that the fragmentation is reasonably localized because the loading of the major applications took out large chunks of non-fragmented space. This implies the overwhelming percentage of fragmented space must lie outside of the space used by applications. Since there is nothing else on disk other than free space, the fragmentation must be localized.

Note that even a small percentage of fragmented storage, if accessed heavily, results in a considerable loss of performance. The focus here is to look at how much of a disk typically gets fragmented, which relates to the amount of engine overhead that is required to "fix" the OS's fragmentation, and thus achieve higher access performance.

Given the concentrated nature of the fragmentation, it follows that only a small percentage of files require an adjacency map, thus making the map more affordable in terms of disk space. Further, if disk access is in general localized, then this adds to the effectiveness of caching. It is more likely that the portion of the desired location map held in cache reasonably covers the area in use by the user. All these signs help the argument that the added mapping overhead of the engine, in both time and disk space, can be kept reasonable.

Summary of Supporting Data Structures

The following are the major data structures used by the engine and their typical approximate disk-based overhead. The "*2" indicates that the data is doubly allocated to allow for a stable and transitional version.

| | |
|---|---|
| 1. Blocking Map | 04*2 bytes per 92k |
| 2. Desired Location Map * | 08*2 bytes per 512 bytes |
| 3. Write Session Overwrite Map | 1 byte per 4k bytes (1 bit per 512 bytes) |
| 4. In Use Map | 2 bytes per 4k bytes (½*2*2 bits per 512 bytes) |
| 5. Adjacency Map * | 08*2 bytes per 512 bytes, worst case |
| 6. Main Area Map | 08*2 bytes per 512 bytes, worst case |
| 7. Historic Page Map | 12*2 bytes per 512 bytes of historic data |
| 8. Delayed Move Map * | 08*2 bytes per 512 bytes, worst case |

Reserving a minimum amount of historic space according to what would be required if all internal maps were at their largest size avoids having to provide disk overflow logic. Space should always be available for the maps, at the expense of historic information. The maps of significance to this calculation have been starred (*), and dictate a minimum of around 10% of the available disk space be set aside. Overflow logic can reduce this minimum, keeping in mind that one can, as a fallback position, generally cease recording of historic information and simply live with the existing disk mapping.

Figure 35:
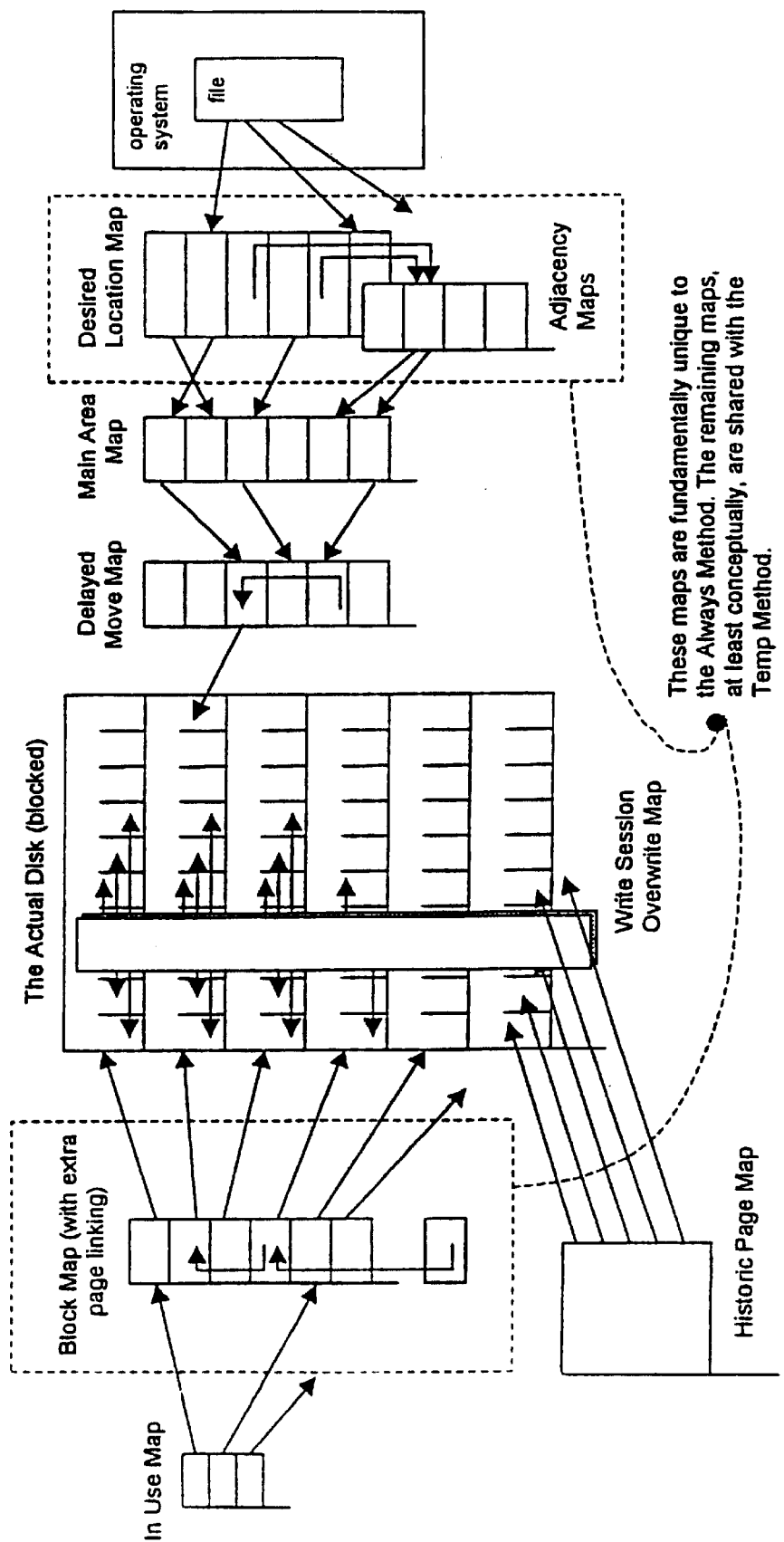
FIG. 35 illustrates the relationship between maps of a disk.

FIG. 35 illustrates the general relationships between the maps.

The Blocking Map is a table of pointers. Each entry in the table corresponds to a block of disk storage. A block is typically 100 k bytes. It takes, for example, about 42,000 entries or 168 k of RAM to map a four-gigabyte disk. Reserved values indicate main area (normal and direct), CTEX (normal and with unused pages), CTMA, unused, and overhead block types. Otherwise, one is dealing with an extra page area block. Its map value is a link to a header containing the block's historic page descriptors (HPD) and a link to the next such block in chronological order. An extra entry at the end of the table serves as the list header for the extra page blocks. Note in FIG. 35 the chronological linking is shown on top of the Blocking Map. This is an abstraction as the links are, as just stated, in the headers.

When links occur within the mapping system to various pages, their types can quickly be deduced from the Blocking Map, noting that with the transitional types, additional processing is required to pin down a page's type (as they actually contain multiple page types).

The number of pages in a block arises from optimizing the number of Historic Page Descriptors that can be stored in a page. Given a page size of 512 bytes and a Historic Page Descriptor size of 12 bytes, about 42 descriptors can be placed in a page. This corresponds to 21 k bytes of historic data A block size around 100 k is recommended as an easily manipulated amount. Therefore five disk pages of Historic Page Descriptors are allocated per extra area block. However, due to transitional processing, these are doubly allocated, thus requiring ten pages. Thus an extra page block is optimal at 212 pages (212=5*512/12 rounded down) or 106 k. Note that the descriptors are stored separately from the block containing their extra pages. This is done so that if all the pages in a main area block become historic, none must be moved in order to make space for the historic page descriptors.

The Desired Location Map is a simple table of dmap entries. At eight bytes per 512 bytes of disk, a four-gigabyte disk's map is 64 megabytes, including the double allocation to facilitate safely transitioning to new stable versions. Portions of the map are read and cached on an as-needed basis. The map translates the OS's location keys (its version of disk locations) into the engine's re-mapped locations as well as directly or indirectly stores adjacency information supplied by the OS. An entry in the map indicates if a given location key is de-allocated by the OS, in which case it has no re-mapped location. The map may also indicate a page's mapping is found in another level of mapping, an adjacency map.

With a few minor changes, it is possible to cause location keys to map to the same physical disk locations when possible. The situations where these no re-mapping cases are likely are when loading large applications onto what was initially an empty disk, which is common as that is how one gets a system running. As the OS makes its allocations and these allocations are passed down to the engine (via writes), the engine could attempt to use matching physical disk locations, if they are available. In the case where the Desired Location Map is a table, there are no savings in having large portions of the map indicate no effective re-mapping. The map must still be consulted and by the time one finds out that a page is not re-mapped, it is just as easy to derive a re-mapping. However, if the map is implemented as a tree with an implied no re-mapping for the areas covered by nodes that do not exist, the amount of disk space used for the map is likely reduced.

It is perhaps not so important to save disk space as it is to improve performance. A special "main area direct" block type indicates that no re-mapping of its pages are required. Detecting this block type in the Block Map, which is in RAM, implies that large portions of the Desired Location Map never need to be loaded. Not only does this save time in reading the map, it also keeps these sections of the map out of the cache. The recovered cache space can then be used to map other areas This enhancement is recommended. The downside to using a tree for the map is that one loses adjacency information.

The way to achieve no re-mapping, when possible, is to establish another unused block type. Initially a disk would consist of such blocks. As blocks are required, they would be allocated from this pool, until it is empty. The trick is that when allocating a block, one should also specify the location key, if appropriate, that is to map into the block. Thus, if there is an unused block that happens to correspond directly to a location key, it is chosen for allocation. If, after filling the block with main area data, it is found that all its location keys are directly mapped to their corresponding physical locations, then the block type is changed to the special direct form.

The Write Session Overwrite Map is a bit map that exists only in RAM. Each bit corresponds to a page on disk and indicates whether or not the page has been written during the current write session. It is used to avoid logging a page's original state prior to overwrite after the initial write. This implies that after the initial logging, subsequent writes in the same write session are directed to simply overwrite the existing location. It is recommended the map be blocked into sections that can be mapped anywhere on disk, so that a map in a limited amount of RAM can represent the disk's active areas. Should there be an insufficient size map to cover all active areas then information can be dropped, as it is not essential. This results in needless logging of original states, which, though harmless, reduce the user's reach back into the past. Completely mapping a four-gigabyte disk in RAM requires a megabyte.

The In Use Map is a bit map that distinguishes between transitional and stable data. Its general concept is presented in the Temp Method section. All allocations subject to transitional processing are allocated in adjacent pairs. If a given data structure that is written as a single unit occupies more than one page, then all the pages for the first copy are grouped together followed by the pages for the second copy. The in-use status bit corresponding to the first page controls which of the two copies are indicated. Because of the double allocation, only one bit exists in the map for every two pages. To find a page's corresponding bit, simply divide the page location by two and use the result as a bit offset into the map.

Note that if an allocation starts on an odd page boundary, then the corresponding bit, due to rounding, also applies to the prior page, which is not part of the allocation. However, it is also true that the prior page cannot be the leading part of an allocation tracked by the In Use Map, for otherwise it would need the subsequent odd page that marks the beginning of the allocation in question. Therefore, there is no problem with an odd allocation using the status bit that is also for the prior page.

It takes a megabyte of RAM to hold an In Use Map representing four-gigabytes. However, only those areas subject to transitional processing require this map. This is limited to overhead allocations. Therefore, the bit map is only maintained for overhead block types, which should be a small percentage of the total disk (typically under 10%). Therefore the map segments for the overhead blocks easily fit in RAM. They are stored in a continuous dedicated area on disk along with the information associating the segments with their blocks.

The Adjacency Map addresses the problem of location keys that correspond to consecutive pages in a file being themselves spread across their numeric range. This results from the OS generating fragmented allocations and normally leads to the accessing of many desired location mapping pages when translating the spread-apart location key values to their associated physical disk locations. However, on the first access to the file, instead of the desired location map producing a re-map, it directs one to an adjacency map. This map is cached and first consulted upon subsequent accesses before returning to the desired location map. The adjacency map correlates location keys to their re-mapped disk locations, but is organized not by location key index but by the adjacency information provided by the OS. The adjacency map clusters re-mapping information according to file association, which is a good predictor of subsequent location key references. This minimize the amount of mapping information actually read in order to process a series of accesses within a given file.

The adjacency map consists of its table size and the table of location keys and re-mapped locations. The table size should be limited, as there is no substantial gain in having a very large table as compared to two independent tables. Adjacency maps can be discarded, with their mapping information re-incorporated into the desired location map, if space is scarce. In this case the OS can re-supply the information, should conditions change. The maps are of varying length and therefore a special overhead block "size" set is used for their allocation and management. If a new map is being formed and it references a location key that belongs to another, then it is assumed that this prior reference is obsolete, it is removed from the old map, and it is added to the new.

If a maximum table size was selected corresponding to the maximum main data block size (111 k), then the map would require 222 entries plus a length, or 1780 bytes. The map must be doubly allocated to deal with transitions.

The Main Area Map addresses short-term re-mapping of pages. This re-mapping is below the level of the Desired Location Map. The workings of the Main Area Map are similar to that in the Temp Method. It is a tree, where if no re-mapping information is found for a given location, then no mapping is assumed. Background swapping resolves the mappings and thus the map is often empty. A mapping entry for a given location key (owner) consists of its actual location and the location whose contents are currently visiting the owner's spot on disk. Main area pages can be swapped with other main area pages or historic pages. In the case of swapping with another main area page, the Main Area Map contains the links supporting the swap. If a swap involves a historic page, the associated Historic Page Descriptor contains the links.

If you consider all extra page area blocks collectively, then there is a Historic Page Map for all the pages in these blocks. This map consists of Historic Page Descriptors that indicate the original physical disk locations of associated historic pages. It also contains swap and return links that are utilized for short-term re-mappings. These links, along with those in the Main Area Map, generally work as described in the Temp Method. These three fields typically make for a descriptor size of 12 bytes (four bytes per field).

Since Historic Page Descriptors are only required for historic pages, and these are generally only found in an extra page block, a set of descriptors is allocated for its pages from the appropriate overhead block size set. These allocations are called Historic Page Map Segments and they exist in proportion to the amount of historic data in the system. Historic pages are also found in the transitional CTMA and CTEX block types, and thus these types also have associated map segments. A mapping correlates the segments with their blocks.

The Delayed Move Map allows the engine to defer copying a page from one location to another. It is used, for example, to quickly effect a reversion. The map consists of entries each having a source field and a next link. See the Temp Method for more details. The map could grow, at 16 bytes per 512 bytes of disk data, to 128 megabytes for a four-gigabyte disk, but this is unlikely and in time the map is eliminated.

An Example of Writing

The FIG. 36 sequence illustrates writing to a file. The file is ten pages long and is progressively overwritten. Under the "operating system" heading are shown the contents of the file. They are in boxes with their corresponding location keys to the side. The example shows a somewhat fragmented file, as allocated by the OS. The desired location and main area maps are shown. Links in FIG. 36A show the desired location map de-fragmenting the location keys. No temporary mapping is in effect for the main area.

Under the "actual pages on disk" heading are the contents of the disk. Off to the left side are the associated physical disk locations. The contents are blocked and labeled. XUSE indicates an unused block, EXTR is an extra page area block, and MAIN, CTMA, and CTEX indicate their respective block types. Off to the right side of the figure is a general representation of the HPDs. When an entry is active an arrow links each box to location on disk. Note that this link, although shown directly pointing to physical pages, is really subject to the main area map. It is just inconvenient to show this in the figures.

Figure 36A:
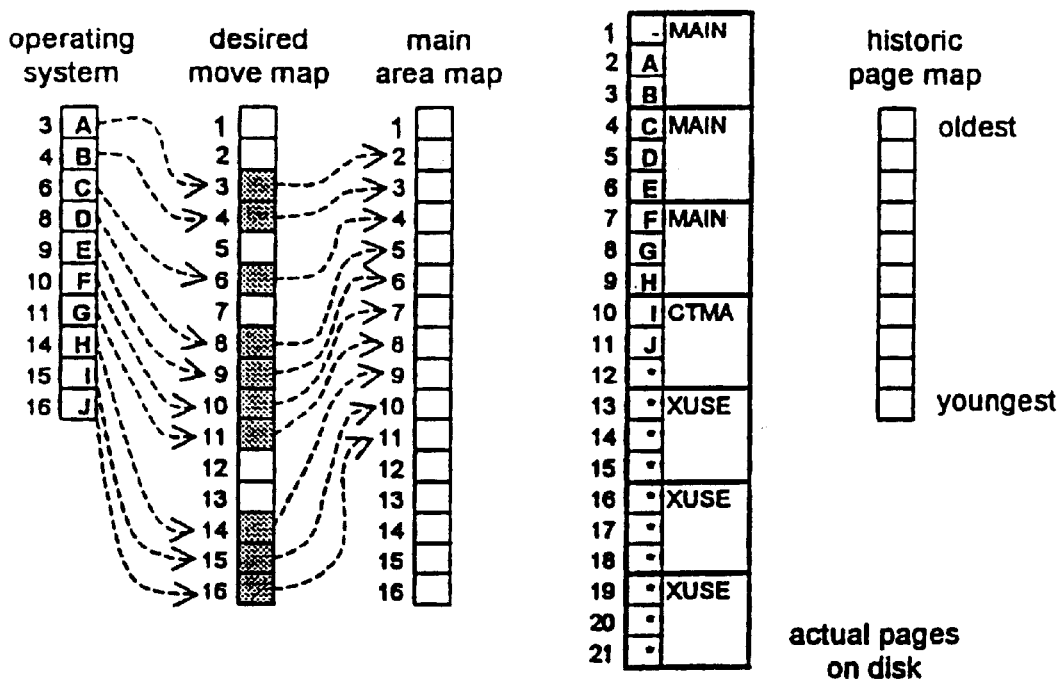
FIG. 36 illustrates a sequence of writing to a file.
Figure 36B:
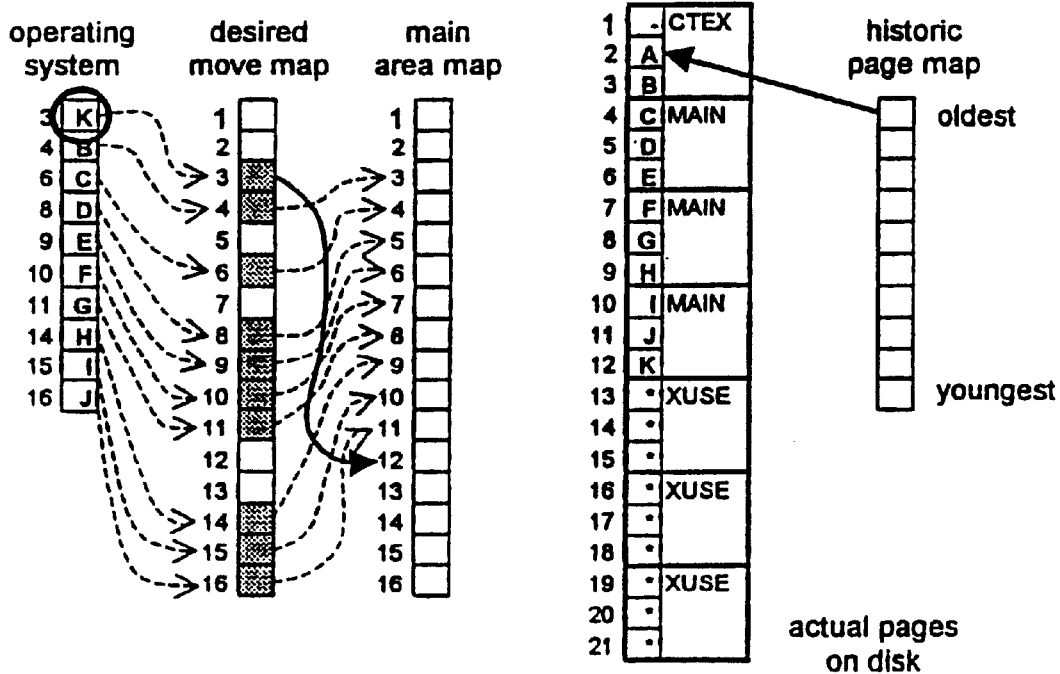
Figure 36C:
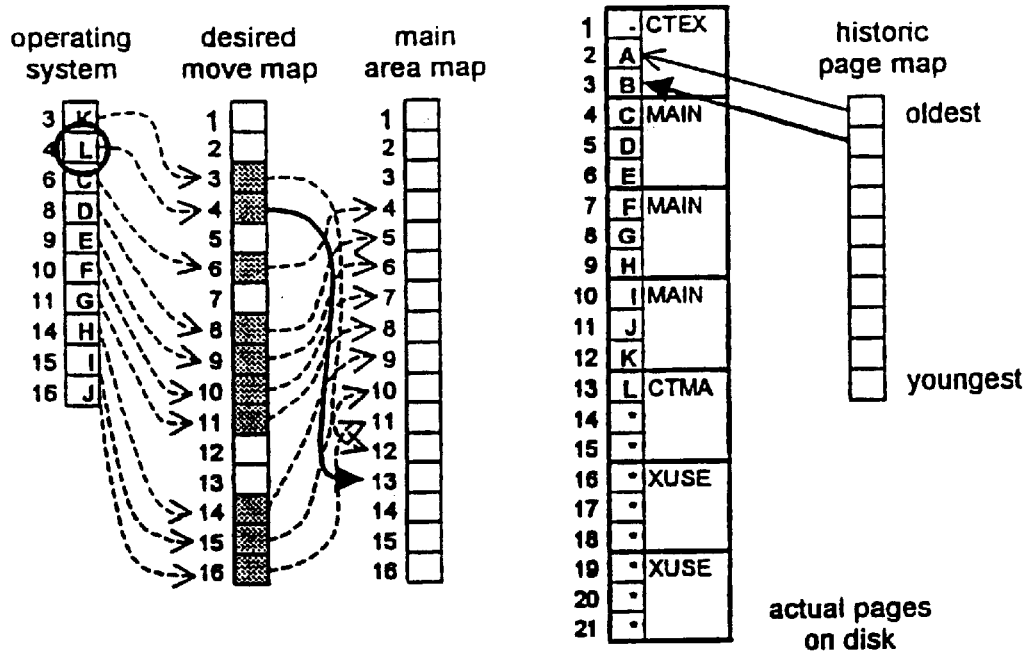
Figure 36D:
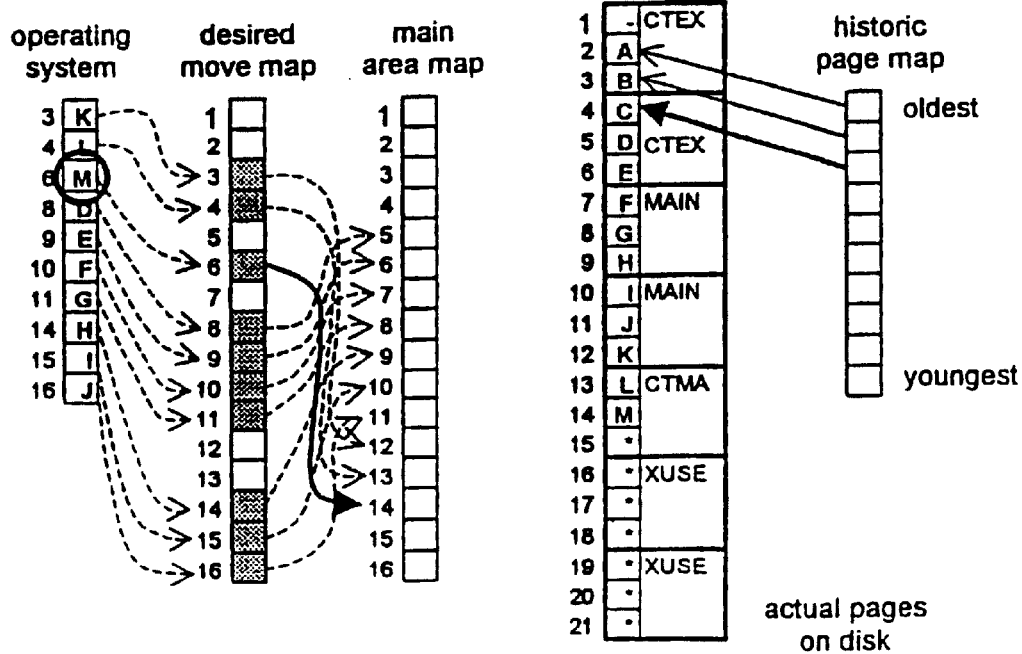
Figure 36E:
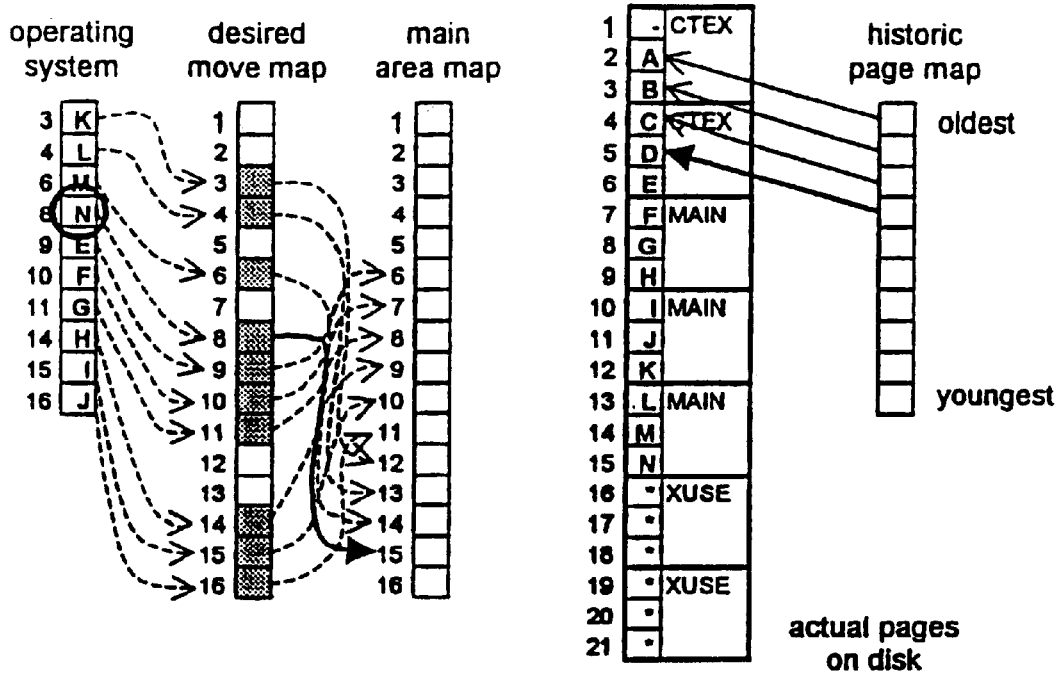
Figure 36F:
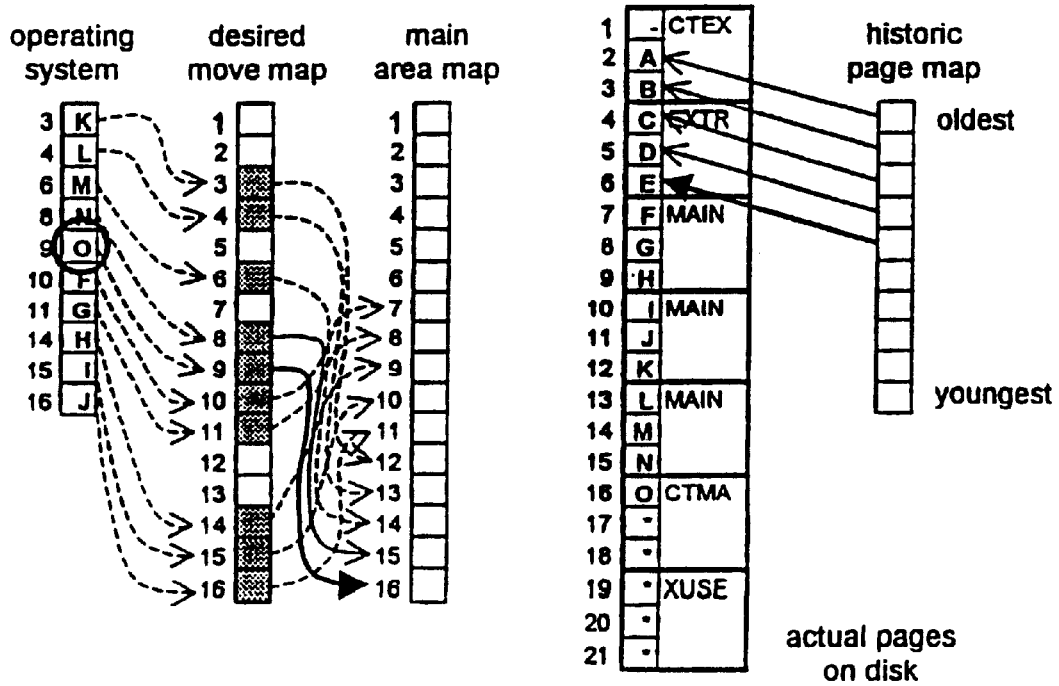

FIG. 36A shows the initial state of the example. In FIG. 36B, an overwrite of the file's first page occurs. The new data is routed to the current CTMA block. The block just filled with main area pages changes to a MAIN block type. A HPD notes the location of the overwritten data. The overwriting continues in FIG. 36C in which a new CTMA block is started. In general, over time, CTMA blocks are allocated from the oldest extra page area blocks, but in this case there are some never-used blocks available. In FIGS. 36D, 36E, and 36F, overwrites lead to two CTEX blocks.

Figure 36G:
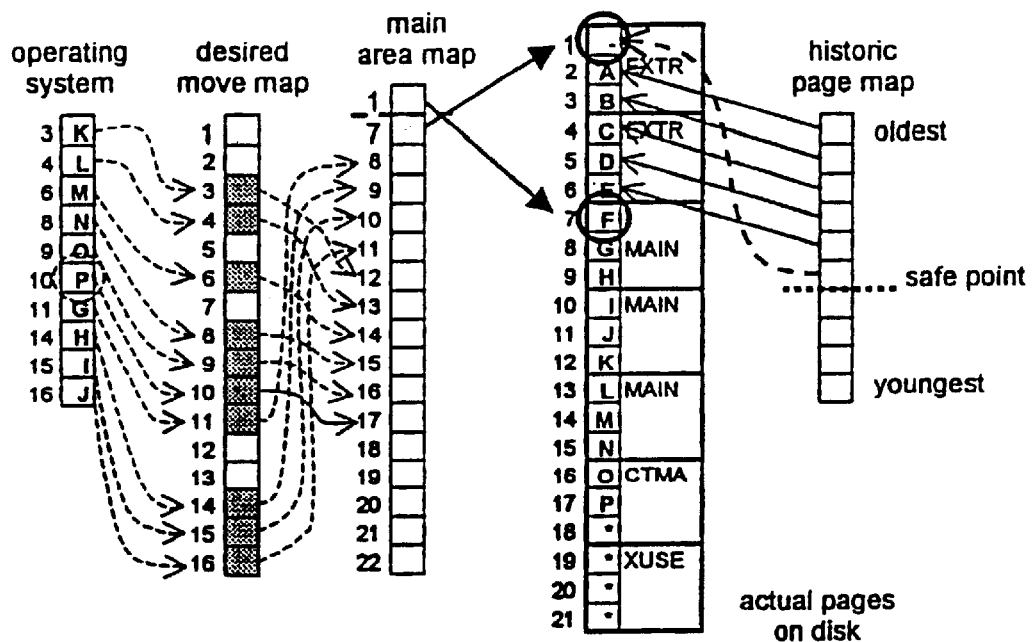
Figure 36H:
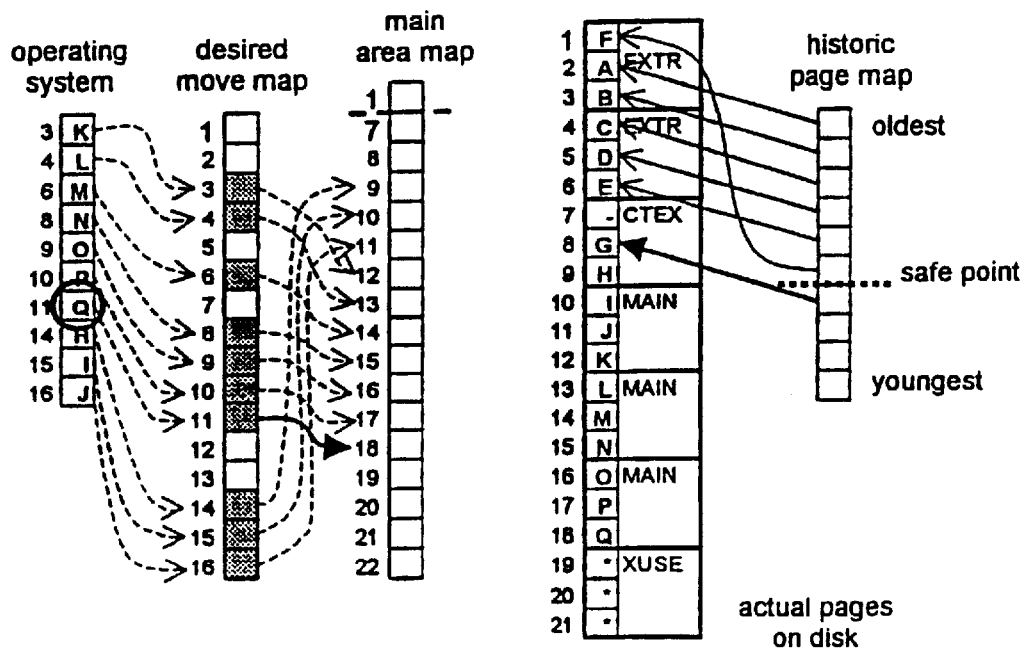
Figure 36I:
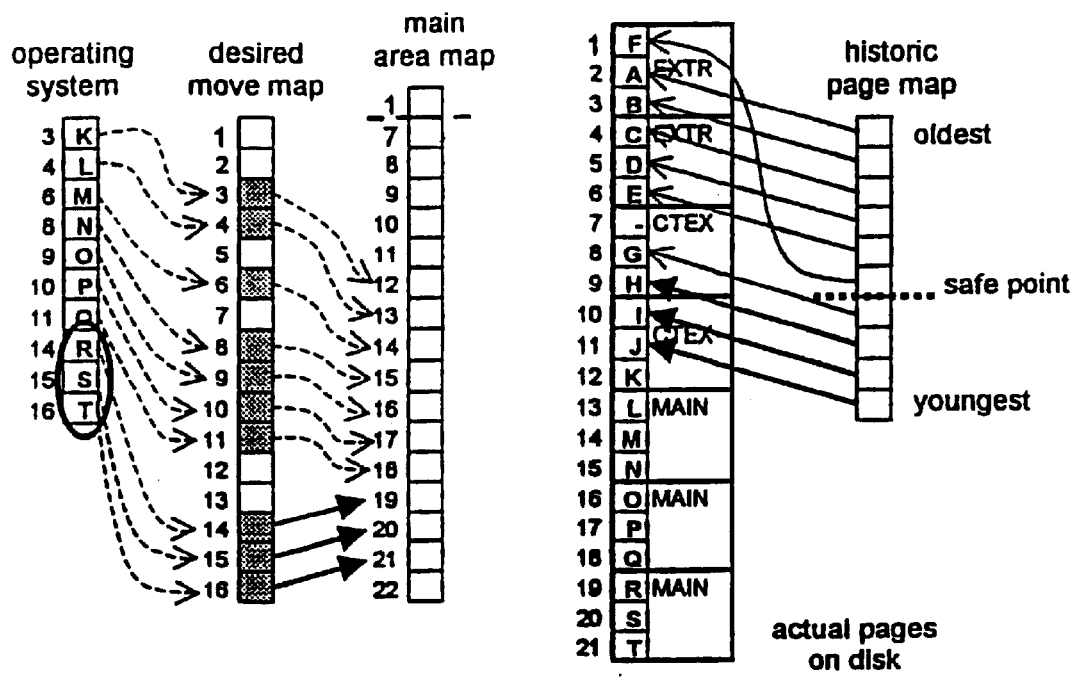
Figure 36J:
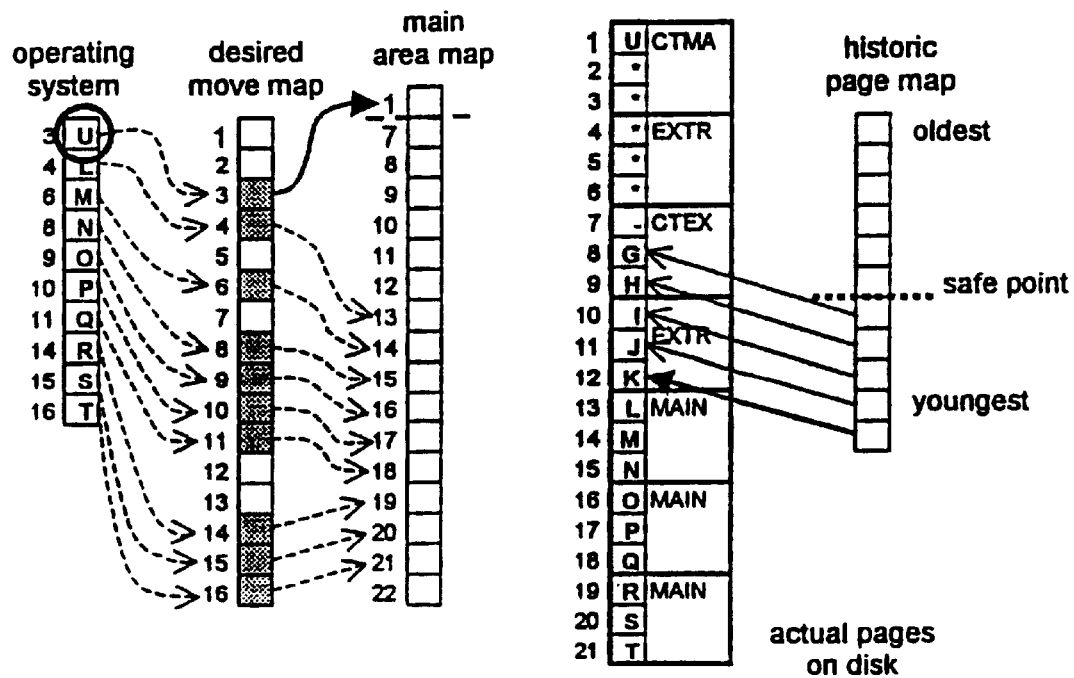

In FIG. 36G, a safe point occurs. Although this is unusual in the middle of writing to a file, it is done for the example's sake. Swapping data consolidates the two CTEX blocks. However, in order to be more responsive to the user, the actual swaps are delayed and temporarily implemented through pointers. Thus the main area map is initialized. In FIG. 36H, the swaps are done and the main area map returns to inactive. Another overwrite occurs. FIG. 36I illustrates the next three overwrites. And finally, in FIG. 36J, the overwriting process begins again at the front of the file. There is seen the allocation of an extra page block, and now as a CTMA block it receives the new data. Notice that all historic data up to the "next" safe point is discarded as a result of the recycling of the first portion of historic data preceding the safe point.

Common Elements of the Temp and Always Methods

The following areas are handled substantially in the same way, at least conceptually, between the Temp and Always Methods:

1. Safe points
2. Creating a simulated image
3. Reversion and special case reversion
4. Delayed move map
5. Shutting down during times of intense disk modification
6. Low-level disk swapping and page copying
7. Transitions from one stable state to another
8. Main area map and inter-linking with HPDs for the historic pages
9. Switch page and In Use Maps The File Method The File Method is one in which the functionality of saving prior states such that one can restore or view data from the past is incorporated into the OS. One way to accomplish this functionality in the OS, is to merge the Always Method into OS. In such a combined system, the desired location and adjacency maps disappear, as they are incorporated into the OS's method of mapping its files. The engine's adjacency processing, which includes the periodic OS updates to the engine, under the Always Method evolves into the OS re-sequencing the disk locations assigned to a file. This de-fragmenting with the associated page swapping is accomplished through the background mechanisms in the engine.

Comparison of Methods

Five fundamental methods for saving the prior states of overwritten data have been presented. The methods differ in the following ways:

1. number of total disk accesses required to perform a "write,"
2. number of disk accesses required before the user can continue,
3. amount of disk space overhead (maps, etc.),
4. impact on disk read accesses, and
5. integration with the operating system.

Before investigating how the methods differ, it is instructive to review what normally happens when data is written. This is illustrated in FIG. 37. The outer boxes are numbered frames where each frame corresponds to one or more major disk accesses. Inside are two columns of boxes. The column on the left represents a file. Each box contains a value for a page in the file. Off to the column's left are the disk locations (location keys) assigned by the OS. Notice that the locations fall into two groups, and thus the file is slightly fragmented in its allocation. The right column represents the physical disk, with the disk locations to the side. In the examples here, the file's contents are overwritten with the new values shown in the left column. This column corresponds to data in RAM. The arrows represent a major disk transfer with the source or destination on disk circled. A major disk transfer is one in which re-positioning of the disk head is likely.

In Frame 1 the first part of the file is written to disk Frame 2 shows the second part written. At this point the user is free to continue in their activities. Upcoming processes involve background work, in which case frames occur after the user continues working.

| Method | total | continue | disk overhead | read impact | OS interface |
|--------|-------|----------|---------------|-------------|--------------|
| (normal) | 2 | 2 | none | none | none |

Figure 38:
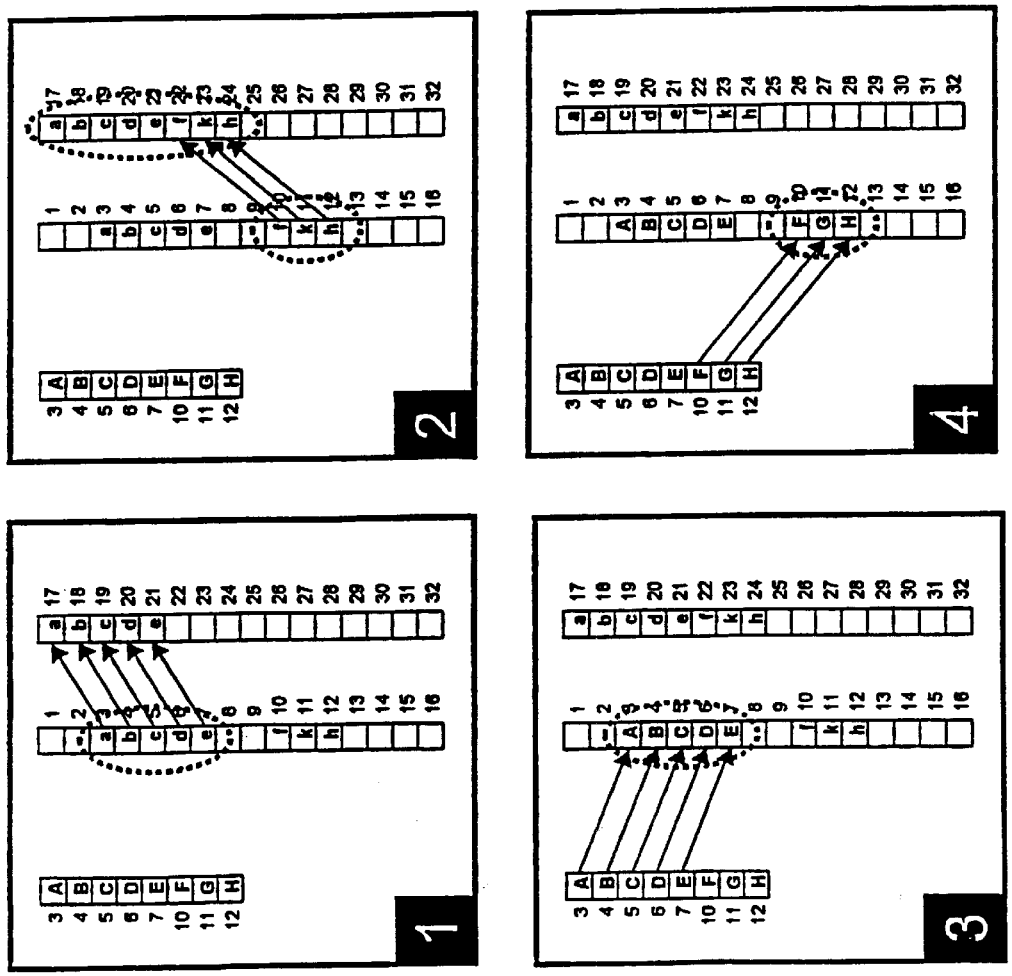
FIG. 38 illustrates the Move Method of writing data to a disk.
Figure 39A:
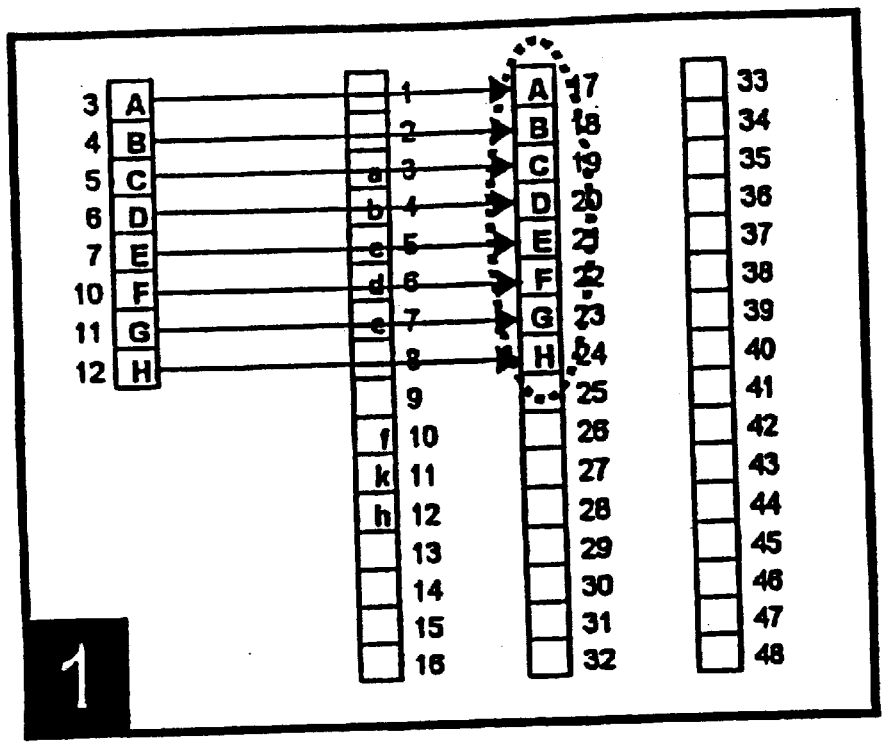
FIGS. 39A–39G illustrate the Temp Method of writing data to a disk.
Figure 39B:
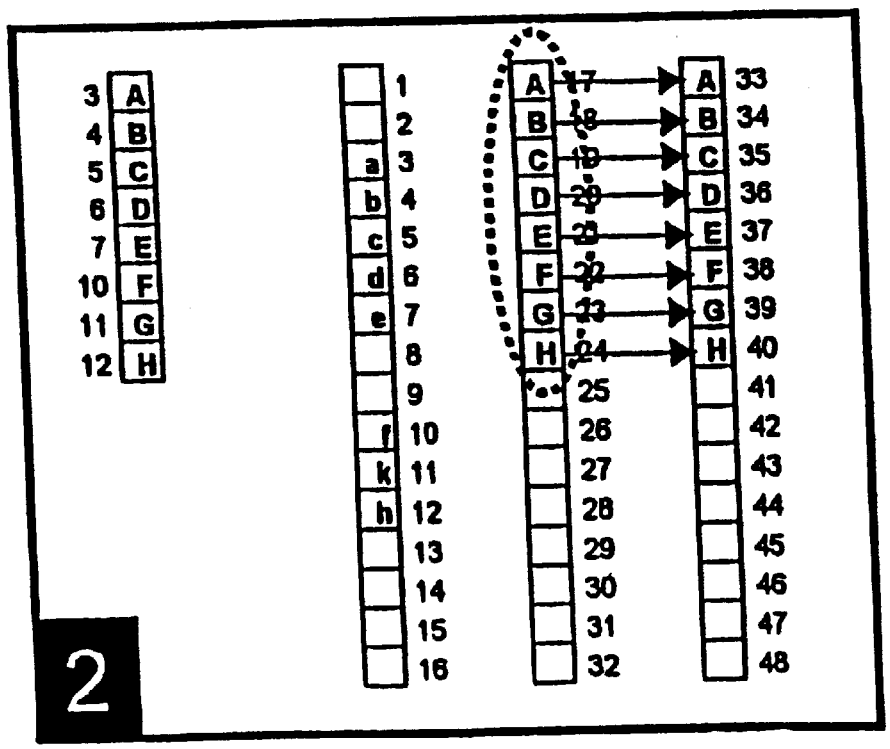
Figure 39C:
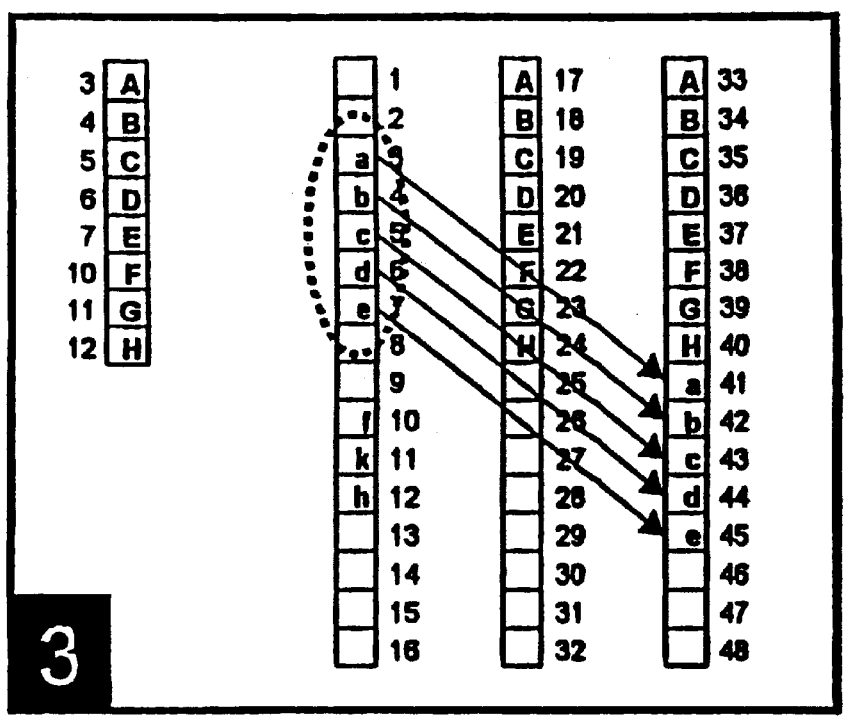
Figure 39D:
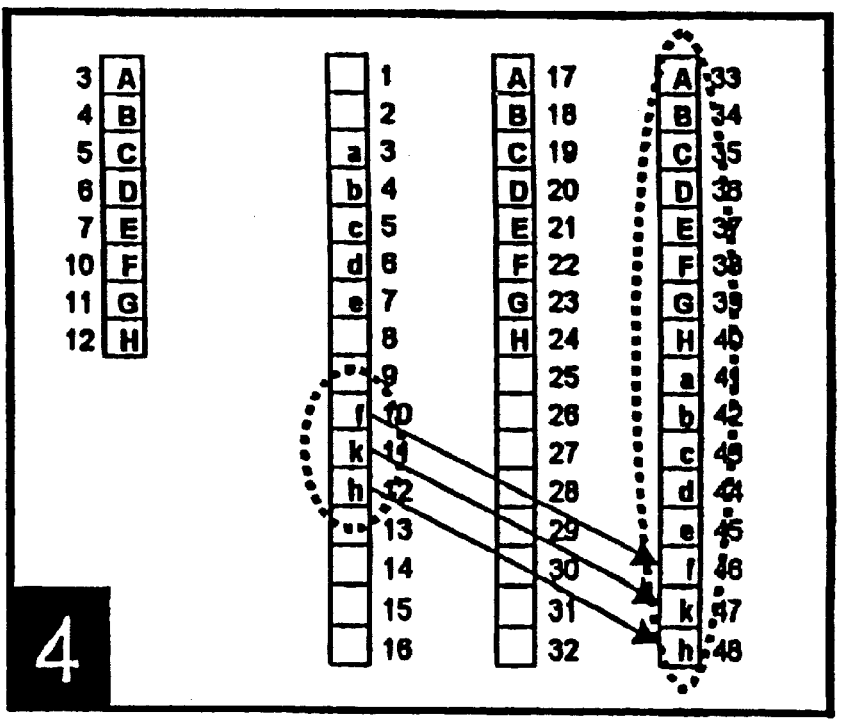
Figure 39E:
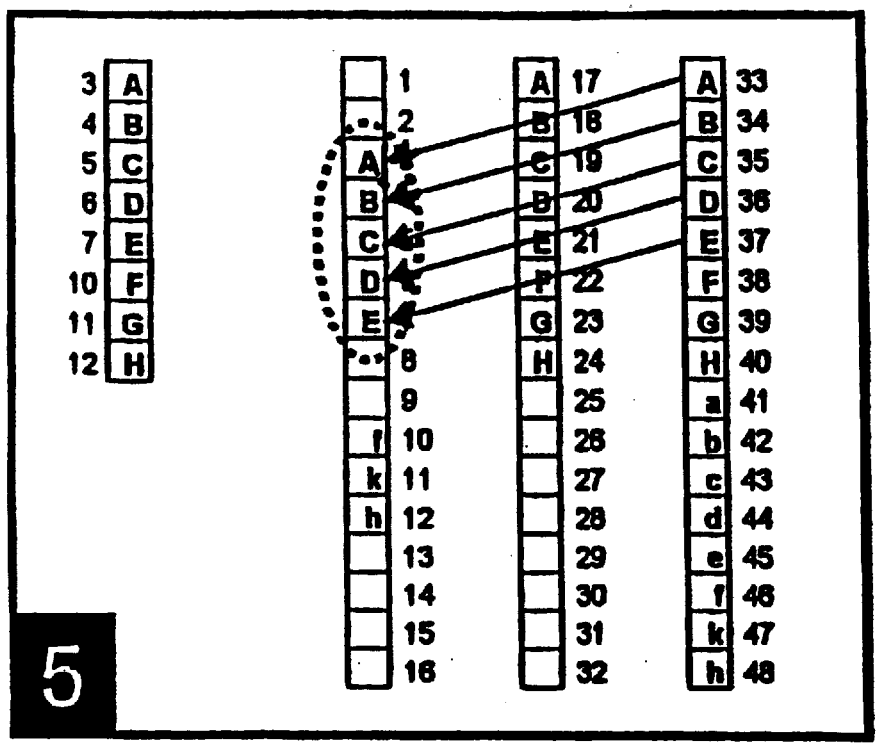
Figure 39F:
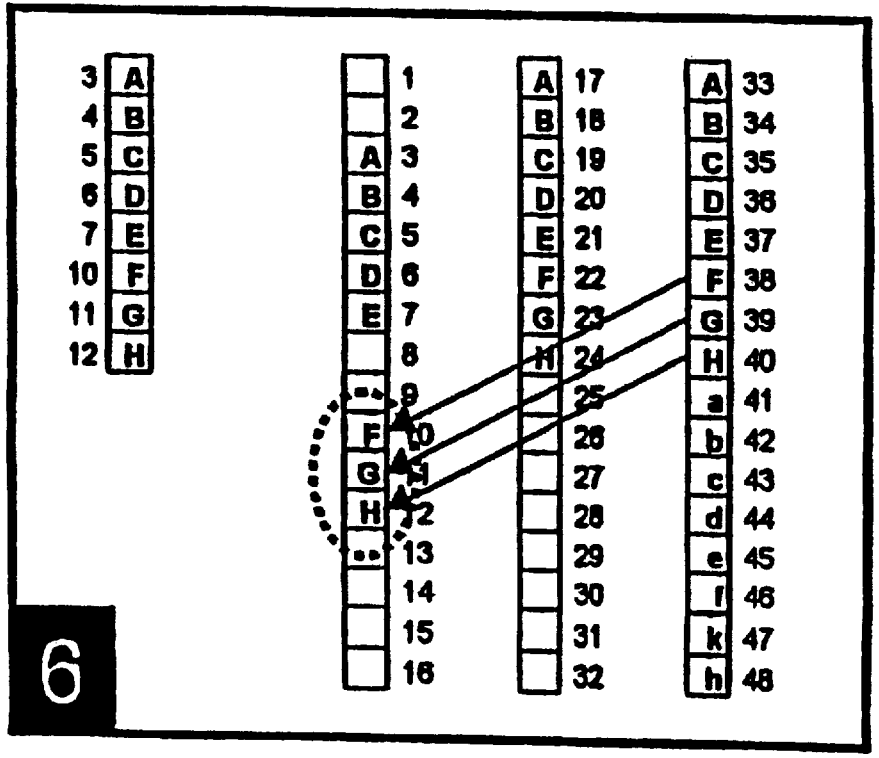
Figure 39G:
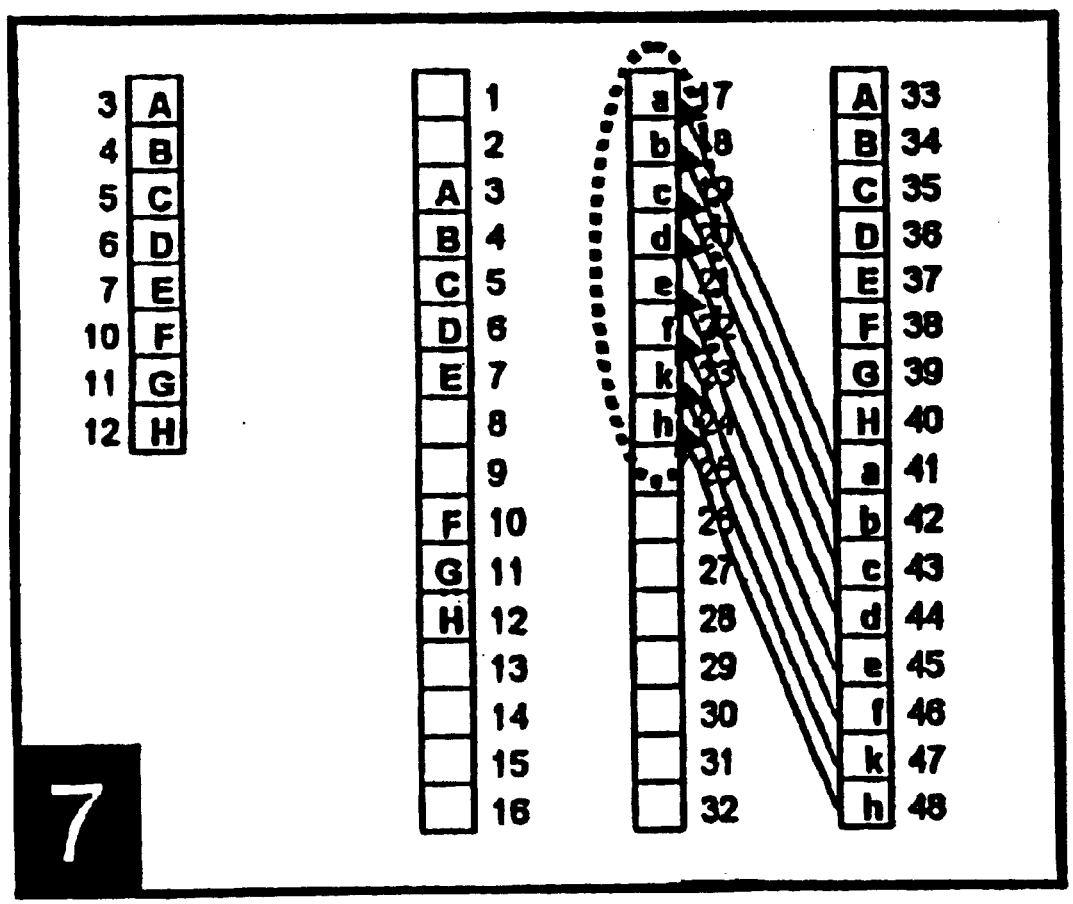

FIG. 38 illustrates the Move Method. In each frame another column is added on the right side, making for two columns. These columns reflect the contents of the hard disk. The first of the two (left) represents the OS-visible area The second (right) column is a history buffer visible only to the engine. In Frame 1 the file is overwritten, in RAM at least, but before the hard disk is modified, the affected pages are moved into the history buffer. Frame 1 shows the reading of the data about to be overwritten and where it is eventually placed. However, for the moment the data goes into a buffer. Frame 2 shows the second area read and now both areas, having been loaded into a buffer, are written to the disk-based history buffer. Frames 3 and 4 then show the actual overwrites, after which the user can continue.

| Method | total | continue | disk overhead | read impact | OS interface |
|--------|-------|----------|---------------|-------------|--------------|
| Move | 5 | 5 | none | none | minimal |

It might seem possible to avoid re-positioning the disk head of Frame 3 by exchanging, while still in Frame 1, the original data on disk with the new data in memory. Although this is indeed possible, it violates the golden rule of overwriting data before its original state is saved. That is, if a crash occurs after the overwrite but before the original data is copied to the history buffer, then there is no way to restore the original data.

In all the methods there is some amount of additional disk access overhead associated with maintaining notes regarding what is being saved. Even in the Move Method, notes must be written to the history buffer indicating the origin of the historic data. These additional accesses are omitted for the example's sake in order to focus on the basic nature of the methods. Further, the caching of overhead information from moment to moment makes it impossible to predict a consistent impact on performance.

The Temp Method is illustrated in FIGS. 39A–39G. Another column in each frame, associated with the hard disk's data, is added to represent a swap area on disk. As pages are exchanged on disk under the Temp Method, the data is stored in the swap area as a backup in case the system crashes before completing a swap. This ensures that it is not possible for the system to crash at some transition point where original states are lost. In Frame 1, all the newly written data is redirected to the history buffer, leaving the original states unchanged. Updating various maps allows the user to continue after this point. Later on, in the background, the engine collects up all the data and exchanges it.

The Temp Method has temporarily put the new data in the history buffer and left the now historic data in the normally OS-visible main area. Frame 2 shows the new data read into memory, which is eventually written the to swap area. Frames 3 and 4 show the file's original contents read.

Having collected all the data involved in the swap, a backup of the data is written in Frame 4. The data are now written into their appropriate locations. Frame S shows the overwriting of the first part of the file, Frame 6 the second part, and Frame 7 the historic data. The maps at this point would also be updated, indicating that everything is in its place.

| Method | total | continue | disk overhead | read impact | OS interface |
|--------|-------|----------|---------------|-------------|--------------|
| Temp | 8 | 1 | minimal | often none | minimal |

The Divert Method can be thought of as the Temp Method where new data is written directly to the swap area This would involve less total disk access than the Temp Method but has the unacceptable drawback that if more data is written than fits in the swap area, the method reverts to the Move Method. No figure is presented for it.

Figure 40:
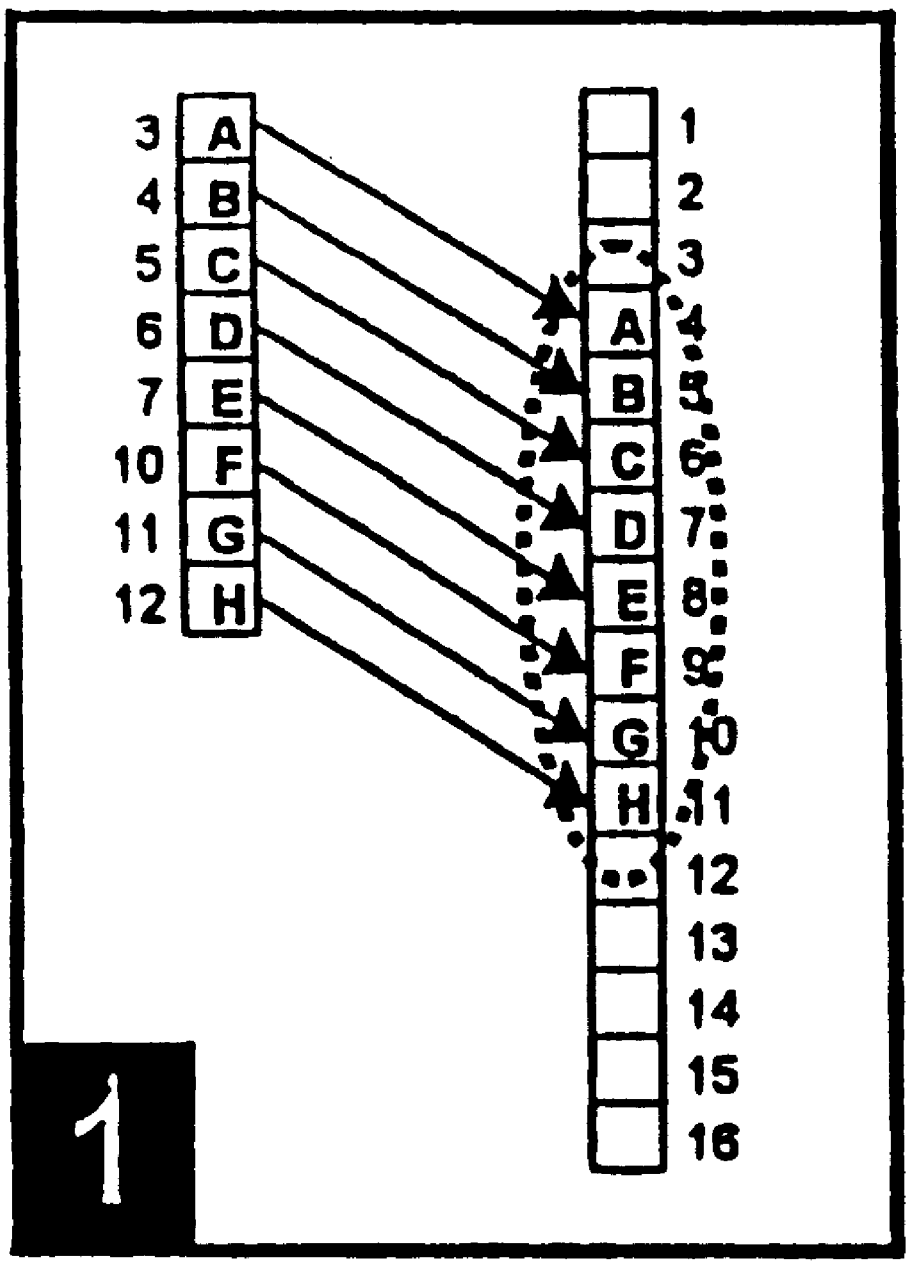
FIG. 40 illustrates a single frame for the Always and File Methods of writing data to a disk.

In FIG. 40 it is seen that a single frame for the Always and File Methods. In it, the file's new data is simply written to a single area on disk However, the file's original data is located elsewhere and therefore remains available for recreating the past. The writes overwrite very old historic data whose tracking is no longer possible. Various updates to maps are also performed, but not shown. The File Method should be a bit more efficient than the Always Method, as the desired location map folds into the OS's normal mapping for its files.

| Method | total | continue | disk overhead | read impact | OS interface |
|--------|-------|----------|---------------|-------------|--------------|
| Always | 1 | 1 | medium | slight | medium |

In summary, the Always and File Methods yield the best overall performance by sacrificing some disk space in mapping overhead. In general, their read and write access throughput is similar to that when the OS directly accesses the disk. The Temp Method, from a user responsiveness viewpoint, performs just as well as the Always and File Methods. However, in physically maintaining the disk in much the same way as the OS laid it out, the Temp Method requires substantial background swapping. The swapping increases the overall total amount of disk access associated with a given write. But for the average user, as long as the added accesses are hidden, they are likely of no concern.

Recall that there are other benefits and drawbacks to these methods outside the scope of disk access performance. These have previously been covered. The Temp, Always, and File Methods provide backup services without generally impacting the user-visible disk performance. This is measured by the time it takes a user to read and write data (listed in the "continue" column). The Move Method is straightforward but in its simplicity, it sacrifices the disk performance to which users are accustomed.

| Method | total | continue | disk overhead | read impact | OS interface |
|--------|-------|----------|---------------|-------------|--------------|
| (normal) | 2 | 2 | none | none | none |
| Move | 5 | 5 | none | none | minimal |
| Temp | 8 | 1 | minimal | often none | minimal |
| Always | 1 | 1 | medium | slight | medium |

Booting from a Simulated Disk

A simulated disk allows a user to access data from the past, while at the same time continuing to run off their main disk (image). The expression "to run off a disk" commonly refers to the process of booting (starting up the OS) from disk. It is also the disk that applications are generally configured to use (e.g., an application may note that a file is at "C:\windows\example"). Note that the terms "disk" and "drive" are herein interchangeable.

The simulated disk is typically accessed through its own drive identifier or letter. Thus, from the user's and OS's point of view, the simulated disk might just as well be another hard disk to which a backup was made at the desired time in the past. Just like having a second hard disk, changes can be made to the simulated disk after its initial starting point time is set. Note there is no reason why more than one simulated disk cannot be in use at one time, each with its own map.

A user may want to test proposed changes to the disk from which they are running off. At first it would seem the process would involve establishing a simulated disk to the current time, applying the changes, and then testing them. However, in order to test changes in the context of running off the disk, the user must both boot up on the disk (load the OS) and have it assigned the expected drive letter. For example, in MS-DOS and Microsoft Windows this is drive C.

Thus, to support this process, the engine switches drive letters upon re-booting. This allows the user to run off a simulated disk. All the drive letter assignments embedded throughout the system's configuration need no modification in order to perform testing. Further the main disk that the user would normally run off is still available through a new drive letter. Once the test concludes, the user re-boots, either simply again exchanging the simulated and main disk roles, or requesting a permanent reversion to the simulated drive's state.

An alternative process would simply involve altering the main image, testing it, and if a flaw is found, reverting it to before the changes were made. The only danger is that somehow the flawed version writes so much new data as to lose the path back. This scenario is not possible if running off the simulated image, because a disk overflow occurs in this case. Perhaps more important, psychologically it feels better to test in a temporary context and then selectively make the changes permanent, than to undo changes.

Keep in mind that changes to a simulated disk are allocated from the storage pool used to hold historic information. Too many changes that exhaust the pool results in a form of disk overflow. It is a slightly unusual disk overflow in that the normal reporting methods of the OS are not accurate, as they correspond to the main disk. However, the user can set aside a reasonably large amount of disk and be safe from an overflow. The amount of disk space consumed maintaining changes to a simulated drive can be capped to prevent the excessive loss of historic information. A separate disk usage reporting system that gets its information from the engine informs the user as to the available space on the simulated disk. This reporting system includes an early warning system that alerts the user when space is low. All of these issues apply regardless of whether one is running off the simulated or main disks.

A useful example of running off of a simulated disk is to provide the user with in effect two disks that share a common origin. This allows a parent to establish a drive for their child's use. Initially the drive starts as a copy of the main drive. However, the parent can then delete desired files, making them inaccessible to the children. Placing a cap on disk space allocable to the simulated drive limits any impact a child could have on the main disk and historic information. A password system protects the main disk.

A problem in creating a long-term simulated disk is that changes to the main disk often require updates to the simulated map. This reduces throughput during the parent's use of the computer. One solution is to establish and release the simulated image each time a child wishes to use the computer. The parent specifies a list of private files and directories. These are automatically deleted during creation of the child's simulated image.

External Backup

All the methods thus far presented for saving original disk states are conceptually designed around a single disk. Of course, more than one disk may be involved, with their collective storage pooled into one large logical disk. The fault tolerance provided by the various methods deals with non-hardware failures like the user accidentally overwriting a file or a bug in an application corrupting files. However, there is also the case of the disk actually ceasing to function (i.e., if it broke and the information it contained is lost). Recovery from such a failure typically involves installing a new hard disk, re-installing the operating system, and then restoring files from a backup tape or similar device. This is a time-consuming process and often involves some loss of data, that which was affected after the backup.

A well-known solution is using a RAID system. Redundant disk drives that are maintained in parallel provide uninterrupted service should one of the disks fail. However, such systems involve writing to two disks simultaneously, which is a relatively complex and expensive to implement. Most personal computers do not employ such systems even though disks are relatively inexpensive.

The process of generating an external backup (tape) is enhanced by use of a simulated disk image. A user can establish a simulated image corresponding to the current time, start backing it up, and continue working.

An entirely different approach to achieving an external backup is to have an external disk drive that, like the main disk, employs a method of saving original disk states. Thus, instead of creating a backup of a specific point in time, the information on the backup includes the historic information, allowing the backup to re-create a range of "backup" times. In other words, the external disk generally mirrors the main internal disk. This is how a RAID system generally works.

However, unlike a RAID system, no attempt is made to run both the internal and external disks simultaneously in parallel. Instead, if one views the logging activity on the main internal disk as creating a list of changes, these changes are forwarded as time permits to the external drive. It is the fact that there exists a historic log on the main disk that facilitates replaying changes in the background, in a more gradual transfer (non-parallel with the main disk). Further, since the relayed information is chronological and therefore contains safe points, the external disk, in general, at worst lags in the range of times to which it can restore. This is unlike a RAID system where if one of the redundant drives were to lag behind the current state, as viewed by OS, its contents are of limited use. Should a crash occur and the lagged disk be used, it would restore the user to some single arbitrary point in the past. On the other hand, an external drive that receives changes chronologically from the main drive is capable of restoring to any number of points in time. Thus after a crash, the external drive likely contains a safe point followed by the transitional changes just preceding the crash. Since the transitional changes are useless, as they are incomplete, one reverts to the safe point.

Thus a guaranteed usable backup image is available, and depending on the lag in transferring changes, this point is likely not too far back in time. With a RAID system, protection is achieved from a physical disk drive failure, but none is provided for the computer crashing and leaving the last state of the disk in transition.

The external backup process of the present invention differs from one in which the internal disk drive is simply copied onto another medium (e.g., disk or tape drive). Such a duplication is very time-consuming. Instead, the states of the external and internal drives are compared, and the appropriate historic and current image data is transferred, until both are synchronized. This transfer process is asynchronous to and can lag substantially behind recent changes to the current image. Therefore, it can be implemented on an inexpensive and relatively slow bus. For example, a parallel printer or USB port.

In the same way in which a RAID system switches from a failed disk to a redundant disk, if the main disk fails the engine automatically switches to the external disk. The two disks may be out of sync: changes that were made to the current image might not have been transferred to the external disk prior to the failure. In this situation the engine alerts the user and forces re-booting to run off the external disk, at the time of the most recent safe point (thus the engine does not provided uninterrupted disk services from the view point of the applications). Now that the user is running off the external disk, the main internal disk is replaced. The engine then automatically, in the background, brings the internal disk into sync, at which point it resumes as the primary disk (i.e., they switch roles). In other words, when the internal disk fails and is replaced, the roles normally played by the internal and external disks are reversed, until they once again become identical, after which normal operations resume.

The external disk can be removable. In the case of a portable computer, one may leave the external unit at work and bring the portable home. When it is re-attached to the external disk, the transfer of information begins. Thus, the removal of the portable for a period of time is simply introducing a "delay" in what is already a lagged transfer.

The engine's ability to redirect disk activity, to reference back in time to prior states of a disk, and to perform work in the background all contribute to providing enhanced backup service. One that provides both for recovery to various points in time as well as physical disk redundancy.

Now for some details: When initially connecting a blank external disk to operate under the management of the engine, the engine establishes a simulated disk to the most recent safe point. This image is then transferred to the external drive. Next, all historic data from the period before the time to which the simulated disk is set, is sent over. Both these processes are special in that they are setting up the external disk and therefore writes are not re-directed and prior states are not saved. Once the external disk contains a current image (though likely out of date compared to the internal disk) and historic data, the external disk is ready for normal use.

When an external disk that has been set up is connected to the computer, the engine seeks to synchronize it with the internal disk This involves identifying the last point in the internal disk's history that corresponds to the most recently transferred information. If such a point does not exist, in that it has rolled off the end of the internal disk's history buffer, then the external disk is treated as blank and completely re-initialized. Otherwise, the engine walks forward through the internal disk's history, starting at the time associated with the simulated disk. The new state of each historic page is transferred down as basically a normal write to the external disk. Normal engine management of the external disk saves the data about to be overwritten and accepts the page's new value. A page's new state is found either ahead in the history buffer or as part of the current image. The prior case involving the history buffer arises when a given location is overwritten multiple times, thus its "new" state at some time in the past may not be the current state, but one in between.

Essentially, the engine is writing to the external disk in generally chronological order (at least in terms of write sessions) the writes that have occurred to the internal disk. Note that it is the new data, not the historic data, that is transferred to the external disk; the external disk already has the historic data. Once both disks are synchronized, the engine waits for more changes to the internal disk and then resumes synchronizing.

Figure 41A:
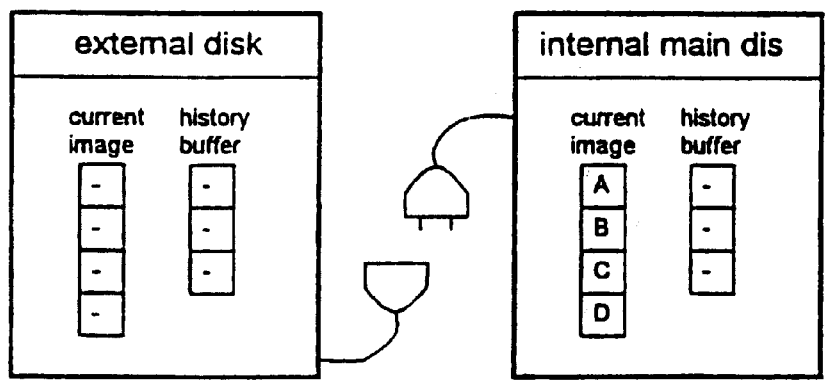
FIG. 41 illustrates an external backup procedure.
Figure 41B:
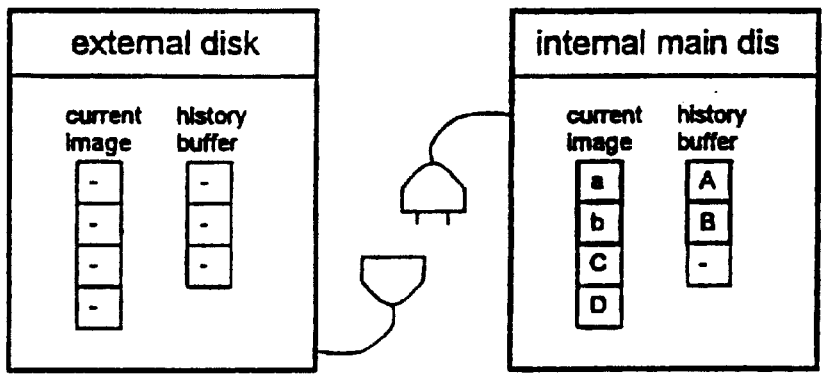
Figure 41C:
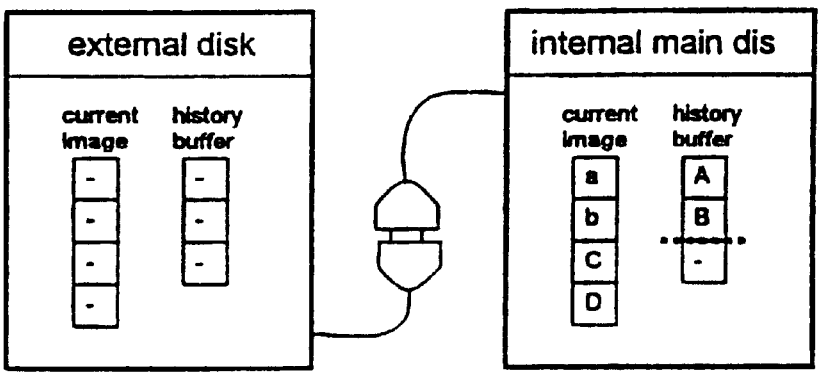

FIG. 41A illustrates disconnected internal and external drives. Each drive contains a current image and historic data Initially the internal drive's four pages contain the values "A", "B", "C", and "D". The external drive is blank. In FIG. 41B the values "a" and "b" are overwritten on "A" and "B", respectively. Thus, the original states move to the history buffer and the current image reflects the change. The external drive is then connected in FIG. 41C. The engine responds by establishing a simulated disk based on the internal drive's current state (each write is assumed to also be a safe point). A dashed line in FIG. 41C represents this time.

Figure 41D:
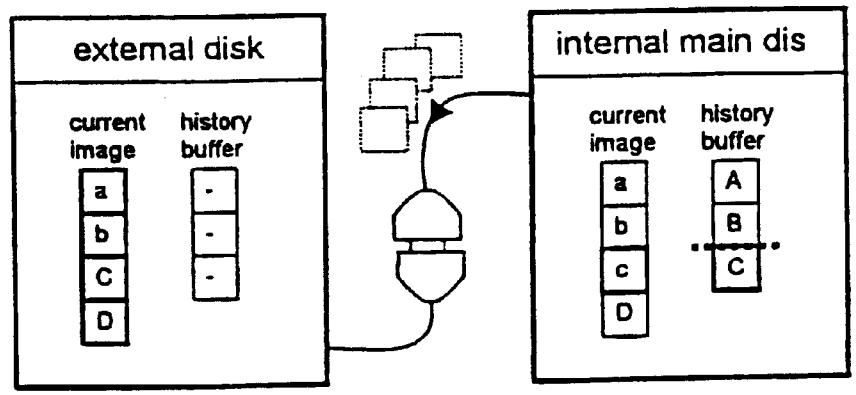
Figure 41E:
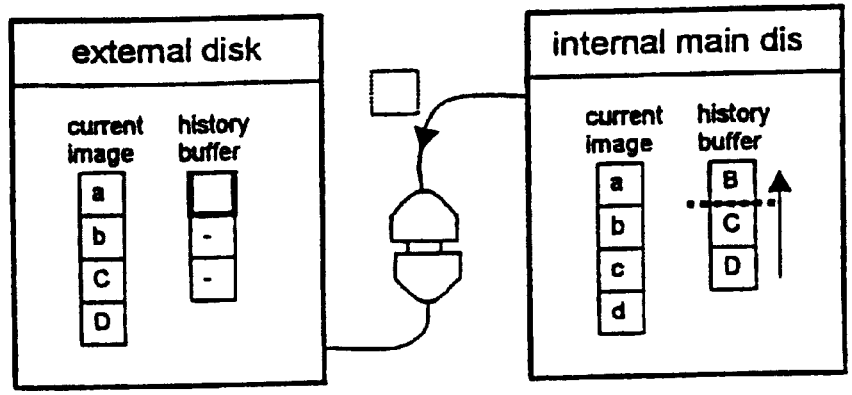

In FIG. 41D the user has overwritten "C" with "c", thus displacing "C" to the history buffer. Note that this change occurred after the simulated disk was established, so it is not part of what initially gets sent over. FIG. 41C also shows the simulated disk's image being transferred and written to the external disk. In Frame 41E the user overwrites "D". Having gotten the simulated image across, the historic data prior to the simulated disk's reference time is sent. Notice that the result of the user's continuing activity during the synchronization process has led to a lesser amount of available historic data (i.e., "A" has rolled off the end of the buffer).

Figure 41F:
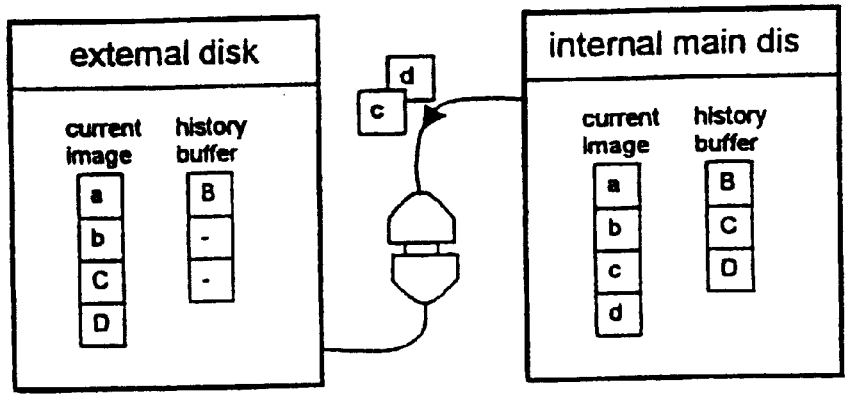

FIG. 41F shows the engine attempting to keep the two disks synchronized. The changes occurring after the simulated disk was established are sent over. This occurs in Frame 41G as normal writes under the engine, with the overwritten data moving to the external disk's history buffer. At this point the two disks have been synchronized. However, in Frame 41H, "E" is overwritten. The internal disk immediately reflects the change while the change's transfer to the external disk just begins. Some time later, Frame 41I shows the disks synchronized again.

External Disk via the Network

The concept of an external disk from the prior section can certainly be extended to include a disk interfaced to a target computer through a network. The network is simply a high-speed bus. The access to the external disk from the network generally requires an associated server controlling and actually performing the transfers to and from the disk.

Since a server on a network can communicate with more than one PC, it follows that the server can independently maintain the OS visible disk image and historic states for a set of PC's. For example, a server with a 10 gigabyte disk could backup, over a network, four PCs each having an internal disk of 2, 3, 3, and 1 gigabytes in size (totaling 9 gigabytes—thus, the server has at least, or in this case, more storage than all the PCs together).

To be more specific, each PC has an internal disk for which a portion represents OS visible data and the rest generally is historic (original states of overwritten OS visible data). The OS visible portion is typically bounded by the size of the PC's internal disk minus a minimum that is set aside for historic data (which could be zero). The server needs, for each PC, to have at least sufficient space for the OS visible portion of the PC's internal disk. The amount of additional disk allocated on the server to a given PC is used to hold historic data. If one views the external disk as simply a second copy of the PCs internal disk which lags behind in being updated, the two disks should be the same size. However, there is no reason the external disk cannot have more or less additional storage used for historic states as compared to that reserved on the internal disk. This implies the external disk may be able to reach further back in time in recreating prior states, if it has more historic information, or not as far back if it has less.

Therefore, it is really up to the server to map to its available disk storage (which may be one or more disks) areas to represent the OS visible portions of the PC disks to which it is backing up. It further assigns areas to save historic states for each backed up PC, whose sizes are independent of the storage committed to maintaining historic data on their respective PC's. Provisions in the PC's software would divert to and take advantage of an external disk that had more historic information than available on the internal disk, and whose access is desired.

Figure 41G:
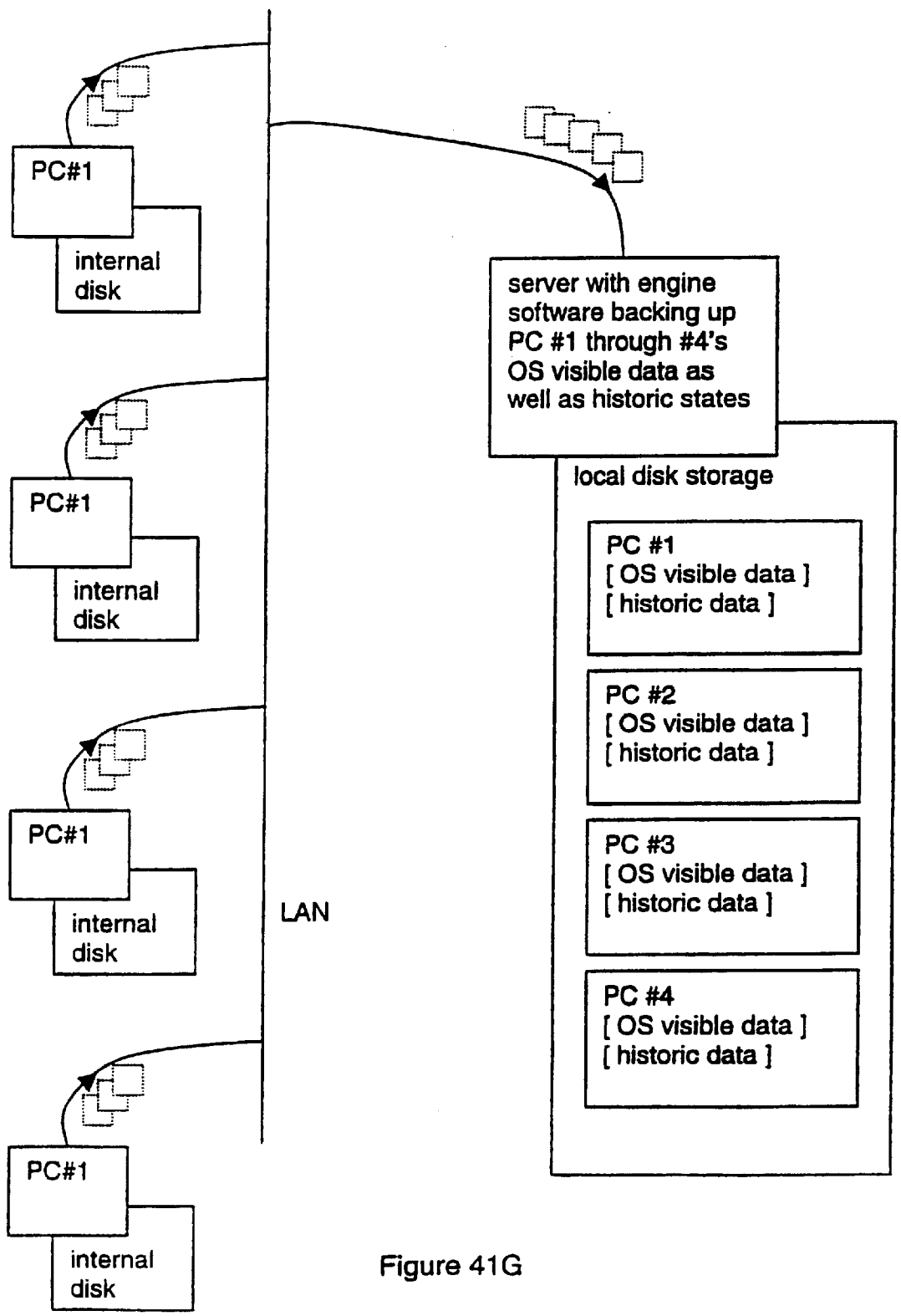
Figure 41H:
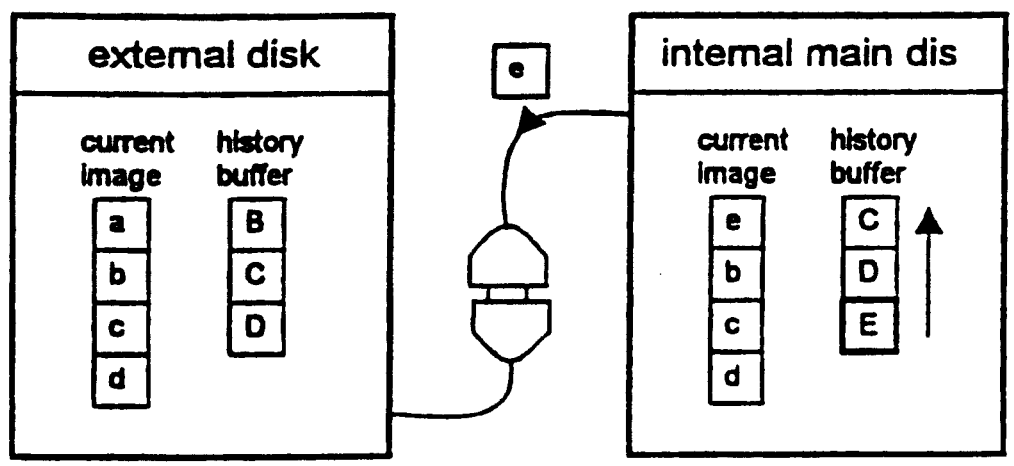
Figure 41I:
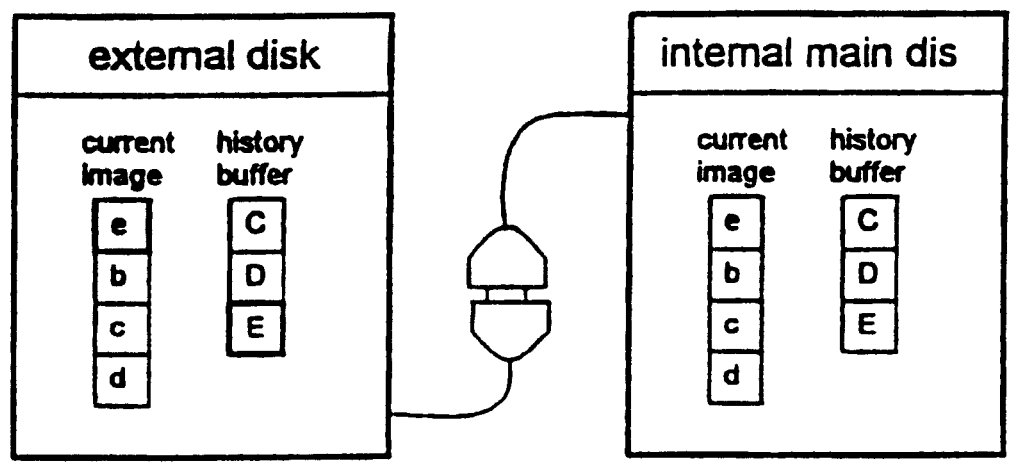

Use of a server to provide redundant backup over a network for a set internal disks associated with PCs, in a manner consistent with the present invention, provides an easily managed single point to maintain, expand, and manage. Further, removable backup (tape) services can be provided directly from this redundant storage and so avoid any interaction, and thus loading or performance impact, to the various PC internal disks. FIG. 41G illustrates a set of PCs being backed up by a server. Note the figure shows data flowing from the PCs to the server, but data actually flows in both directions (e.g., when the "external disk" effectively represented on and by the server takes over the role of a PC's internal disk).

Disk Controller or Server Based Firewall Protection

Up to this point the present invention relies on an engine running in a target computer to implement one of the described methods. Even in the case of using an external backup, in addition to the target computer's internal disk, read and write accesses to the external disk are still controlled by the engine (that runs in the target computer). The engine affords virus protection by allowing the user to restore all or part of the disk (main image) to an earlier time. However, this assumes the virus cannot get in between the engine and the disk. Should a virus directly access either the internal or external disks, the engine's data may be irreversibly corrupted.

A method of protecting the disk and engine is to move appropriate portions of the engine's logic into the "disk," as part of the disk controller. Thus, the read and write accesses that are passed to the disk (controller) correspond to what is generated by the OS (i.e., there is no engine doing re-mapping between the OS and disk controller). Mapping and re-direction occurs within the disk controller, with only the disk controller able to access the engine's internal data. A virus would then be unable to access and corrupt the historic data or the engine's internal data stored on the disk. Therefore, in this mode the user is truly provided security against a virus on the target computer.

The only path left for a virus to attack a user's disk involves the virus overwriting so much data that the engine's ability to track changes over time is effectively lost. In other words, the virus writes so much data over and over again that the historic log fills with these changes, pushing out the memory of the pre-virus disk states. This window of vulnerability is addressed by allowing the engine to shut down a disk, should it appear that the disk is being excessively altered. This protects the historic data and therefore the ability of the user to revert a reasonable distance back in time.

In the event the engine believes a shut down condition is forthcoming, it alerts the user and allows for a safe means of defeating or adjusting the conditions that force a shut down. Here, "safe means" is a means where a virus cannot pretend to be the user and defeat the shut down. For example, the user could be required to press a button that directly interfaces to the engine, which is especially useful when the appropriate parts of the engine run inside the disk controller. Another "safe means" involves the user entering a password that is unknown to the target computer (before it is entered).

Moving parts of the engine into the disk controller can be done on either or both the internal or external disk drives. If the external disk is implemented using a server on a network, so that parts of the engine execute on its local processor (the server does not allow the PC to directly alter the engine's internal data), firewall protection is achieved. Therefore, firewall protection can be achieved using commonly available PCs and servers, without hardware modification, by adding the appropriate engine software to both.

Note that the firewall does not prevent a virus from getting into a PC and interfering with the nature of the data written to, and through, the firewall and then onto the disk. It is hoped that a user detects the presence of a virus and has sufficient ability to revert a disk back in time to before the virus struck. The firewall is protecting the user's ability to revert. Should a virus infect and corrupt data over an extended period of time, beyond the ability of saved historic data to revert, then the virus will have succeeded.

Memory and Disk Snapshots

There is a whole other category of failures that occur in a computer that have nothing directly to do with the disk. They involve using an application over an extended period of time during which information is manipulated in memory and periodically (or at least at the session's conclusion) the information is written to disk. A common failure results either from user errors or from bugs in the applications, where something goes terribly wrong. So wrong, that in fact, there is no easy way to recover. Any unsaved work is lost. Although some applications try to minimize how much unsaved work is at risk (by automatic saves), it is still common for crashes to occur and for users to lose a substantial time investment in unsaved work.

A general solution is to build on the engine's ability to revert the disk back in time. If snapshots of the RAM used by the application are periodically taken at moments in time after a safe point is established but before any further disk modifications, then it is possible to restore both the disk and application (RAM) to a synchronized and earlier time. These snapshots may also include the OS's RAM (or portion of it), at which point the entire computer, OS and all, can be reverted. Some care must be taken when restarting from an earlier time to insure that devices other than the disk and RAM are reasonably re-started—for example, a printer, the video card, or a network connection.

RAM snapshots may be taken at either fixed intervals and/or after a certain amount of user activity (e.g., keystrokes or mouse activity). Compression of a snapshot reduces memory requirements.

A Nice Background

The intention of performing work in the background is to not interfere with the user. The best method involves detecting user activity and ceasing all background activity until a reasonable period elapses after the last user activity. Thus, while the user is even slightly active, no background processing occurs.

The reason not to use available time between short bursts of user activity, like keystrokes, is that introducing a minor delay after each user event cumulatively adds up to overall interference. A $1/100$ of a second delay by itself is unnoticeable by a user. However, if a screen's update is constantly lagging, the effects are easily seen. The basic problem is that most activity, including background activity, cannot be immediately interrupted. There is a larger granularity of switching time introduced from running a "real" task compared to the system truly idling. Of course, if a task can be immediately interrupted, then it is likely not to interfere, even if executing in small gaps of the user's free time.

Low-Level Swapping

The engine can temporarily divert writes to alternate locations. It also can delay copying various pages using pointers. In the background the engine works out the swaps, putting the data in their desired locations, as well as delayed moves. It is the job of low-level swap processing to queue up a sequence of swap and move submissions and execute them as block, in a time optimized and crash proof manner.

In the context of background processing, the low-level swap and delayed move map processing in the swap handler is the gatekeeper to the user's data. Since any exchange of data must be appropriately reflected in the maps, the swap handler effectively performs two steps simultaneously: moving data and updating the maps. This is important because there is always the chance of a crash mid-process. Prior to calling the swap handler all desired map changes are made to the transitional version. The associated user data moves are queued up. All of this is then passed to the swap handler which completes the operation. The user data is moved and then the transitional version is made stable in a final single write to the switch page.

Once the swap handler has processed a request up to the point of altering user data the request becomes irrevocable. It must be completed or reversed in order for the user to access the disk. There is no reason to reverse the operation when it can be completed.

The FIG. 42 sequence illustrates a simple case of swapping two sets of three pages. FIG. 42A shows the state just before the swap handler goes to work. The pages to swap have been submitted as well as the corresponding map changes implemented in the transitional copy of the engine's internal data.

Figure 42A:
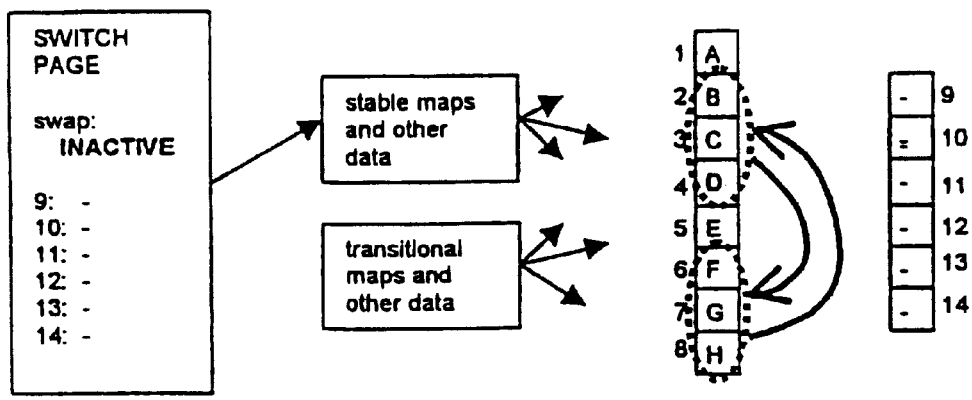
Figure 42B:
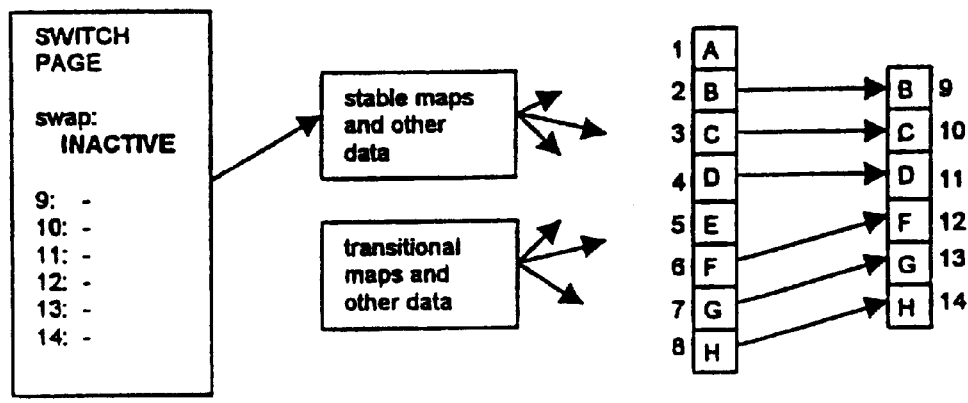
Figure 42C:
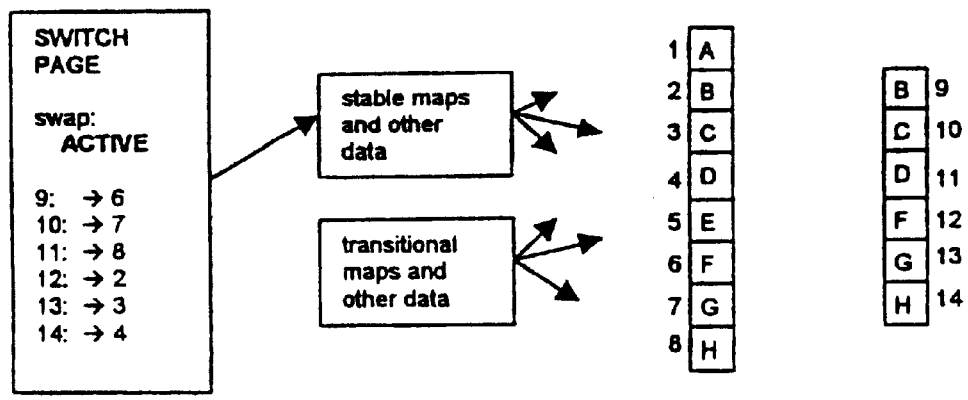
Figure 42D:
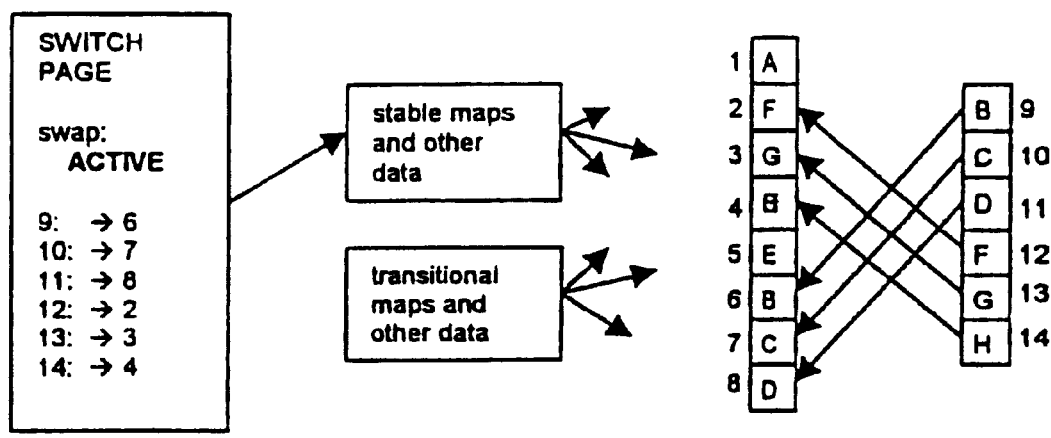
Figure 42E:
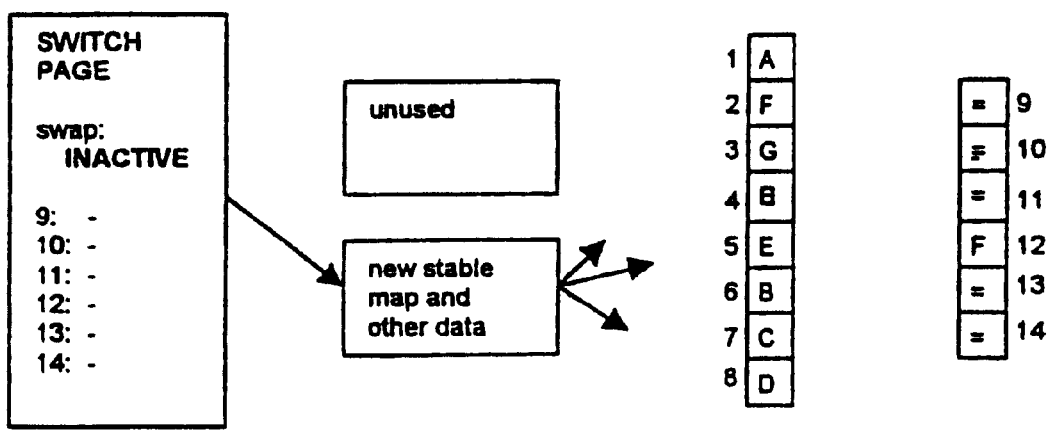

All pages involved in the swap are read into memory in FIG. 42B, as well as written to the swap area on disk (pages 9 through 14). In FIG. 42C the switch page is updated, indicating a swap is in progress and the destinations of all the pages in the swap area noted. Should the system crash before the swap completes, on re-starting the operation can be completed. The FIG. 42D shows the writing out (from memory) of the pages to their new locations. And finally, with everything in place, FIG. 42E concludes by clearing the swap-in-progress status and well as designating what was transitional data as now the current stable state. FIG. 38 illustrates effectively the same process that is the basis of the Move Method.

When performing swaps and moves it is desirable to queue up a group of operations. This has the advantage of reducing the ratio of user data moves to switch page updates as well as allowing for optimization across the operations. For example, if swapping A and B as well as B and C, the move of A to B and then to C can be reduced to A to C. Other optimizations include sorting locations prior to reading and writing, thus minimizing the number and distance of disk seeks. The prior example demonstrated three page swaps executed in one operation.

Two swaps can be interdependent on each other. For example, the two swaps of A and B as well as C and D are independent. They can be done in any order. However, the swaps of A and B as well as B and C are order dependent It is not possible to conclude on receiving the first submission to swap A and B, that it is in fact these locations that will be exchanged. A second submission to swap B and C modifies where the data from the first submission really winds up. In this particular case, if you read A, B, and C into memory, you would write A to C's old location, B goes to A's old location, and C goes to B's old location.

Clearly there is great benefit to processing nearby groups of swaps together. However, there is also some advantage to processing a batch of swaps that refer to data spread about the disk. The advantage comes in gathering and re-distributing the data. By sorting the reads and writes into two passes across the disk, although the number of seeks is not reduced, the distance the head must travel is reduced. Depending on the disk drive technology this may or may not be significant. However, the two passes also include saving data to the swap area and switch pages, and the total overhead of these operations is reduced when multiple swaps are combined.

The ability to handle multiple swaps in many different areas optimally pretty much comes for free with efficiently handling the swapping of two large areas, the latter of which is a clear goal. The approach that solves both these problems is to simply sort the reads and writes.

FIG. 43 illustrates three swap submissions, each involving three specific page swaps. It shows the simple approach of making a list of all the locations involved in a swap handler request, and sorting them into read and write passes.

The algorithm to form the sorted read list is straightforward. Take all page locations and sort them, tossing any duplicates. Of course, the write locations are the same as the read locations. The issue is to reorder the pages in memory so as to correspond to where they are being swapped. Basically you walk down the list of swaps and process the left and then right side, as long as their locations have not already been processed. For each side you initially assume its corresponding swap location is that specified on the other side. Next you run down the remaining swap entries and track if the current location gets swapped to another. If so, you update the current location and continue to the next swap entry. When you are done searching what you have left is the final write location. FIG. 44 shows how this algorithm carries out the swap in the second column of FIG. 43.

Swap and move submissions are submitted to a pre-swap setup routine. Here they are run through the delayed move map, the map is adjusted, and any associated move operations are added. The operations are accumulated until a limit has been passed or they are flushed if a timeout occurs. There are two limiting factors as to the total number of pages that can be swapped in one operation. They are a function of the swap area's size (and RAM buffer) and the number of different faraway areas accessed on disk.

The area limit arises in order to control the worst case duration of a swap request. If a disk seek takes 10 ms and two large areas of 100 pages each are swapped, the seek time is on the order of 2 visits (read+write)*2 areas*10 ms, or 40 ms. The transfer time at one megabyte per second is on the order of 100 ms. With everything accounted for, the total time is easily under a second. However, if each page required a seek to a different area on disk, the seek time by itself is on the order of 2 visits*200 areas*10 ms, or 4 seconds. This is a long time to wait for a background operation to complete. The time is controlled by limiting the number of different areas that are visited in a given swap handler request.

As a minor note, when accumulating individual swaps (and moves) into a combined swap request, if the maximum number of areas is exceeded should a new submission be accepted, then the operations thus far accumulated should be processed without taking the new submission. The reasoning is that if upon reaching the area limit, the current submission and those accumulated were processed together, you would likely separate the last submission from subsequent submissions that would all be in the same area.

A swap (or move) submission has the form:

do_swap A_location, B_location, A_to_B_only

It is understood that after the swap the transitional state is made stable. However, it is also understood that this step may be delayed in order to allow multiple submissions to accumulate and be processed together. In other words, small transitional steps are accumulated into a larger transitional step. Although this increases the chance of losing the larger transitional step (more time available to crash) all the work is cleanup and does not involve any user information—i.e., the work can be re-created.

When accumulating and building the swap handler request each new do_swap submission has its two swap locations run through the delayed move map. If one is found to have a read-side mapping then the true location from which to fetch the data is updated. As part of processing a read-side mapping, the mapping entry itself is deleted (from the delayed move map) since as part of the swap, the location gets overwritten. On the other hand, if it is a write-side mapping that is found then the other pages whose reads are being diverted to this page must have the page's data put in place. Therefore, one cycles through the write-side entry's link list and adds the appropriate moves to the swap request. Note that they all share a common source: A to B, A to C, A to D, etc. The write-side and associated read-side entries are then deleted from the map.

When looking at what locations are overall read and written, as a result of move submissions, the same page may be read as a source for different writes. Thus there can be more than one "read" of a given page, although in practice a single read gets routed multiple places. On the other hand there should never be two entries writing to the same location. This implies a loss of information, which should not occur.

Figure 45:
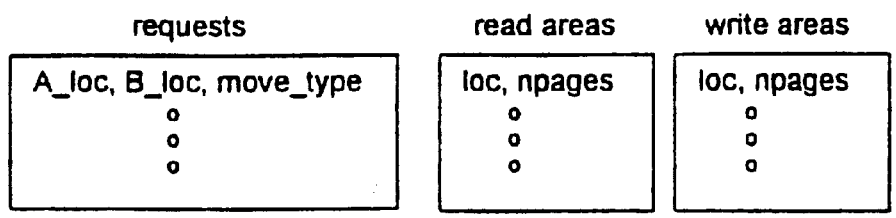

As submissions are being processed, three tables are being generated. The first is simply a list of the submissions in order, with the originally stated as well as actual locations maintained (post delayed move map processing). The other two tables track the read and write areas. Each represents the sorted starting area locations with associated size. Whenever a page reference is added to either table the reference is either incorporated into or found in an existing entry (either no change or the area's size increases), two areas are combined, or a new area begins. Thus the number of areas represented by the table after an addition remains either the same, grows, or shrinks. However, there are always as many or more write areas than there are read areas (which follows from the fact that two reads cannot be directed to the same write location). See FIG. 45.

The locations in the read table reflect any possible delayed move map processing. In other words, they are the actual versus the original stated locations. Note that only locations being read are redirected. The delayed moved map does not redirect write locations.

For a swap submission (as opposed to a move submission),A_loc and B_loc are added to both the read and write tables. Although one cannot say much at this time about what data is actually going to be read and written, one can identify the locations affected (areas) by essentially ORing all the locations. In the move submission, A_loc is added to the read table and B_loc to the write.

An addition to the read table is ignored if the specified location has previously been written as the destination of a move. If this write was part of a swap, then an associated read would also have been processed and the addition ignored, as it is already present in the table. On the other hand, if the write was the destination of a previous move then the location does not need to be read. For example, if A is moved to B, and then B is swapped with C, the original value of B is not part of what gets written and so does not need to be read. Thus only the right side of move submissions need be checked.

Once an attempt is made to exceed the total number of read and write areas, or the total number of pages being transferred equals its limit, or a timeout occurs, processing then advances toward setting up the swap handler request.

Figure 46:
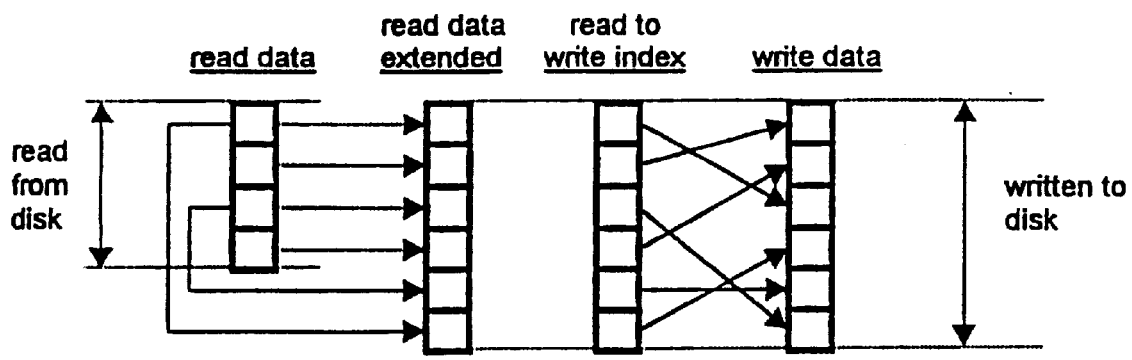

The next major step is reading the indicated data into memory and establishing a mapping table that takes a read index into the collective data read and produces the associated write page index. The write index indicates where the page belongs in the collective data represented by the write area table. As already mentioned the total size of the read data may be smaller than that which gets written. This is because some pages that are read should be duplicated in the write data The difference in total page counts between what is read and written (through the swap area) is handled by treating the duplicates in the read side as being "independent" and duplicating them in pages (indices) above what was actually read. Thus the read index range will equal the write range. The original read data is extended as new indices are assigned. See FIG. 46.

The method for creating the read-to-write index map is to essentially use the previously discussed final destination algorithm that cycles through all the stated read locations. Some changes are required to deal with move submissions and duplication.

When cycling through the submissions the goal is to identify a "stated" page that has been read and to determine where it is located in the collective read data. Movement of this page is tracked through the submissions to determine its final write location. This location is correlated with the write area table to produce a write page index. The read to write index association is stored in the map (i.e., by running an index for a page that has been read through the map, the resulting write index identifies where the page is located in the write buffer). A write index should never occur twice. Further, all read and write locations should get processed. When determining a read page index, if it is found to already have been used then a new "duplicate page" read page index is allocated and the page is duplicated.

Figures 47, 48:
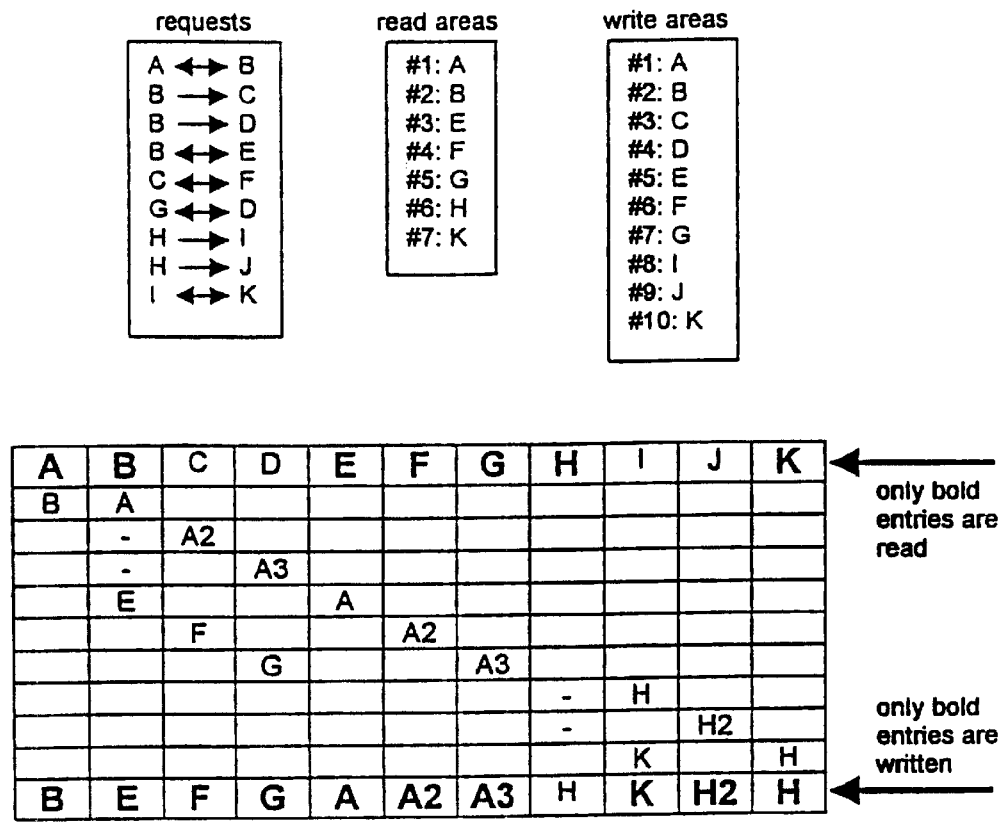

The example in FIG. 47 demonstrates the process of determining what is read and where it eventually gets written. The ←→ symbol indicates a swap and → indicates a move. The final read and write data patterns are shown, as worked out by hand, with only bold letters part of the read and write set.

The final destination algorithm creates the read-to-write index map. The algorithm cycles through all the swap and move submissions and determines where each read location will finally be written. The read and write locations are then converted to page indices in the read and write areas, and the read-to-write map updated. Tracking information is updated in the source (left) side of move submission when such is encountered. A move submission represents a forking of the source. Since the algorithm cycles through all submissions, and for each cycles through the remaining submissions, its performance is modeled as $n+(n-1)+(n-2)+ \ldots +(n-(n-1))$ or of the nature $n^2$. This is not particularly good. There can be easily 100 submissions. The algorithm's performance is greatly improved by linking all like locations together to eliminate much of the scanning. The algorithm is then on the order of $n^1$.

FIG. 48 illustrates the building of the read-to-write map. Notice that all locations get updated once in the map, as well as in the read data and the write data arrays. The end result matches that previously determined by hand in FIG. 47.

The read-to-write map provides the means for reordering the extended read data into write data. In this form the write data is written to the swap area. The switch page is updated to reflect where data will be written in case the system crashes before the operation's completion, so that the operation can be re-started.

The algorithm shown in FIG. 49A reorders the read data. It involves the use of two temporary page buffers through which a displaced page shifts. A write_data_order array indicates for each page whether it is in read data or write data order. Initially the array is false. The algorithm starts at the top of the write_data_order array and searches for a page not yet in 'write order.' When found, the read-to-write map is consulted to determine where the page really belongs. Before copying it to this location, the current contents (which should also be in read data order) is moved to the temporary page. Afterward, the read-to-write map is again consulted to find where to put the temporary page. The process loops until eventually a temporary page is written to the original starting point FIG. 49B illustrates the algorithm. As with swapping pages on disk, swapping read data is a matter of processing a set of closed loop exchanges.

The reorder algorithm can be optimized to eliminate shifting pages through a temporary page. Basically the presented algorithm is run backwards. The data for the initial page that would be written is held in a temporary buffer. The moves are then performed until cycling back to the final location, corresponding to the temporary buffer's data. After moving out the final location's data the temporary buffer is moved in.

FIG. 50 illustrates the execution the reorder algorithm on the current example (started in FIG. 47). Two closed loops are processed. The processing of the second closed loop shows a write of "H" occurring over an existing "H" (circled). The overwritten location is a duplicate page and its location assignment is arbitrary. This is an unnecessary overwrite that arises because pages are duplicated yet treated as independent. Optimization could look for such overwrites and adjust the read-to-write map to eliminate them, but the effort is not likely worthwhile. Duplications occur from move submissions that originate from reverting disk, but this does not occur often.

An example where the delayed move map and swap processes combine is the situation involving two swaps where two of the locations are mapped elsewhere to a common location. More specifically, take the case where A is swapped with B and C with D, but where A and C are both mapped to R for the purposes of reading (via the delayed move map). The read areas are R, B, and D. The location R is duplicated in the swap area and then A, B, C, and D written FIG. 51 is based on FIG. 20J taken from an example in the Reversion and the Delayed Move Map Section In this other section the swaps are shown one at a time. FIG. 51 illustrates the same outcome as in FIG. 20M, except that all the swaps are done in a single swap handler request (note H1, H2, and H3 are all the same). The delayed move map before the swap redirects reads of locations C and E to B. The swap submissions in FIG. 51 are constructed by following the swaps from FIG. 20J onward (everything is swapping through location A).

Returning to the issue of the performance of the swap setup, it has already been observed that the final destination algorithm is of the order $n^2$. Further, when ORing a location into the write area table, the algorithm needs to know whether a given side in a new submission has been the destination of a move. The resulting scans are also of the order $n^2$. Both algorithms are reduced to $n^1$ by use of indices and linking.

Figure 52:
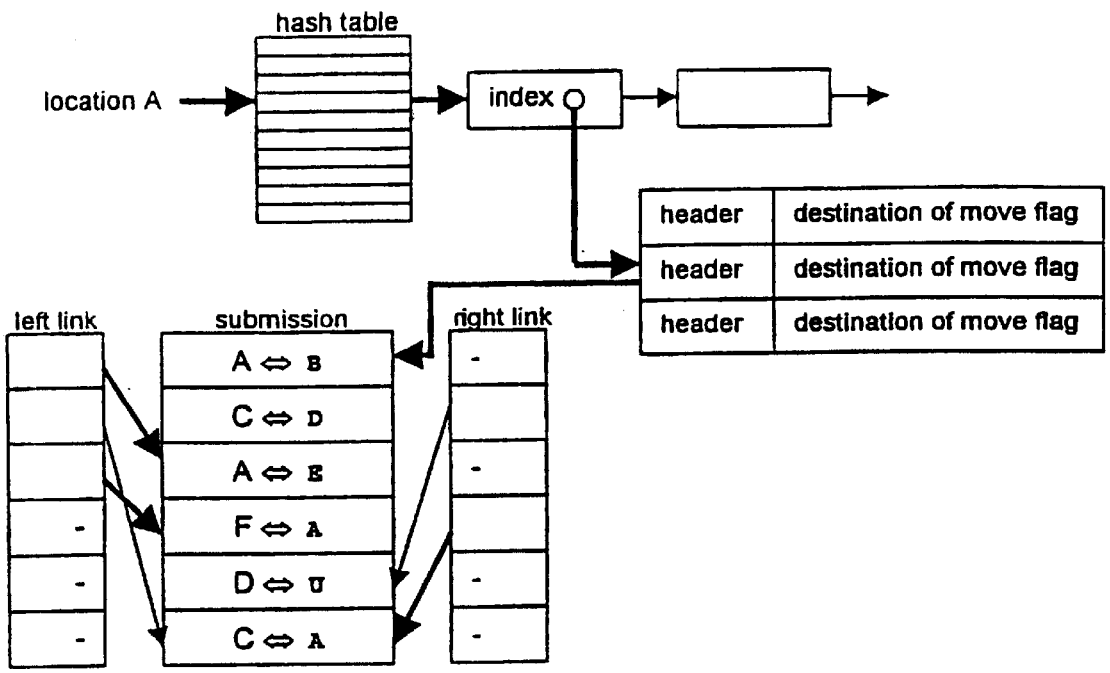

Every disk location is run through a hash header table and a list of collisions followed until a match is found (or new entry is added). The located entry identifies an index for the location. This index identifies a table entry in a table of headers. The index's table entry identifies the first occurrence in the submission table of the associated location. It also contains a flag that is set if the location is the destination of a move. This flag replaces scanning, and the read-to-write index map algorithm can follow relatively short lists. Left and right link fields are added to the submission table to support the linking. See FIG. 52.

Processing Reads During a Swap

In order to maximize response, a user's read request is immediately handled while in the middle of a swap request. In other words, although the engine must complete the swap request, which may take some time, it can pause to process a few of the user's reads. The effective locations for the reads are determined using the transitional maps and then a check is made to see if the page is affected by the current swap request. If not, the read is passed along, otherwise it is redirected appropriately.

Depending on the swap handler's stage of processing, a read request of a page involved in the swap is handled differently. If the read comes while the handler is collecting up (reading) the data involved in the swap then the read is directed to the pre-swapped location. The read location is based on the transitional maps that assume the swap is complete. However, since none of the data being swapped is in its proper place, the read location is re directed to its pre-swap location. The other stage to handle is after all the data is gathered and written to the swap area. At this point the swap handler begins writing data to their appropriate locations. However, until this process is complete, the affected locations are basically in transition. Therefore, a read location is re-directed to a location in the swap area that holds a copy of the page that will eventually be written to the read location. Of course, since the swap area is held in memory, one could also simply pass back the data and skip the actual disk read.

Although the engine attempts to immediately process any user's read, it does not allow a continuous stream of reads to hold off the completion of the swap request. This would cause an indefinite delay of the transition to the new stable image. After a maximum delay is exceeded, the swap request takes precedence.

If a write request occurs then the operating system waits until the swap request completes. This should not have a serious effect on user response. The reasoning is that foreground activity is detected during the initial period when new writes are going to the operating system's cache (but not yet to the engine). Thus the engine gets some advance notice of the actual write (when the cache is flushed or overflows) during which time it completes the current swap handler request. Swapping is in general an optimization that is performed in the background.

If all the written data fits in the operating system's cache then there is not an immediate need to process the writes. If so much data is written that the cache overflows then the added time to complete the current swap request is likely not significant. It is going to take a lot of time to write the "more than the cache size amount" of data and the user has to wait through this period anyway.

Figure 53:
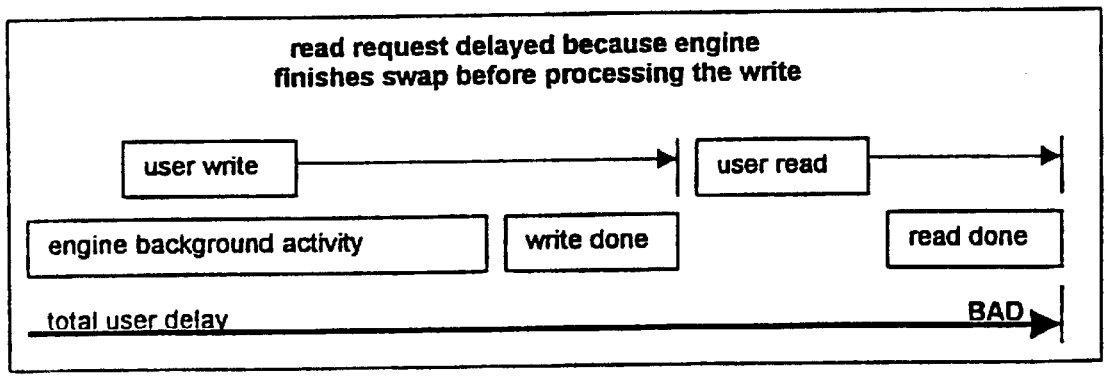
FIGS. 53–54 illustrate processing a read during a swap.

In response to a write request, the engine may pause (stop accepting requests) so that it can complete the current swap request. Thus, the act of the user writing data prevents the engine from rapidly responding, should in the future there be a read request. For example, take the situation where an application writes a small amount of data, pauses, and then reads some data. During the pause the operating system flushes the write, passing it to the engine. If the write were to immediately complete, the application's read would follow. However, the engine is busy finishing up background work (swap request) before working on the write. The write must complete before the read is processed. The user waits as shown in FIG. 53.

Figure 54:
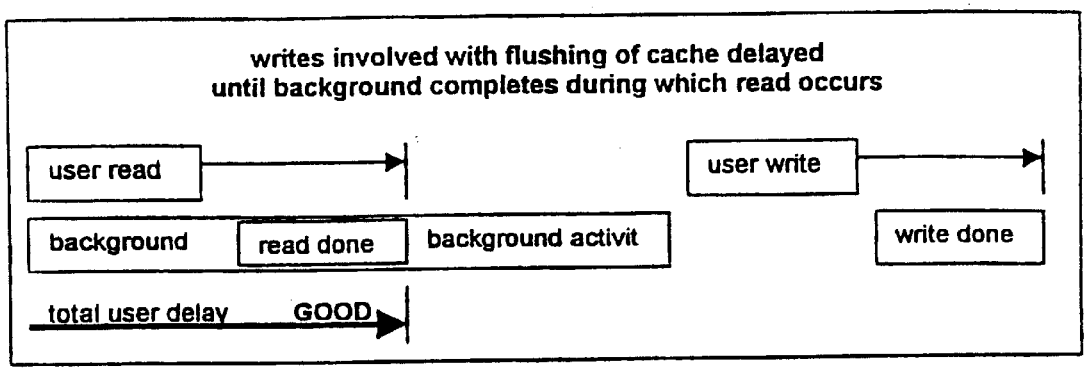

This response delay is avoided by either of two techniques. First, the OS can query the state of the engine before starting to flush its cache, and delay if the engine is in the middle of a swap handler request. During this wait the OS informs the engine that there is pending foreground activity so that the engine quickly wraps up its background work and allows the processing of writes. While waiting for the engine to become ready, the OS allows the application to generate read requests that are immediately passed along to the engine (before the flushing). Since the engine can interrupt its background processing to handle a read, the user response is optimal. This solution assumes a modification to the operating system's cache flushing process. See FIG. 54.

The second technique is to simply have the time period before the engine begins its background work longer than that which the operating system waits before flushing its cache; in other words, make sure the engine's background activity occurs after the OS's flush.

The advantage of the first technique is that it could use the time before the flushing of the cache for engine background activity. However, the second technique is implemented without OS modifications. In the end this raises the question of how long and why should the OS delay before flushing its cache. The general reason would seem to be that it improves user responsiveness. By waiting there is no process to complete, even if called off early (i.e., only part of the entire cache is flushed), and so response improves. See the "A Nice Background Section."

It is possible to add a layer of buffering to the engine so that it can absorb some writes while it completes a swap request. However, this is redundant with the caching provided by most operating systems. Therefore techniques involving timing are preferred.

File Rescue

A user may be unable to boot their computer due to corruption of the disk's data. For example, a virus could have corrupted files needed in order to start, or the user installed a new software driver that interferes with normal operation. Assuming one of the engines had been in use, it is easy to revert the disk to an earlier time—for example, to a day ago. (One may wonder how it is possible to start a computer in order to request its disk be reverted, when the problem is that the computer will not start. The answer is, although it is not possible to fully start the computer from the hard disk, the engine has been protecting its own ability to boot into the computer's memory. Thus, the engine can intervene before attempting to fully start the OS and revert to a time at which the system could fully start.)

Now the user is faced with a new problem. Although the computer is functioning, it has returned to its state as of a day ago. The work performed since that time no longer appears on the disk (main area). However, all the differences between a day ago and when the computer ceased to boot were generally saved in the history buffer as part of the reversion. Therefore, the recent work is not really lost. The problem is that a user does not want to bring all the historic information forward to the present, as this is what led to the computer's being unable to start (crash). Instead, selective retrieval is desired.

As part of handling general logged data, the engine logs the names, directory locations, and time-of-access of all files that are altered. Therefore, after recovering from a crash, the engine can establish a list of the files altered during the period between the reversion and crash (recovery period). The user can then select from this list specific files to recover. In response the engine, through a simulated drive, goes back to the appropriate time and copies forward the specified files to the current image. In this way files are rescued.

The presented files are sorted with only the most recent version listed. This reduces the volume of information presented to the user. Filtering of non-user files can further reduce the list. An alternative form of presentation creates a directory tree containing directory and file entries corresponding only to files that were altered during the recovery period. The user can browse the tree and select files for recovery in a manner similar to that done using the Microsoft Windows Explorer.

As the user continues working forward in time past the reversion (the one that restarted the computer), the start and end times of the recovery period do not change. Thus, the associated list of files is also stable, for as long as the referenced historic information is available. This is important, in that the user expects any files recovered through this mechanism to reference only files altered during the recovery period. For example, assume the user has re-started their computer, reads in a certain word processing document, made and saved a few changes, but then realized that they wanted the version "lost" in the recovery period. When viewing the files that can be "recovered," it would be confusing to include versions created after the reversion.

Therefore, the file rescue process involves identifying a set of files that were altered prior to a reversion, but after the time to which the reversion is done. This list remains generally stable and provides the means for the user to select (for recovery) files that were altered during this period. Presentation of the list can involve sorting, filtering, and tree structures (hierarchies).

Practical Use of Data Reversion Embodiments

In summary, some of the major practical applications of the present invention as described above are in performing the following functions:

1. Reverting the current image of a user's disk to an earlier time. This process is initiated either before or after normally booting up the fill OS from the hard disk.

Figure 55:
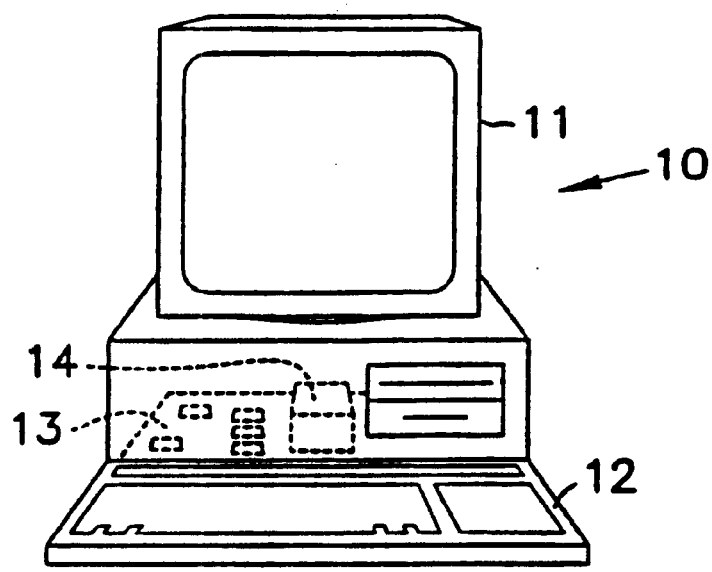
FIGS. 55–56 illustrate example embodiments of the invention.

2. Establishing a simulated image of the user's disk corresponding to an earlier time, and allowing the user to access this simulated disk as if it were a real disk.
3. Allowing the user to write to a simulated disk, thus creating a workspace for the user. The contents of the workspace originate from the current or an earlier state of their disk's image.
4. Hooking into or supplementing the directory and file presentation means of an OS, and allowing the user to view a list of earlier versions of a file. A selection can be made from the list and the recovered file either replaces the current version or is copied to a new file. The list is generated from the OS's file activity that is logged by the engine. For a given file, the engine constructs a list of a file's available earlier versions by scanning its log, and following the path, for the selected file, of its file modifications, file renames, and file moves (from one directory to another).
5. After reverting the current image back in time over a given period, establishing a list of files that were altered during this period and allowing for their recovery.
6. Allowing the user to temporarily switch the roles of the current and simulated disks. Therefore, when the user accesses the current image, it is the simulated image to which disk accesses are directed, and vice versa
7. Providing for synchronization and continuous downloading of current image and historic information to an external hard disk in order to achieve a level of hard disk redundancy. The user can run from the external disk should the main internal hard disk fail. The external disk is also used to re-initialize a new internal disk, after the failed disk is replaced. This process is done concurrently with allowing the user to continue working.
8. Allowing an application to be re-started from an earlier point in time by using memory (RAM) snapshots correlated to disk reversion safe points Embodiments of the Invention The various embodiments of the present invention are applicable to all types of computer systems that utilize one or more hard disks, where the disks represent a non-volatile storage system or systems. Such types of computers may be, but are not limited to, personal computer, network servers, file servers, or mainframes. FIG. 55 illustrates an exemplary personal computer 10 on which the present invention can be implemented. The exemplary personal computer, as shown in FIG. 55, includes a monitor 11, a keyboard 12, a central processing unit 13, and a hard disk 14.

Figure 56:
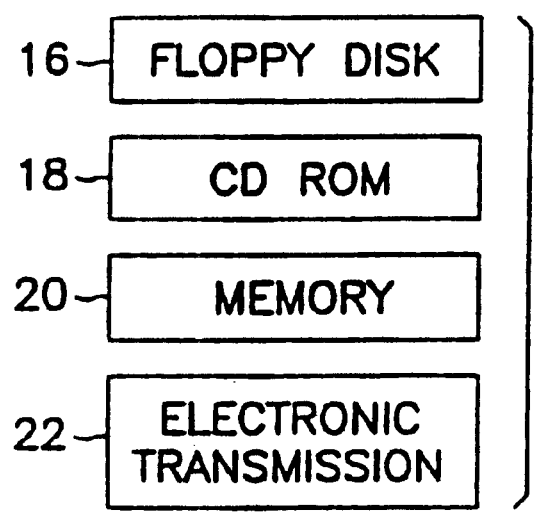

FIG. 56 further illustrates the various embodiments of the invention. The invention, and in particular the "engines" described herein, can be implemented in software and stored in computer readable form on various carrier media such as floppy disks 16, CD-ROM 18, permanent or temporary memory 20 or as an electronic data transmission 22, in addition to being stored on hard disk 14.

The software of the present invention for implementing the various computer-implemented embodiments described above is, in one exemplary form, distributed on a carrier media such as a floppy disk 16, CD-ROM 18 or by data transmission 22, and installed on the hard drive of a computer, such as, but not by way of limitation, an IBM-compatible personal computer. Furthermore, according to one example embodiment of the invention, the hard drive of the IBM compatible computer also has installed on it a copy of the Windows™ Operating System (Version 3.1 or later, including Windows 95™, available from Microsoft Corporation), for performing the operating systems fictions for the computer. Alternatively, according to another example embodiment, the software of the various embodiments of the invention may be adapted for use on the Macintosh™ computer system, available from Apple Computer, Inc. However, these example embodiments in no way should be taken as limiting the computer platforms on which the invention may be applied.

Although the embodiments disclosed herein may be described as implemented in software or hardware, the inventions herein set forth are in no way limited exclusively to implementation in either software or hardware unless expressly limited thereto. Moreover, it is contemplated that software may be implemented in firmware and silicon-based or other forms of hard-wired logic, or combinations of hard-wired logic, firmware and software, or any suitable substitutes therefore, and vice versa.

Main Processor Based Firewall Protection

Most personal computers at their core consist of a main processing unit (e.g., an Intel Pentium), RAM, and a hard disk. A key concern is protecting the integrity of the data stored on the hard disk. The conventional method is to make backups, copying all or key data from the hard disk to another medium. Various reverting methods have been described above that provide for the ability to recover altered information. These provide an enhanced means of protecting against data loss wherein the user is not required to stop and make a backup at some predetermined time. By themselves, these reverting methods store their recovery information along with the current user's data on the same disk. A method of establishing a second external disk in which changes to the main disk are duplicated has also been described above. This adds a level of hardware redundancy.

Although it has been stated that all or parts of the reverting methods can be implemented as part of a disk controller, this adds a significant cost to a part of the computer that is otherwise relatively simple. However, moving key parts of the reverting methods into hardware that is independent of the main processing unit has an important advantage. It isolates the reverting software and the physical disk from any bugs or viruses that may be in the main processing unit. For example, there is little to stop malicious software from corrupting a personal computer's disk by directly talking to the appropriate hardware that controls the disk. It is almost inherent in the nature of a general-purpose operating system, which allows for addition of new disk drivers, that there exists a window of vulnerability.

Therefore, although protection against data loss is greatly enhanced by using a reverting method that executes in the main processing unit, it is vulnerable in many ways. A bug or virus may go around the reverting method and directly control the disk, they might corrupt the RAM used by the reverting method, or hide or falsely represent a dialog with the user. When key elements of the reverting methods are implemented in independent hardware, a form of firewall is established such that malicious behavior present in the main processing unit cannot interfere with the reverting method's protection of prior states of a disk. The problem inherent in establishing independent hardware, or adding appropriately to the disk controller, is the added cost.

Generally, the main processing unit already has sufficient RAM, processing horsepower, and time to perform the activities of a reverting method. However, it is susceptible to bugs and viruses. Therefore, a method is described of how to establish a firewall between the key elements of a reverting method and the rest of the system, without requiring significant new hardware. The key technique is to isolate through foolproof means a portion of the main processor's RAM as well as the interface to the hard disk from what is normally accessible by the main processor. There is no need to control access to ROM (read-only memory) since it cannot be changed.

Access by the main processing unit to protected resources is generally disabled. However, when the main processor executes a certain sequence of instructions, access to the protected resources is enabled and the main processor begins executing code at a predetermined location in the protected RAM or ROM. At the same time, interrupts are generally disabled to prevent the main processor from diverting to unknown code.

The concept of transferring program control to a predetermined location is a form of a gate. Before passing through the gate, access to protected resources is disabled. Once through the gate, access to the protected resources is enabled. The transfer of program control through a gate (or gates) is detected by hardware ("Gate Monitor") which then enables access to the protected resources.

A malicious or out of control program may jump into the middle of code (ROM) that is part of the code that normally executes after passing through a gate. This can lead to attempts to access protected resources from code that normally does such accesses, but that was entered improperly (i.e., in an uncontrolled manner). Since control did not flow to this code through a gate, the Gate Monitor did not enable access to the protected resources. Thus no harm results: the disk interface cannot be accessed or the reverting method's RAM altered. Presumably, the operating system eventually aborts the offending task.

One technique of implementing a gate utilizes an external interrupt and associated Gate Monitor hardware. Control passes to the core reverting method's code ("Driver") by setting various parameters in the main processor's registers (or RAM) and triggering an external interrupt (for example, by writing to an i/o port or certain memory location). As the processor responds to this interrupt, the Gate Monitor enables access to the otherwise protected resources. Another technique is to branch or pass into a specific location in code, which contains an instruction to disable interrupts. When the Gate Monitor detects the execution of this location it then enables access to protected resources. Note that the concept of a Driver and an Engine are essentially the same.

When the Driver completes its operation, it disables access to the protected resources and allows the main processor to resume normal unprotected execution. Such cases arise in both servicing requests to access the disk as well as from within the Driver when allowing the servicing of interrupts. The latter case could be implemented by, from within the Driver, periodically branching to code that closes the gate (disables access to protected resources), enables interrupts (allowing their servicing), then falls back through a re-entry gate. This gate disables interrupts again and returns to processing the current request.

It is important that the "ROM" containing the Driver is a non-volatile memory so that it is always intact upon starting the computer. If the Driver's code was loaded as part of the normal booting process, it could be corrupted. However, alternate non-volatile technologies like battery backed up RAM, EPROM, and flash can also be used. Some of these allow for altering the non-volatile memory. In such cases, encryption and validation of any new software (code) that is to replace all or part of the current Driver prevents the Driver's corruption.

The hard disk or disks under the control of the Driver may be either internal or external to the computer. Interfacing from the main processor to a disk is typically done using a bus, of which some examples are IDE, SACS, and USB.

Adding a physical switch that is accessible to the user of a computer provides a means for the user to signal to the Driver that it is OK to perform an unrecoverable operation. Examples of such operations are the total clearing of historic information and the discarding of historic information required to restore back to some minimum distance in time. In the latter example, a virus might attempt to write so much new data that the ability to restore to, say, a day ago, is going to be lost. When the Driver queries the user (through the OS) to whether this is acceptable, the virus could intercept the query and respond positively without ever informing the user. By requiring the user to press a physical switch, the Driver can validate the response to its query is in fact from the user. This switch can take the form of a key press as long as the Driver has direct access to the keyboard controller (i.e., a virus cannot fake the response).

Figure 57:
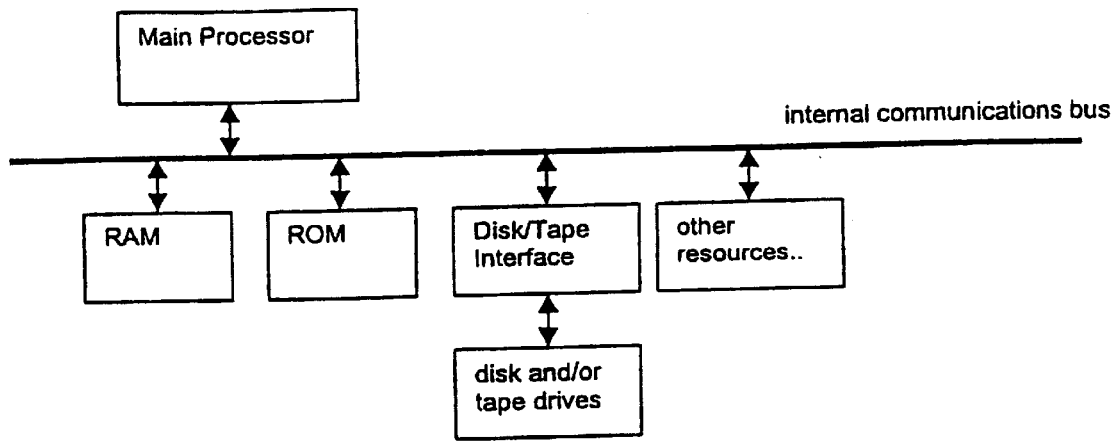
FIG. 57 illustrates a conventional computer architecture.
Figure 58:
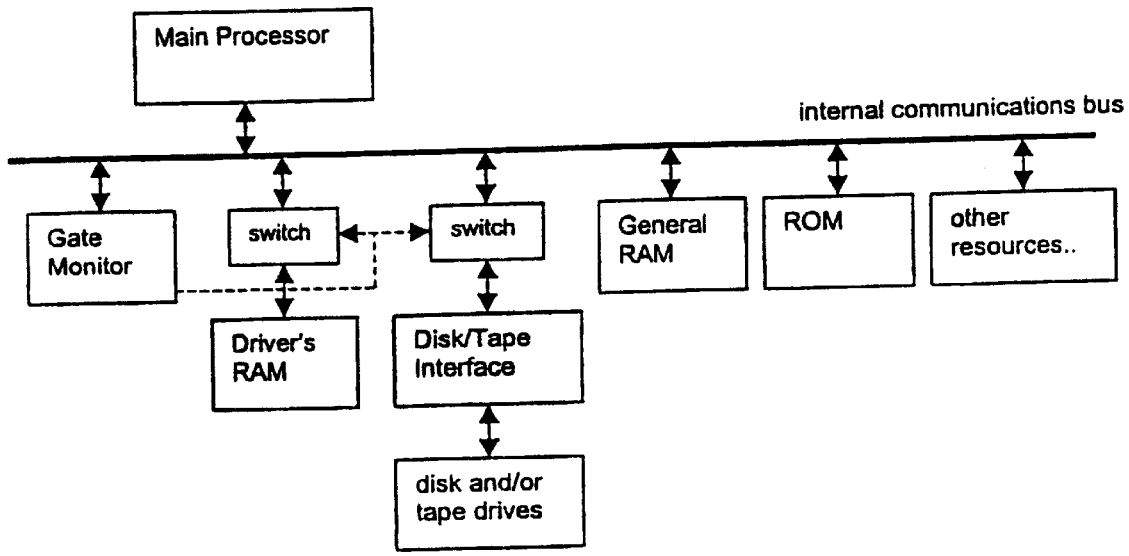
FIG. 58 illustrates an embodiment of the invention wherein resources are protected.

FIG. 57 illustrates a typical personal computer's internal architecture. Notice that accessing the disk is possible by any software that is appropriately loaded into main memory. In FIG. 58, access to the disk is only possible by passing through a gate. Once the main processor passes through this gate, it is presumably executing an uncorrupted version of an engine which provides access to the disk.

Note that in FIG. 58 the Driver's RAM and the general RAM are typically implemented using the same system of memory chips. However, access to the locations reserved for the Driver's RAM is made conditionally depending on whether the Gate Monitor is allowing access to protected resources. Should an access occur to the Driver's RAM (or other protected resource) when such is not allowed, the access is ignored. A system fault may also be generated.

The concept of using a second removable external disk in addition to a computer's internal disk has been described as a means of establishing hardware redundancy. The two disks are kept synchronized based on migrating changes to the internal disk that have not yet been recorded to the external disk. As changes are written in their chronological order to the external disk, the Driver maintains the appropriate structures to facilitate restoring or recovering original states.

There are three important advances to this approach:

1) Firewall Provided by Embedding the Driver in the Controller

Figure 59:
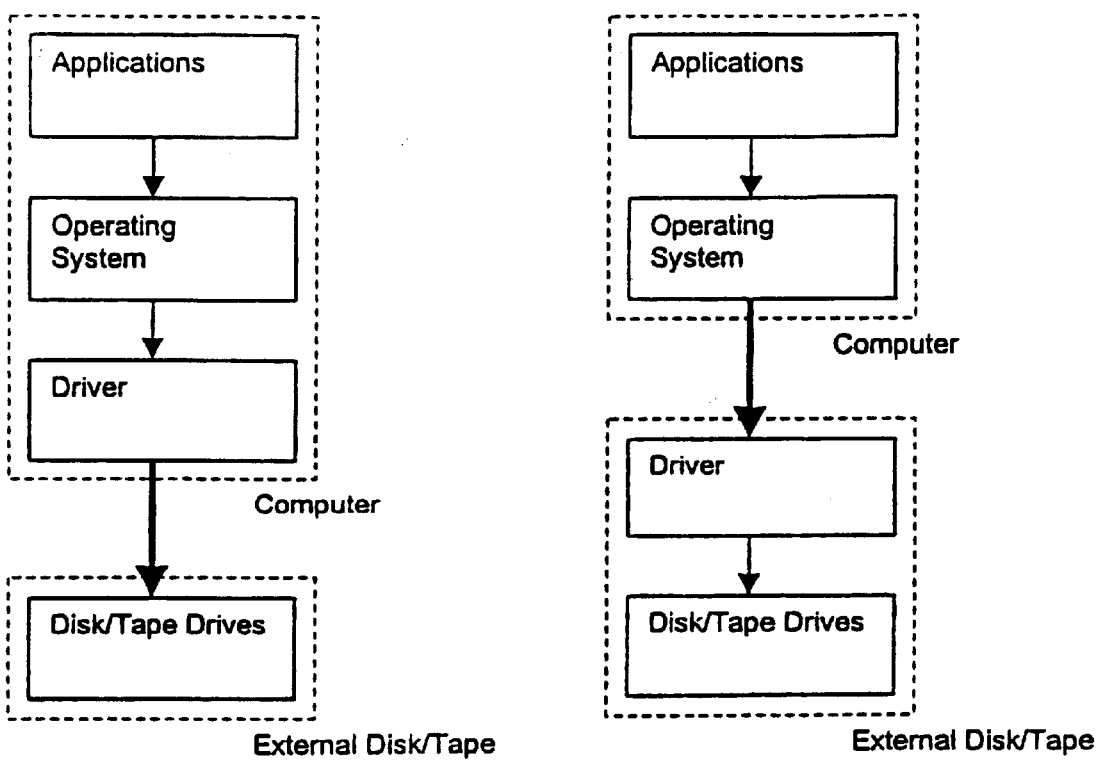
FIG. 59 illustrates alternate embodiments of where a driver may execute with respect to the embodiment of FIG. 58.

The Driver could execute in the main processor with the external disk on a similar bus to the internal disk. In this case the Driver directly controls the transferring of information to and from the disk. An alternate implementation incorporates the Driver into the external disk controller. Here, the Driver receives requests through the disk interface. The difference between these two cases is in which side of the disk interface lies the Driver. This is illustrated in FIG. 59.

In a perfect world it would not matter on which side the Driver lies. However, within a computer (PC) there are possibilities of corruption due to viruses, bugs, and operator mistakes. Thus if a Driver that is executing in the computer's main processor is corrupted, a single disk write can invalidate all the information kept on an external disk. Therefore, by incorporating the Driver into the disk controller (which is part of the disk), a clean separation ("firewall") is established between the computer and the external disk so that malicious or otherwise badly executing code cannot corrupt the Driver's working and non-volatile storage.

Firewall protection allows the Driver to validate requests from the computer (OS) as well as protect its own internal data structures. Thus if the computer goes awry, even though it may corrupt its own filing system, which is recorded on the external disk, the external disk can generally still return to the pre-corruption state. In other words, the Driver's data structures that facilitate recovery and restoration are safe from corruption by the main processor.

The method of using a Gate Monitor to protect critical resources of the Driver while at the same time allowing the Driver to execute on the main processor achieves the same result as moving the Driver into the disk controller. However, such requires a computer whose design incorporates the electronics associated with the Gate. Computers now commonly available do not have this design. In light of this, providing a disk with an incorporated Driver is a practical means to providing firewall protection.

The only "hole" in the firewall is that the computer could write so much new data to its disk, and thus to the external disk, that eventually important historic states are pushed off the end of the circular buffer. This is addressed by providing means for the Driver to alert the user and shutdown (stop accepting changes) when the loss of recovery ability to a predefined time is imminent.

Placing a Driver, which maintains and protects historic disk sector states, in a disk controller creates a firewall. Embedding in a disk controller a Driver that is implemented at the file level also creates a firewall. This Driver records all or portions of altered files (instead of disk sectors). The protocol to a file level Driver would be similar to that of a network file server. However, this "server" only services one computer and also maintains historic states.

2) Writing a Backward Looking Incremental Backup Tape in One Session

The external disk can also be substantially implemented as or supplemented by a tape drive. A tape drive has the same basic properties of a disk drive, except that access to non-sequential storage blocks is impractical on a frequent basis. If the data sent to the external "disk" is instead of or in addition to, written sequentially to a tape, it is possible to use such tape to recover data from a given state associated with a given time that was captured on the tape. The process of writing a base image of the user's disk (internal or external) along with incremental changes to tape for some fixed interval of time, as a tape has a finite capacity, facilitates two modes of recovery. First, it allows recreating a complete disk state at some captured point in time. Here, the base image is restored and all the time ordered changes are read and applied to this image up to a desired point in time. Another second recovery mode involves restoring both the base and all or some amount of changes together to disk. In this case the Driver is used to write to a disk the information read from tape, and so the tape, as representing a series of states over some time period, is restored.

Of course, the tape can also represent an exact image of the disk under a Driver's control, and thus its restoration to a sufficiently large disk also recovers states of the user's disk over a period of time. In this backup case the tape contains both user data as well as the internal data structures of the Driver. Such a tape is quickly made since essentially both the disk and tape are processed sequentially. However, it has the disadvantage of requiring cessation or the diverting of modifications to the source disk while the backup is written. In other words, the data written to the tape must correspond to a disk at a single point in time.

This advance in providing a redundant backup on a tape facilitates tape based recovery of data over a range of time, as opposed to a single point in time. It generally differs from a traditional 'base image plus incremental backup' in that it is disk sector based and contains the synchronization (safe points) information and other logged data (e.g., file activity) maintained by the Driver. It also differs in how the tape is created. In a traditional incremental backup, an initial copy of the source disk is made to tape, after which, at specific later points in time, any modified data is further copied to the tape. Thus the user is continually adding to the backup tape during the period for which backup copies of the source disk are made.

What is important about the present invention is that the Driver creates the backup tape while at the same time allowing the user to continue modifying their data. The basic process is identical to maintaining a redundant external disk. Note that if too much modification occurs, the tape backup process must re-start (the same situation occurs when an external disk's tracking of changes falls behind changes made to the internal disk).

Unlike a traditional incremental backup, the tape generated by the Driver is created in one recording session and covers a window of time that goes backward from the time the tape gets written. This is possible because the Driver has stored incremental change information on the source disk. Creating an incremental tape backup in one recording session reduces the complexity of the backup process. The reason for creating a traditional incremental backup was to reduce backup time, in that saving differences generally takes less time than a "full backup", and to reduce the amount of physical tape used (recording less takes less space). However, these benefits came at the cost of added handling and restoration complexity. On the other hand, the reason for the Driver making a backup tape that spans a window of time is in fact to get this feature. The resulting tape has the benefit of being both a full backup, in that it is not dependent on another earlier tape, and providing restoration ability over a window of time. Further, unlike a traditional incremental backup from which restoration is only possible to a time at which the user had made an incremental backup run, the Driver's backup tape allows for restoration from virtually any usable point in the backed up window of time. The difference between these approaches is similar to the difference between constantly copying data to tape throughout the workday or simply making one backup tape at the end of the day.

3) A Directory for a Backward Looking Incremental Tape Backup

The prior paragraph discusses a new process for creating an incremental backup tape. In truth, although the tape contains all the necessary information to restore data from various points within a window of time, the organization of the data on the tape is such that selective restoration (e.g., a single file) is complicated. As a backup of a disk drive and its Driver's data, restoration of the entire tape to a disk and the subsequent use of the normal Driver software for recovery is the most natural and simplest means of accessing the tape's data However, one may not always have an available disk drive to which to restore the tape. Therefore, it is useful to include on the tape a directory that correlates the tape's data to their associated files, as written at a certain time. Thus, when restoring data from tape, it is possible to consult the directory to determine the portions of the tape that need to be read. This pre-analysis allows the tape to be read in a single pass (assuming the directory is at the front of the tape). The directory can map all the various versions of files throughout the backed up window of tune, or just at one time. In the latter case, the tape must be restored to disk in order to access files across the window of time.

Conclusion

Thus, there have been described above a variety of embodiments capable of restoring a disk to a previous state and providing means for the protection of the data stored in a computer system.

What is claimed is:

1. Apparatus comprising:

a computer including a hard drive;

computer software stored on the hard drive and executable in the computer to:

provide an operating system including a file management system to manage files stored on the hard drive, the file management system providing for modifying or deleting current files on the hard drive;

automatically keep a copy of each of a plurality of historic files on the hard drive, wherein at least some copies contain a recent historic state of a current file that has been modified and at least some copies contain a recent historic state of a current file that has been deleted;

keep copies for at least some of the historic files such that a request to modify data in a current file results at least some of the time in the modifications being written to the drive without first waiting for a physical copy of the historic file to be saved, and wherein at least some of the requests to modify data are made using the file management system;

display to a user of the computer a list of historic states of data on the hard drive that the user may choose to recreate, wherein at least some of the historic states displayed require a plurality of different historic files to recreate; and recreate a historic state selected by a user using one or more of the copies of historic files and one or more current files kept on the hard drive.

2. Apparatus according to claim 1 further wherein the software is further executable to manage a storage capacity for historic data such that at least some older historic files are discarded in favor of newer historic files.

3. Apparatus according to claim 2 further wherein the software is further executable to automatically recycle the storage capacity.

4. Apparatus according to claim 1 further wherein the historic states are listed based on a time and date such states existed on the hard drive.

5. Apparatus according to claim 1 further wherein the historic states are listed as a plurality of states determined to be likely to recreate a stable state of the data on the hard drive.

6. Apparatus according to claim 1 further wherein the software is further executable to keep a copy of a historic state of a current file by altering a file map.

7. Apparatus according to claim 1 further wherein the software is further executable to keep a copy of a historic state of a current file by altering a file map.

8. Apparatus according to claim 1 wherein one of the historic states displayed to a user corresponds to a set of files on the disk that existed at the time of the historic state.

9. Apparatus according to claim 8 wherein the computer software on the disk includes a plurality of application programs executing on the operating system, and the set of files includes operating system files and application files.

10. Apparatus according to claim 9 wherein the set of files further includes files created by application programs.

11. Apparatus according to claim 1 wherein the software further provides that the modifications of a current file are written to the drive without first waiting for a physical copy of the historic file to be saved by saving the modifications in a location other than the location of the current file being modified.

12. A method of accessing the prior state of information on a disk, comprising:

keeping a record of the role of disk-based data element X, as managed by an operating system and associated with some file Z, in order to preserve original data in data element X;

supplementing the operating system such that the changing or the discarding of data element X as associated with file Z results in the data element X being left in its original disk location;

the data element X and its original association with file Z under the operating system are recorded in the record;

the role of data element X on the disk becomes one of preserving its original state as associated with file Z;

through a mapping of the disk, modification of data element X is disallowed as long as it is acting to preserve data;

the ability to access the state of all or a portion of the prior information on disk by re-establishing an association between file Z and the preserved data element X as accessed through the operating system or a specific application; and the eventual automatic releasing of the oldest data from its role of preserving data so that it becomes available for other uses, in order to manage the total amount of disk space assigned to the role of preserving data.

13. A method according to claim 12 further comprising supplementing the operating system at least in part by incorporating logic into the operating system.

14. A method of accessing the prior state of information on a disk comprising, keeping a record of the role of disk-based data elements X and Y, as managed by an operating system and associated files, in order to preserve original data in data element X;

supplementing the operating system so that changing or the discarding of data element X as associated with file Z results in the data element X copied to new disk location(s) associated with data element Y;

the data element Y and its association with file Z under the operating system are recorded in the record;

the role of data element Y on the disk becomes one of preserving the original data as associated with file Z;

through a mapping of the disk, modification of data element Y is disallowed as long as it is acting to preserve data;

the ability to access the state of all or a portion of the prior information on disk by re-establishing an association between file Z and the preserved data element Y as accessed through the operating system or a specific application; and the eventual automatic releasing of the oldest data from its role of preserving original data, so that it becomes available for other uses, in order to manage the total amount of disk space assigned to the role of preserving data.

15. A method according to claim 14 further comprising supplementing the operating system at least in part by incorporating logic into the operating system.

16. A method of accessing the prior state of information on a disk, comprising:

keeping a record of the role of disk-based data elements X and Y, as managed by an operating system, in order to preserve original data in data element X;

supplementing the operating system so as to intercept a request to change the data element X;

copying the data element X to disk a location associated with data element Y in response to receiving the request to change the data element X as associated with a file Z, the data element Y and its association with file Z under the operating system are recorded in a record, and the role of data element Y on the disk becomes one of preserving the original data as associated with file Z.

17. A method of accessing the prior state of information on a disk as recited in claim 16, further comprising:

releasing oldest data from the role of preserving the original data as associated with the file Z.

18. A method of accessing the prior state of information on a disk as recited in claim 17, wherein the releasing of oldest data frees disk space for other uses.

19. A method of accessing the prior state of information on a disk as recited in claim 16, further comprising:

disallowing modification of the data element Y as long as it is acting to preserve the original data associated with the file Z.

20. A method of accessing the prior state of information on a disk, comprising:

keeping a record of the role of disk-based data elements X and Y, as managed by an operating system, in order to preserve original data in data element X;

supplementing the operating system so as to intercept a request to discard the data element X;

copying the data element X to disk a location associated with data element Y in response to receiving the request to discard the data element X as associated with a file Z, the data element Y and its association with file Z under the operating system are recorded in a record, and the role of data element Y on the disk becomes one of preserving the original data as associated with file Z.

21. A method of accessing the prior state of information on a disk as recited in claim 20, further comprising:

releasing oldest data from the role of preserving the original data as associated with the file Z.

22. A method of accessing the prior state of information on a disk as recited in claim 21, wherein the releasing of oldest data frees disk space for other uses.

23. A method of accessing the prior state of information on a disk as recited in claim 20, further comprising:

disallowing modification of the data element Y as long as it is acting to preserve the original data associated with the file Z.

* * * * *